INVENTOR
ELLIOTT R. MARSH

BY
Sughrue, Rothwell, Mion & Zinn
ATTORNEYS

CONTROL CIRCUITS

SIGN CONTROL

PROGRAM RING

PROGRAM RING

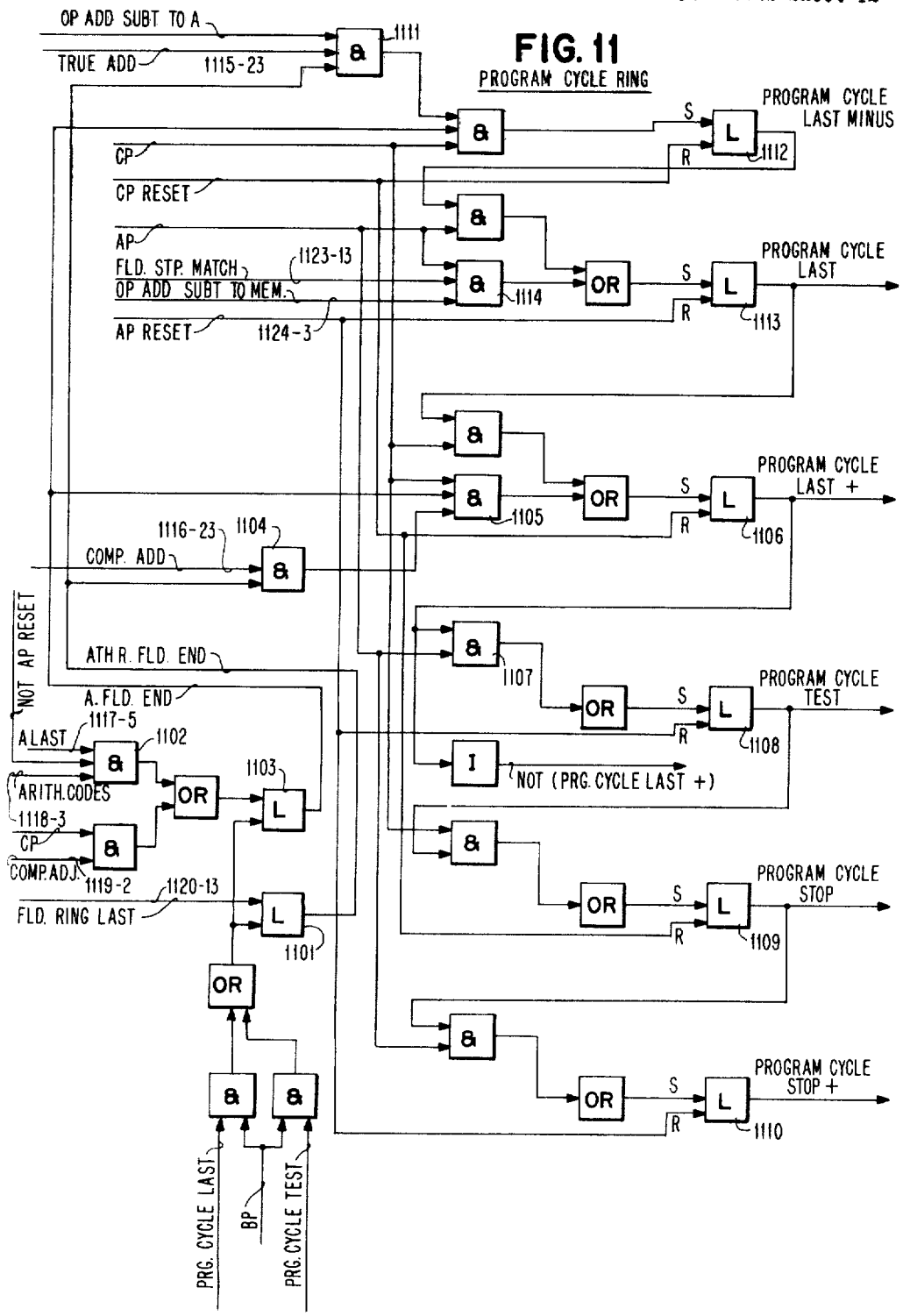

FIELD RING

FIELD RING

FIELD RING

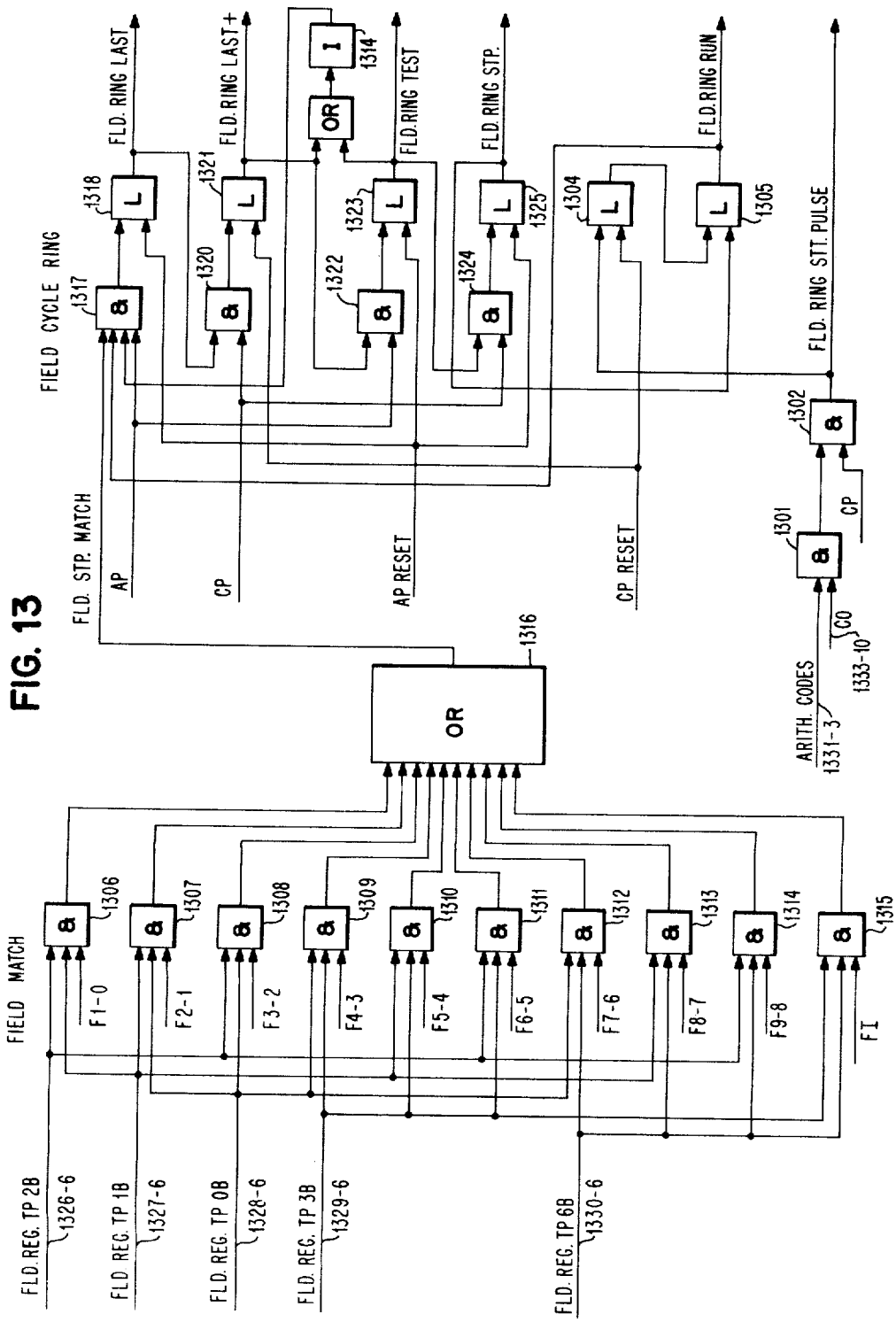

Jan. 19, 1965     E. R. MARSH     3,166,668
COMPUTER PROGRAM SYSTEM
Filed March 24, 1960     34 Sheets-Sheet 17

FIELD RING CHECK

ARITHMETIC REGISTER SIGN CHANGE

ARITHMETIC REGISTER SERIAL READ IN CONTROLS

ARITHMETIC REGISTER SERIAL READ OUT CONTROLS

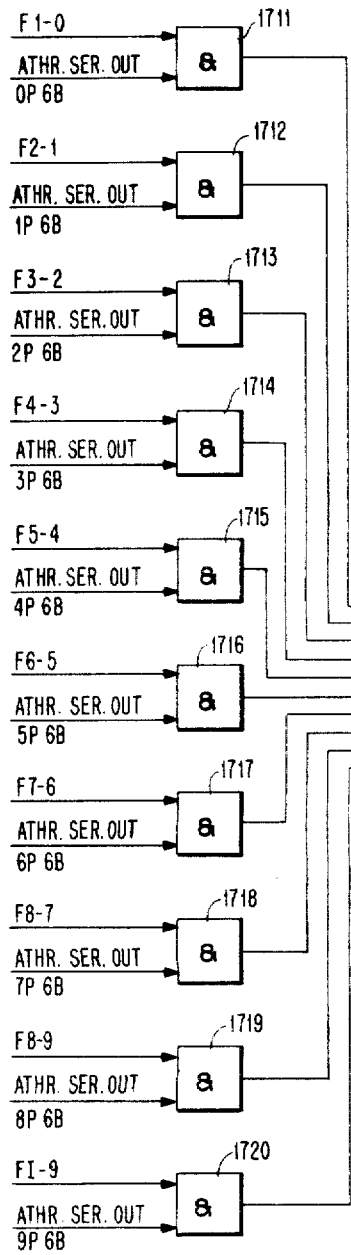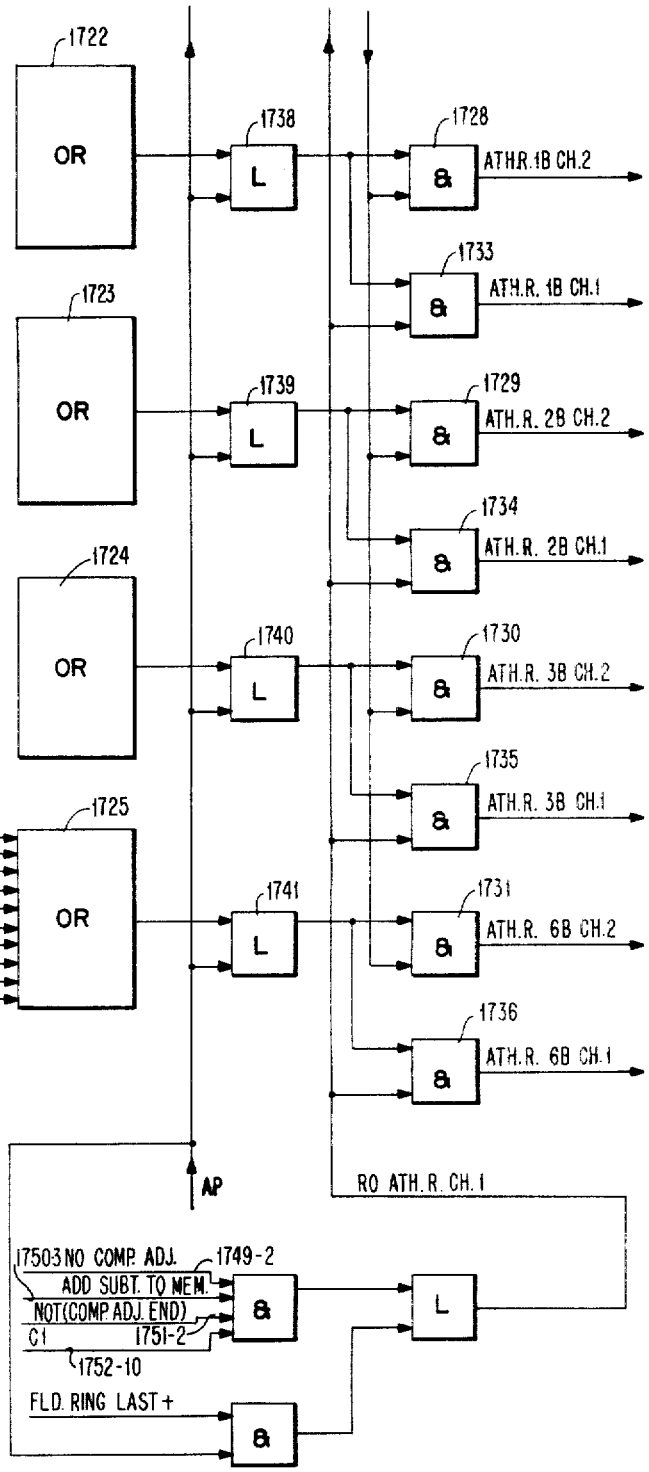
FIG. 17 b
ARITHMETIC REGISTER SERIAL READ OUT CONTROLS

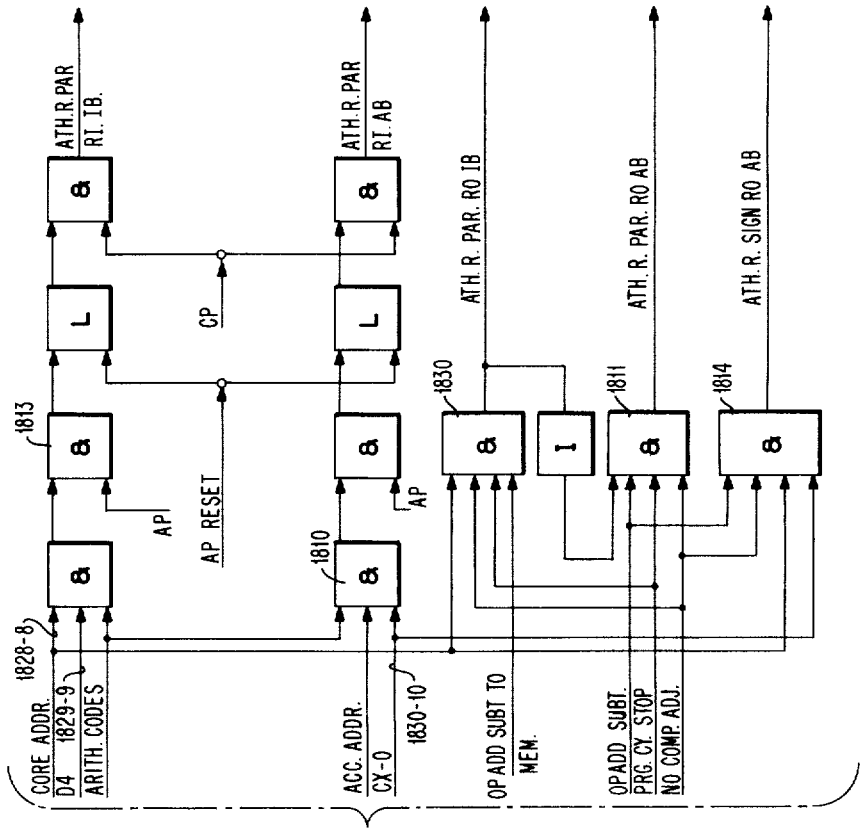
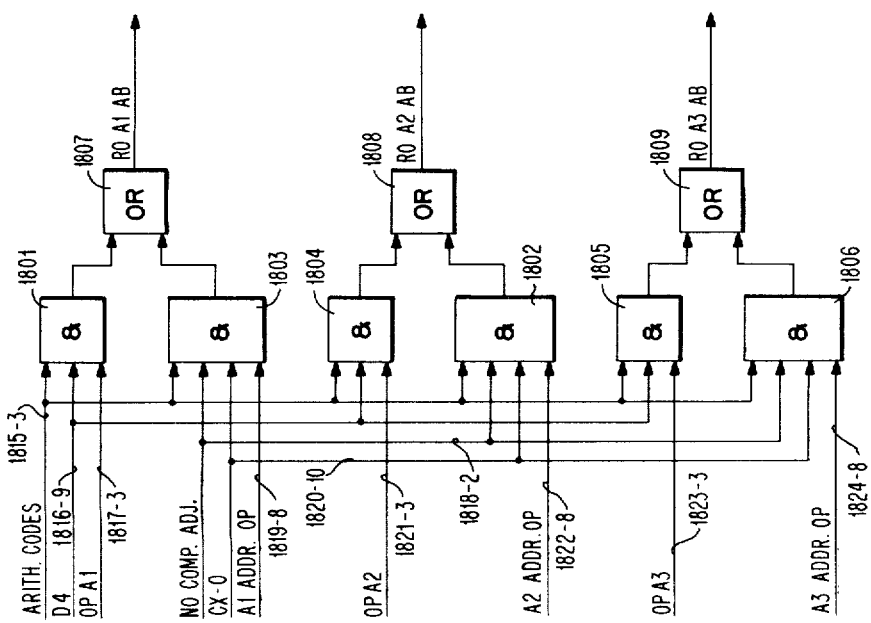

ARITHMETIC REGISTER ZERO INSERT

Jan. 19, 1965  E. R. MARSH  3,166,668
COMPUTER PROGRAM SYSTEM
Filed March 24, 1960  34 Sheets-Sheet 26

ZERO INSERT CHECK

ZERO INSERT CHECK

AUXILIARY REGISTER CONTROLS

AUXILIARY REGISTER READOUT GATE

ADDER INPUT CONTROL

ADDER INPUT CONTROL

Jan. 19, 1965          E. R. MARSH          3,166,668

COMPUTER PROGRAM SYSTEM

Filed March 24, 1960          34 Sheets-Sheet 32

ADDER OUTPUT CIRCUITS & FIELD SIZE REGISTER

Jan. 19, 1965  E. R. MARSH  3,166,668
COMPUTER PROGRAM SYSTEM
Filed March 24, 1960  34 Sheets-Sheet 33

ADDER OUTPUT CIRCUITS & FIELD SIZE REGISTER

Jan. 19, 1965                E. R. MARSH                3,166,668
                        COMPUTER PROGRAM SYSTEM
Filed March 24, 1960                                34 Sheets-Sheet 34

| MEMORY CYCLE | UP | VP | WP | XP | YP | ZP | UP | VP | WP | XP | YP | ZP | UP | VP | WP | XP | YP | ZP | UP | VP | WP | XP | YP | ZP | UP | VP | WP | XP | YP | ZP | UP |
|---|---|---|---|---|---|---|---|---|---|---|---|---|---|---|---|---|---|---|---|---|---|---|---|---|---|---|---|---|---|---|---|
| CPU CYCLE | AP | BP | CP | DP | AP | BP | CP | DP | AP | BP | CP | DP | AP | BP | CP | DP | AP | BP | CP | DP | AP | BP | CP | DP | AP | BP | CP | DP | AP | BP | |
| INSTRUCTION-RING-CYCLE | | | | | | | I1 | | I2 | I3A | I3B | I4 | I5 | | | | | | | | | | | | | | | | | | |
| DATE RING CYCLE | | | | | | | | D1 | D2 | D3A | D3B | D4 | D5 | | | | | | | | | | | | | | | | | | |
| PROGRAM RING | | | | | | | | | | | | CX | | | | CX 1 | | | | | C0 | | | C1 | | | | | | | |
| FIELD RING | | | | | | | | | | | | | | | | | | | F1-0 | | | C0-1 | | | C1-2 | | | | | | |
| | | | | | | | | | | | | | | | | | | | F 9 | | | | | | F9-8 | | | | | | | |

FIG. 25

United States Patent Office

3,166,668
Patented Jan. 19, 1965

3,166,668
COMPUTER PROGRAM SYSTEM
Elliott R. Marsh, Endicott, N.Y., assignor to International Business Machines Corporation, New York, N.Y., a corporation of New York
Filed Mar. 24, 1960, Ser. No. 17,422
51 Claims. (Cl. 235—157)

This invention relates to a programmed digital computer system, and more specifically, to apparatus for utilizing a variable number of characters contained in a fixed length data word.

Prior art digital computer systems utilize a variety of data word lengths and programming features which enable them to perform many special and complicated data processing operations. In some such systems, the data words which are operated on, for example, in an arithmetic operation of add or subtract, are of fixed character length so that all of the characters within a word must be processed even though many of them may have no significance either in a decimal or an alphabetic sense. The processing of non-significant characters is time consuming and, furthermore, much storage space is wasted. Other systems avoid this waste of time and space by utilizing variable word length operands with end limits being indicated by the presence of special characters which travel along with the word as it transfers through the computer system. However, certain storage space is required for these special characters which could well be used for significant data characters. In some business operations, it is also only required to modify a few characters within a complete data word, since these few characters may represent inventory levels or the like of a particular stock represented by other characters in the same word. With prior systems utilizing either fixed or variable length words, it is therefore necessary to take great precautions so that the end result of a processing operation only leaves these few characters so modified.

The present invention relates to a digital processing system in which fixed length data words are transferred within the system, but the processing of these words in arithmetic operations or the like is performed upon only a certain field of characters within a word as selected by the instruction word controlling the operation. This results in an extremely effective and efficient manner of changing or modifying only certain characters within a data word. Furthermore, each fixed length data word may contain two or more variable length fields with each field acting as an independent word so that no storage space is wasted with non-significant and special "end-of-word" characters.

It is therefore an object of the present invention to provide a data processing system having fixed data word length storage locations holding fixed data word operands, which comprises means operative in a unique manner for selecting only a desired field of the operand upon which a processing operation is to be performed.

Another object of the invention is to provide a data processing system utilizing an instruction word, means under control of the instruction word for selecting an operand to be used in a data processing operation, and means further under control of the instruction word for operating in a unique manner to select only a portion of that operand for actual use in the operation.

Another object of the invention is to provide a data processing system comprising a memory for storing operands at discrete addresses therein, an arithmetic computing section, means to address and withdraw from said memory a data word operand, and means associated with said last mentioned means for operating in a unique manner to select a field of said withdrawn operand having fewer characters than in said operand, and transferring that field to said arithmetic computing section.

A further object of the invention is to provide a data processing system in which an operation is performed on a selected operand under control of an instruction word, comprising a memory having a plurality of addressable storage locations, a first operand stored in one of said addressable storage locations, an arithmetic register, means for transferring said first operand to said arithmetic register, an auxiliary register, means for transferring a second operand to said auxiliary register, means operative in a unique manner for selecting a desired portion of said first operand under control of said instruction word, an arithmetic processing section, means for gating said selected portion of said first operand under control of said instruction word to said arithmetic processing section, and means for gating said second operand to said arithmetic processing section.

A yet further object of the invention is to provide a data processing system in which an operation is performed on a selected portion of an operand, which selected portion is specified by a field length section of an instruction word, which comprises a processing unit, means for transferring said operand to said processing unit, a field register, said field length section of said instruction word being stored in said field register, and means under control of said field register operative in a unique manner for selecting the desired portion of said operand in which said arithmetic operation is to be performed.

A further object of the invention is to provide a data processing system in which an operation is performed on first and second data operands, which comprises means for transferring said first operand to an arithmetic unit, a field register, a field control section of an instruction word being stored in said field register, means under control of said field register for selecting a desired portion of said first operand, means for determining the most significant character position in said second operand, and means for sending said selected portion of said first operand and said significant characters only of said second operand to a processing unit.

A yet further object of the invention is to provide means operative in a unique manner for checking the validity of a field length which is denoted by a portion of an instruction word in a data processing system.

A yet further object of the invention is to provide means for inserting zero digits into a register so as to replace with zeros all characters which are without a particular field of characters.

A yet further object of the invention is to provide a checking circuit for insuring that all of the significant characters of an operand have been utilized in a data processing operation.

Other objects and advantages of the invention will become apparent in the following description, which is to be read in accompaniment with the drawings, in which.

Figure 6:
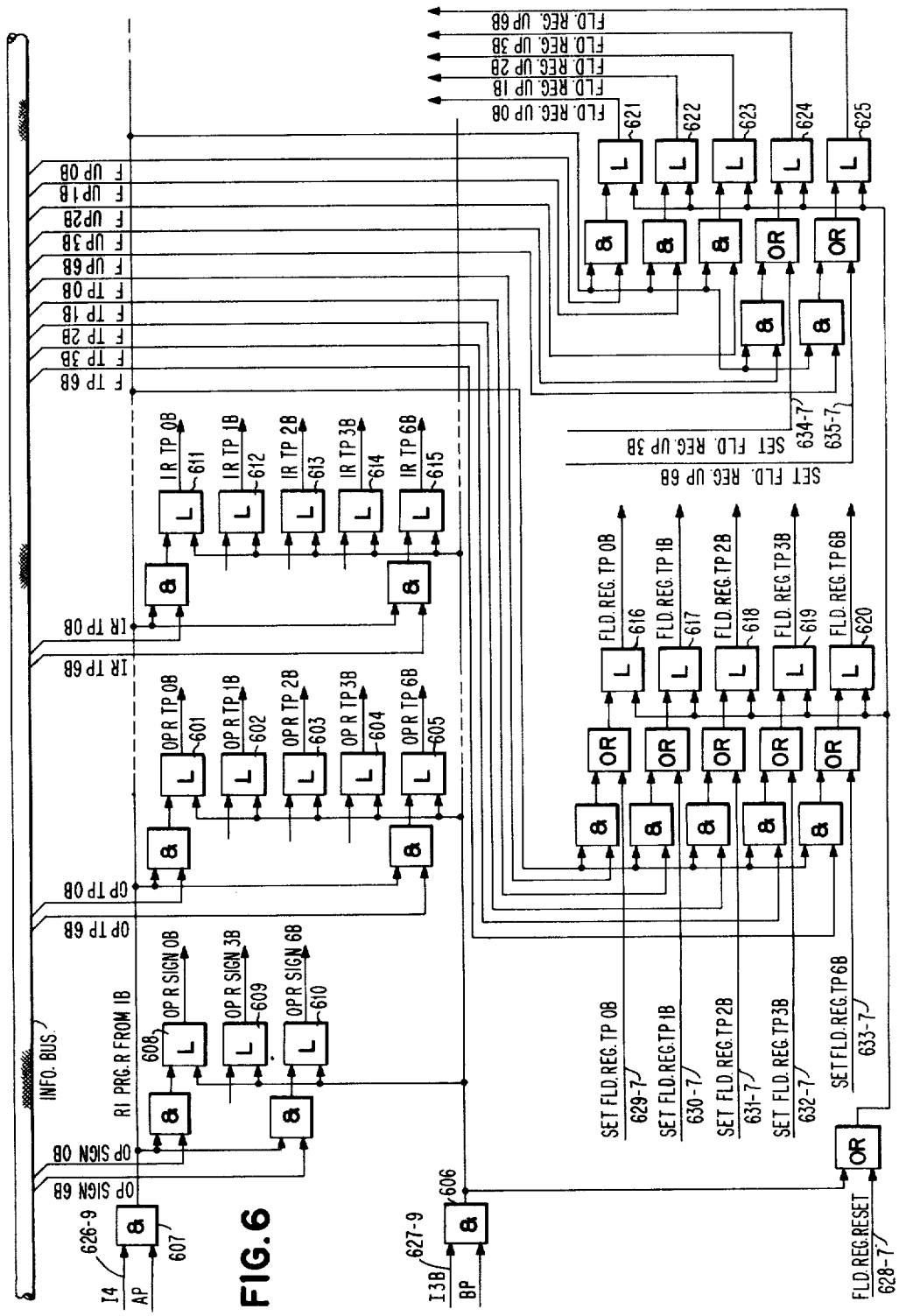
Figure 7:
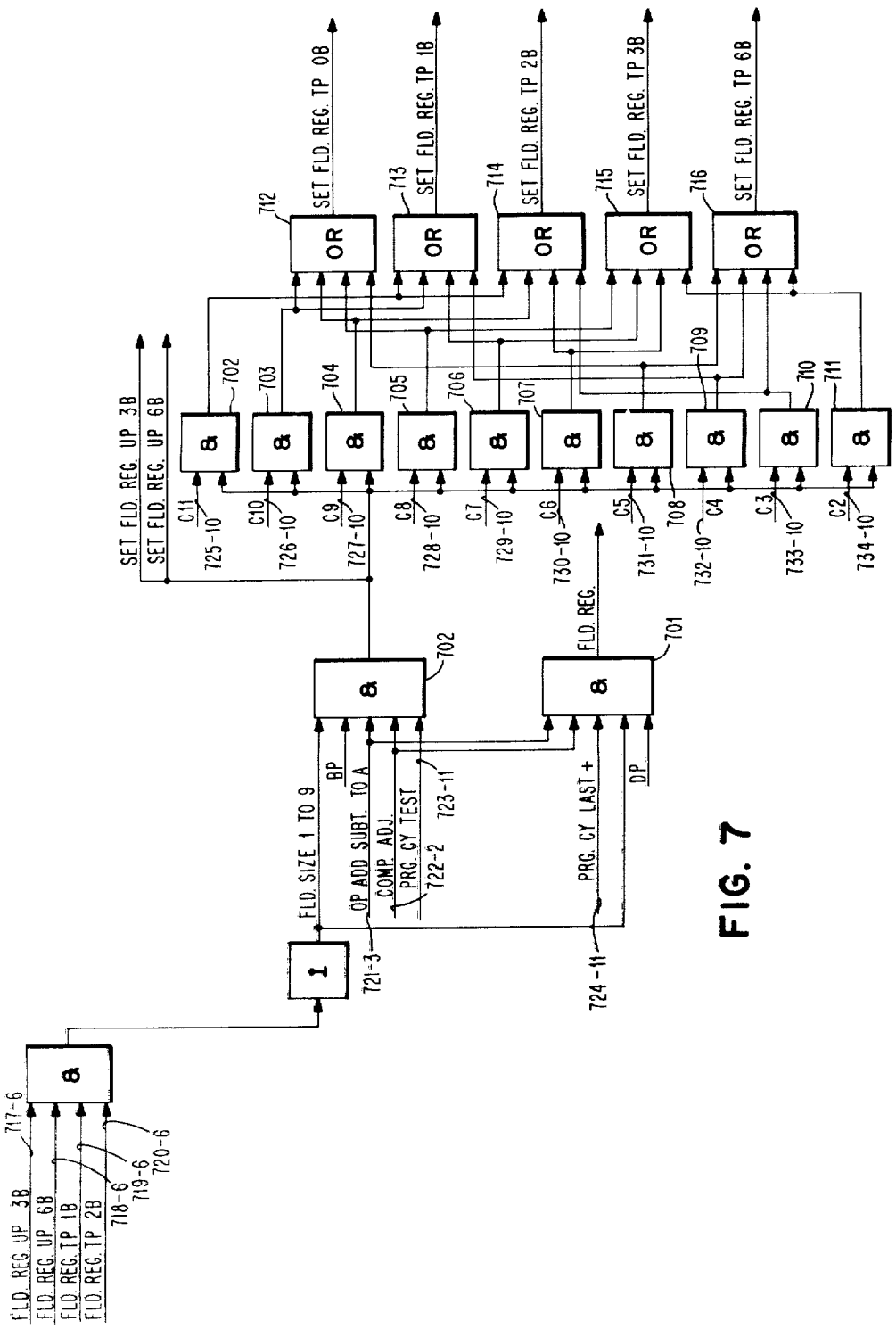
Figure 8:
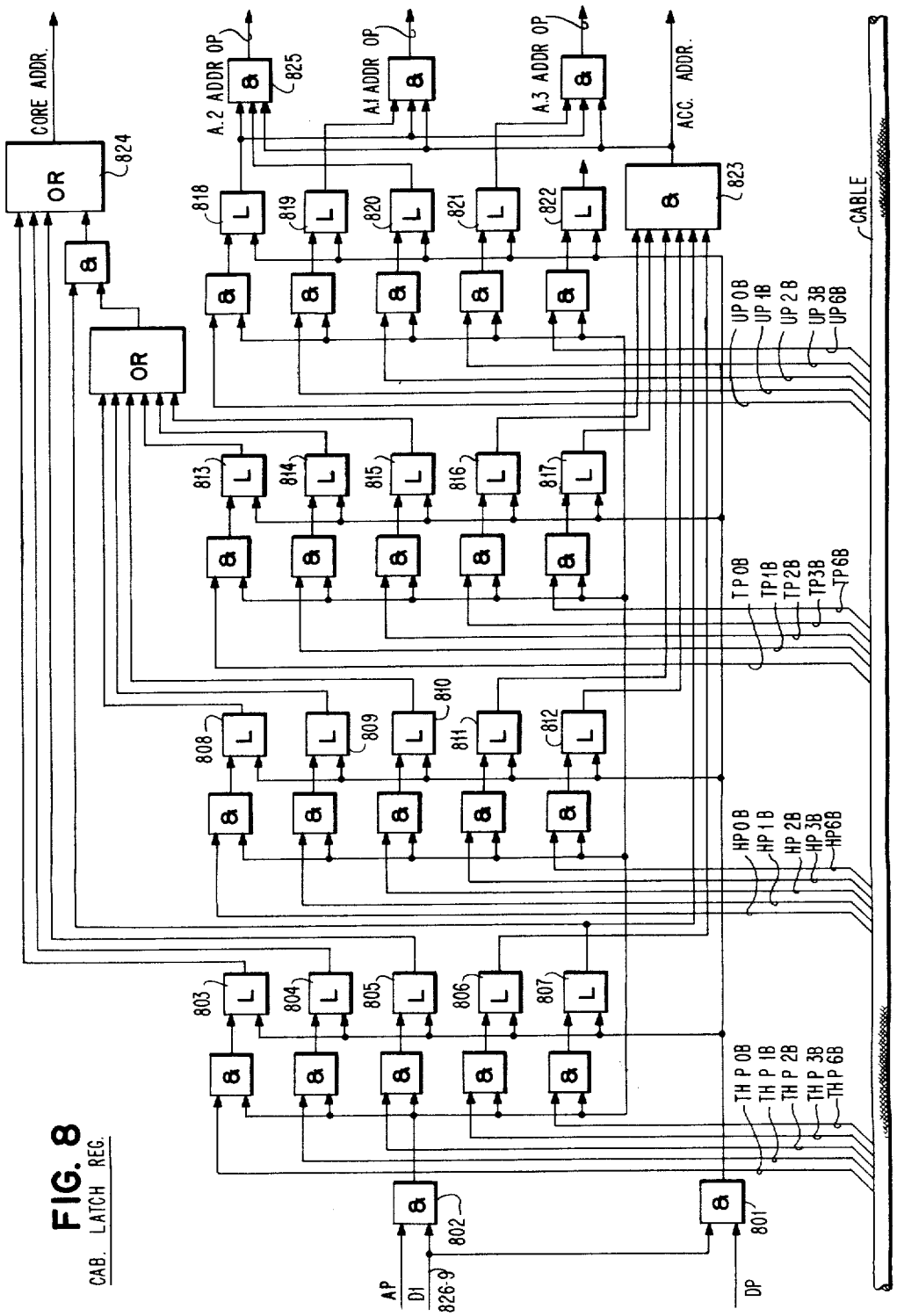
Figure 9:
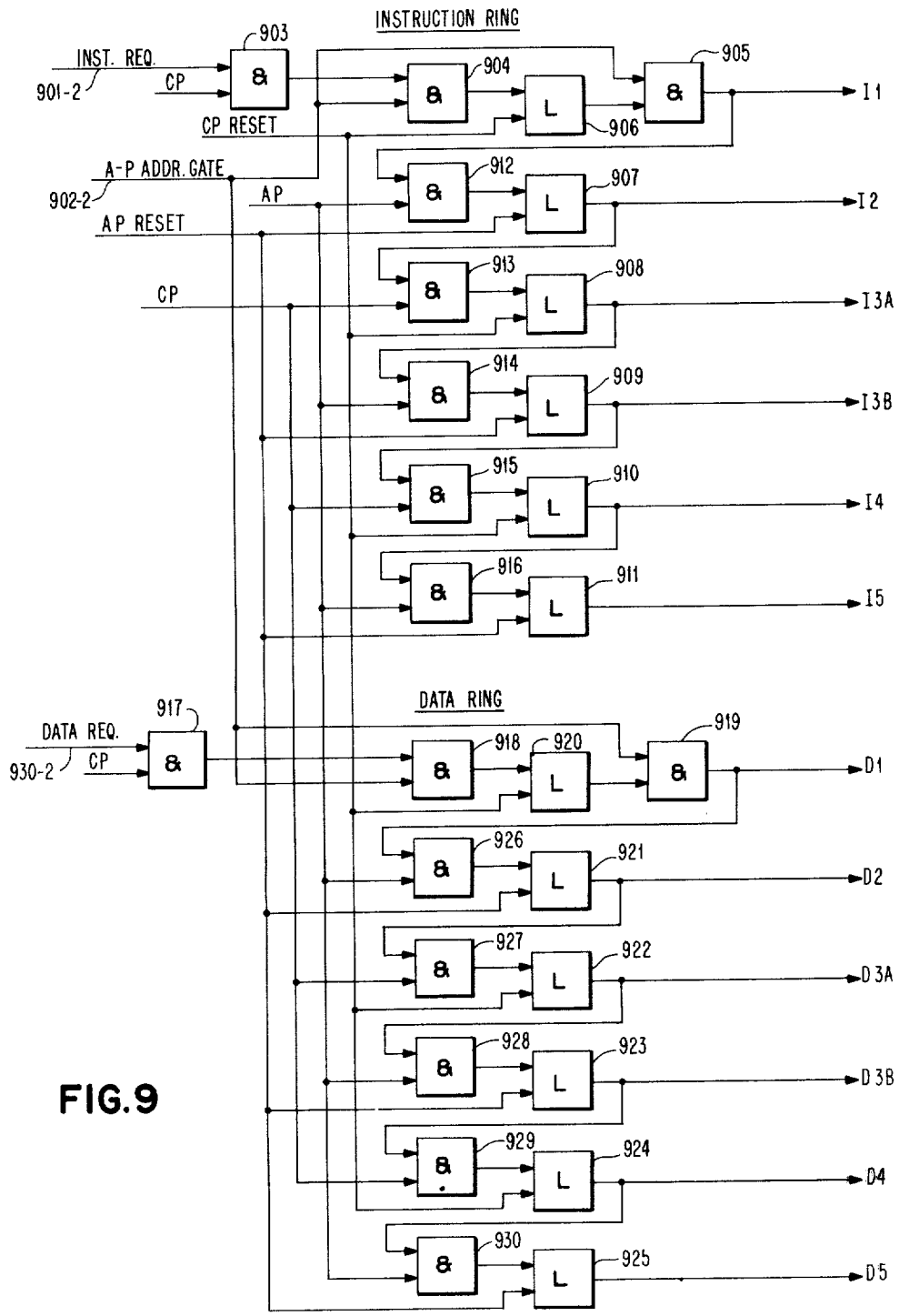
Figure 10A:
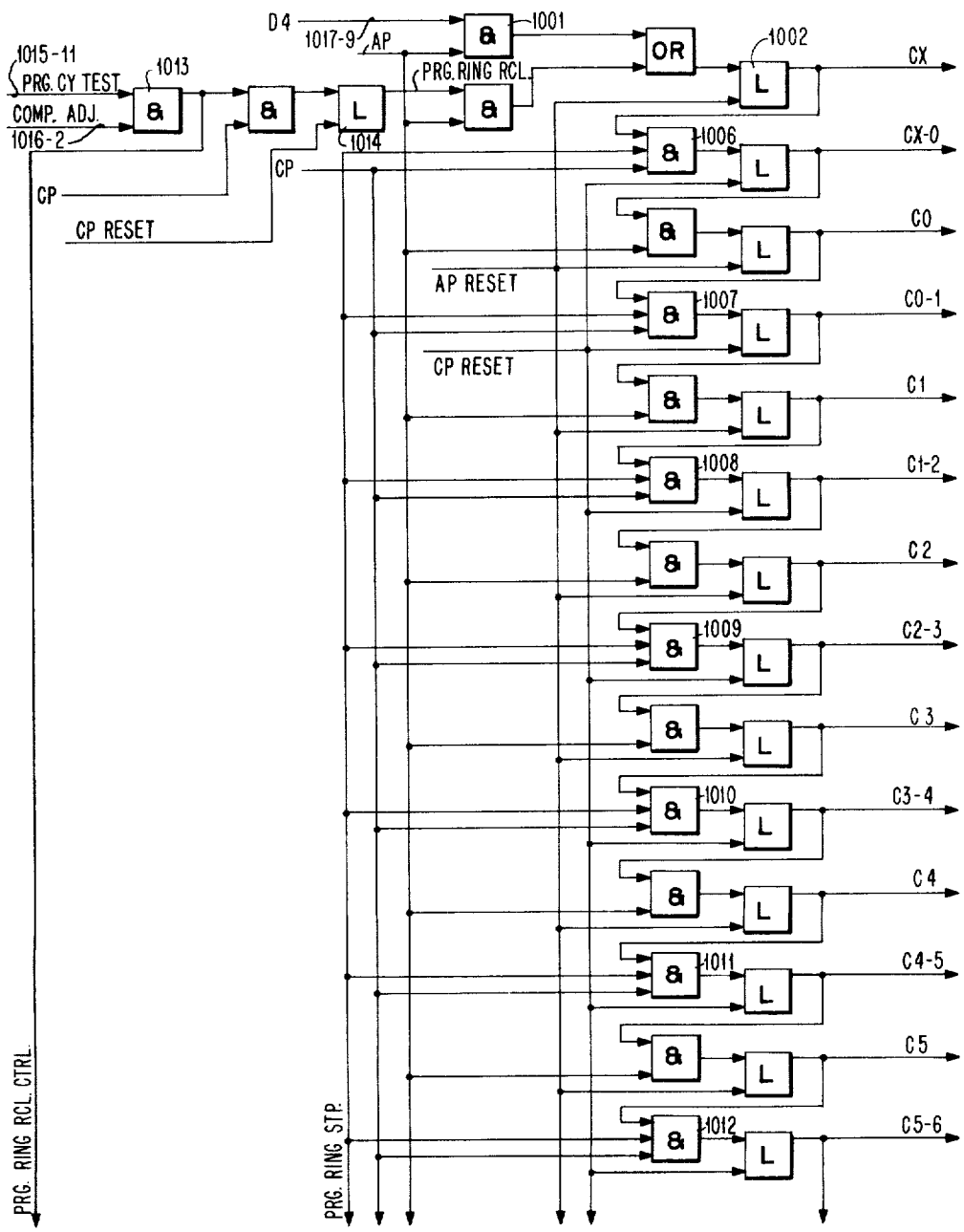
Figure 10B:
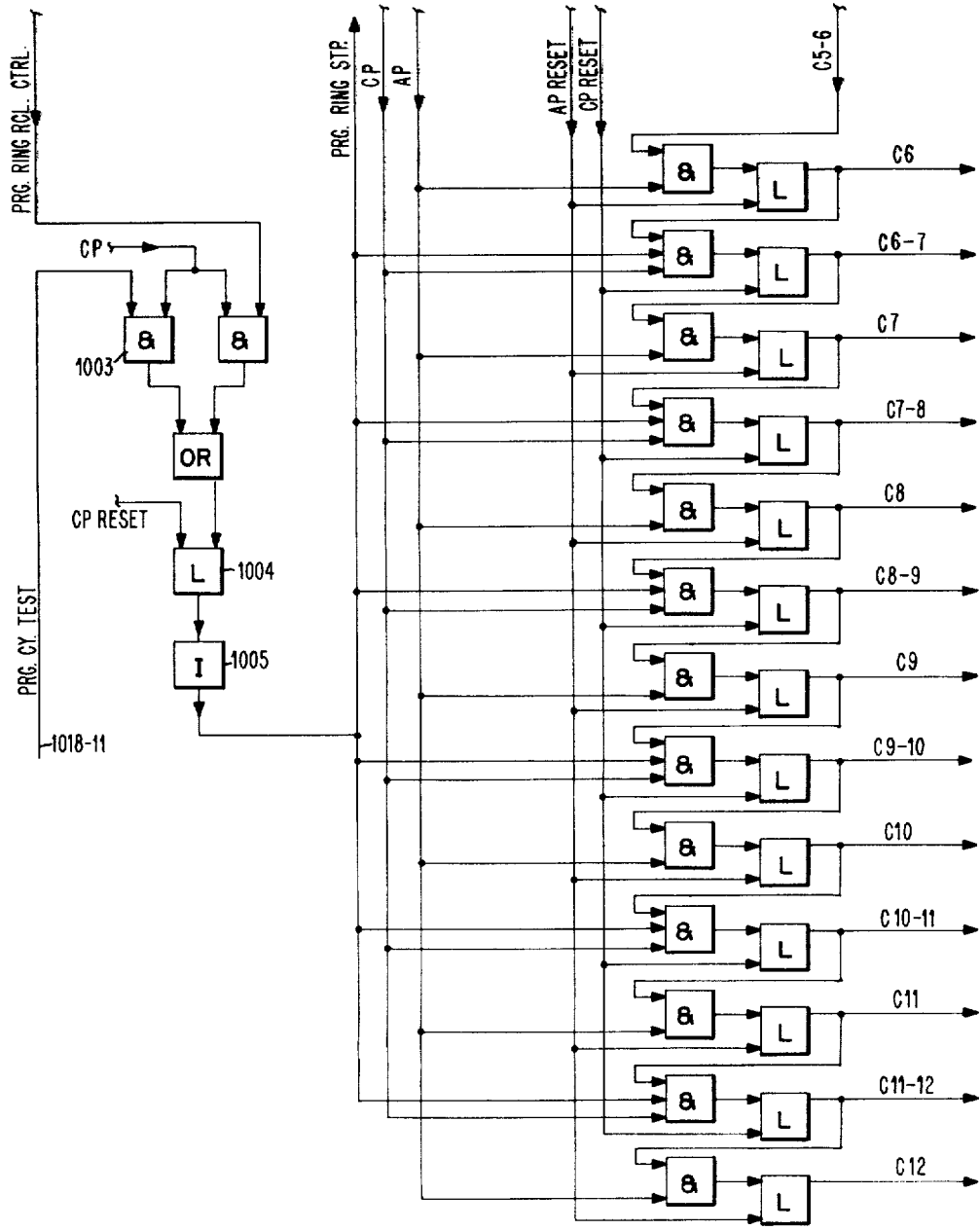
Figure 12A:
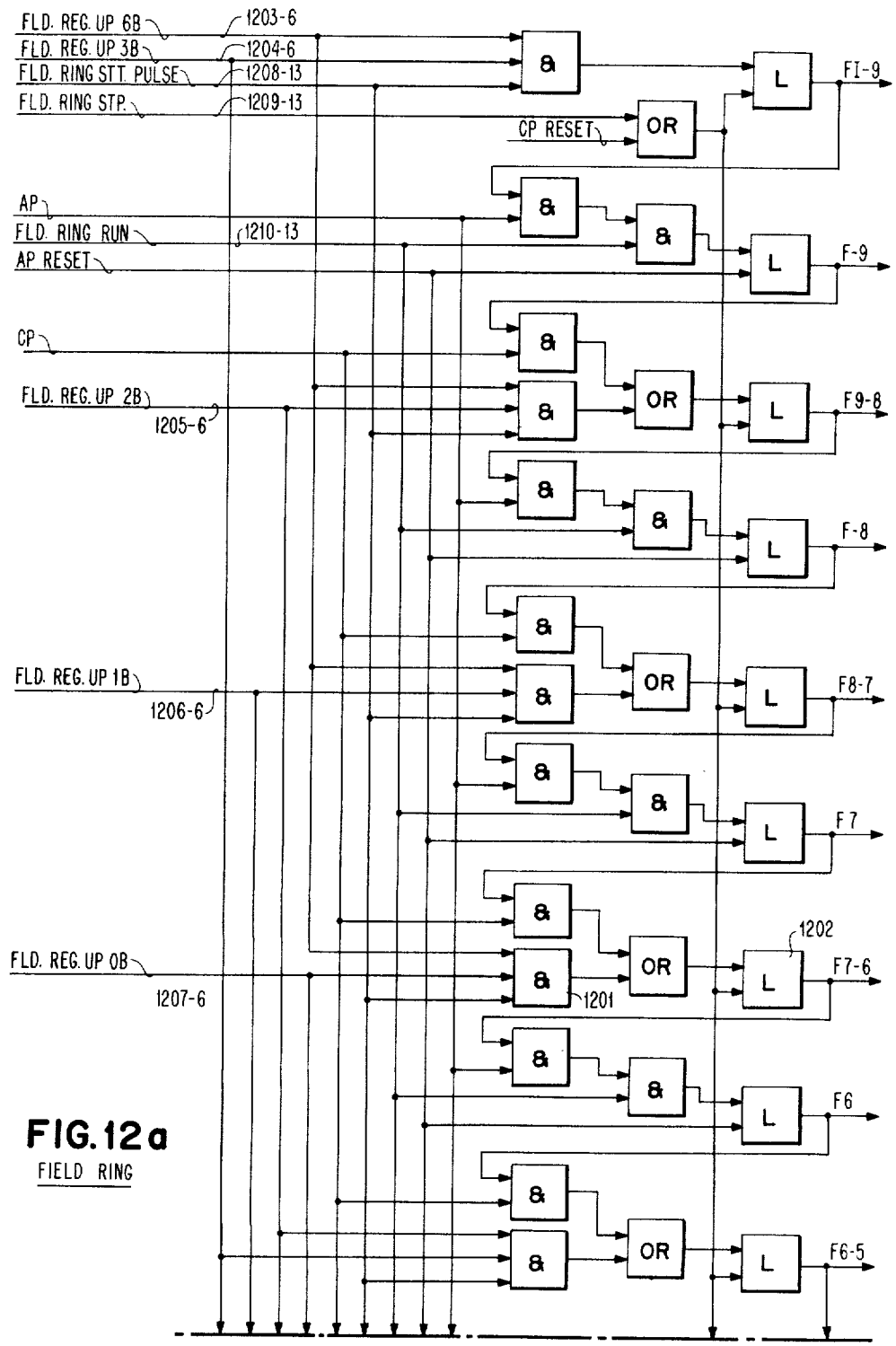
Figure 12B:
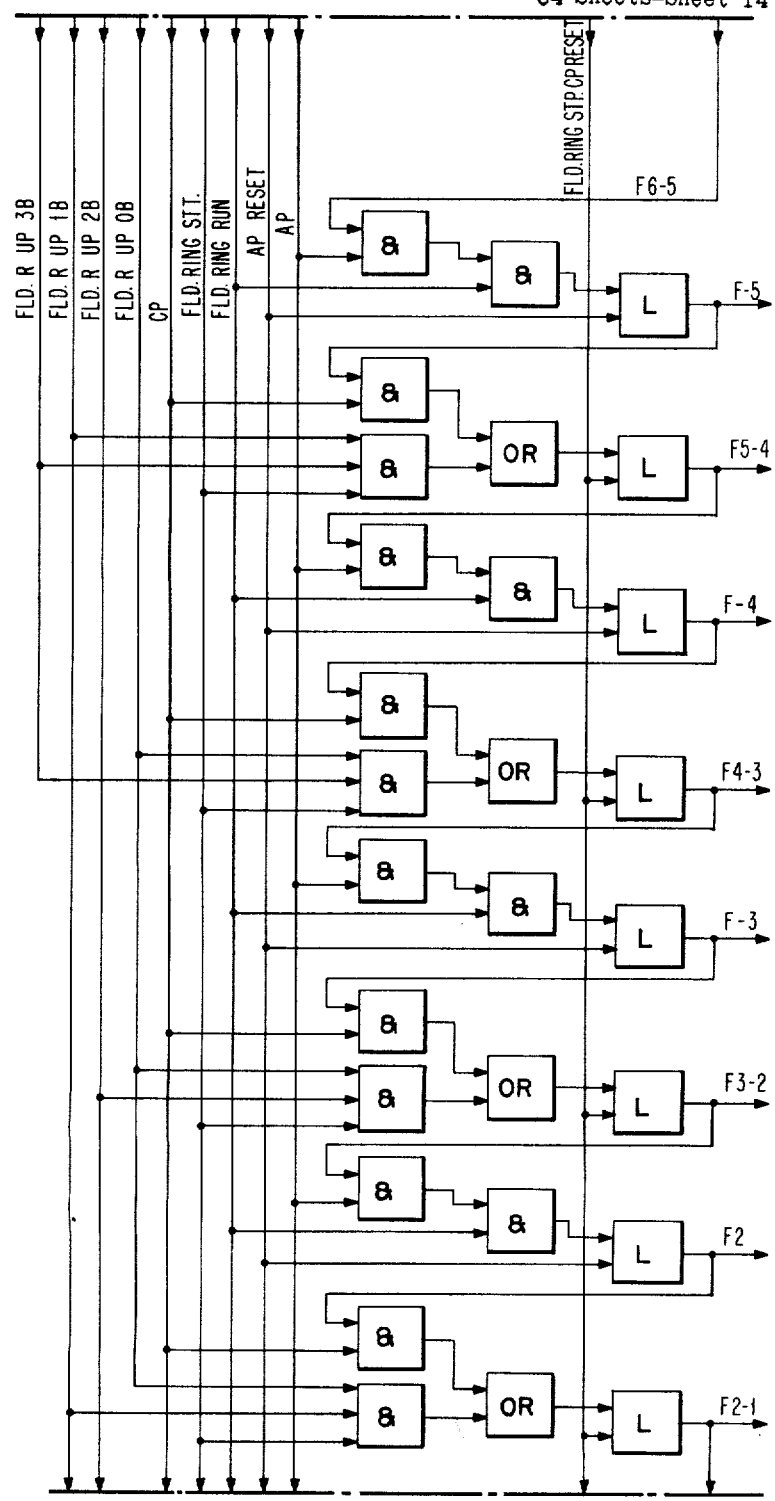
Figure 12C:
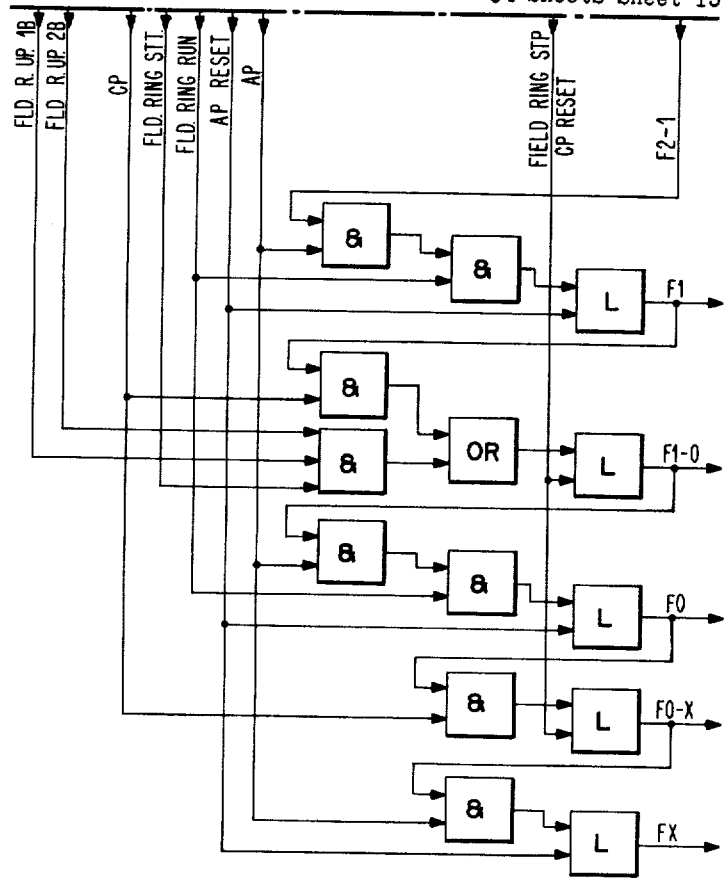
Figure 14:
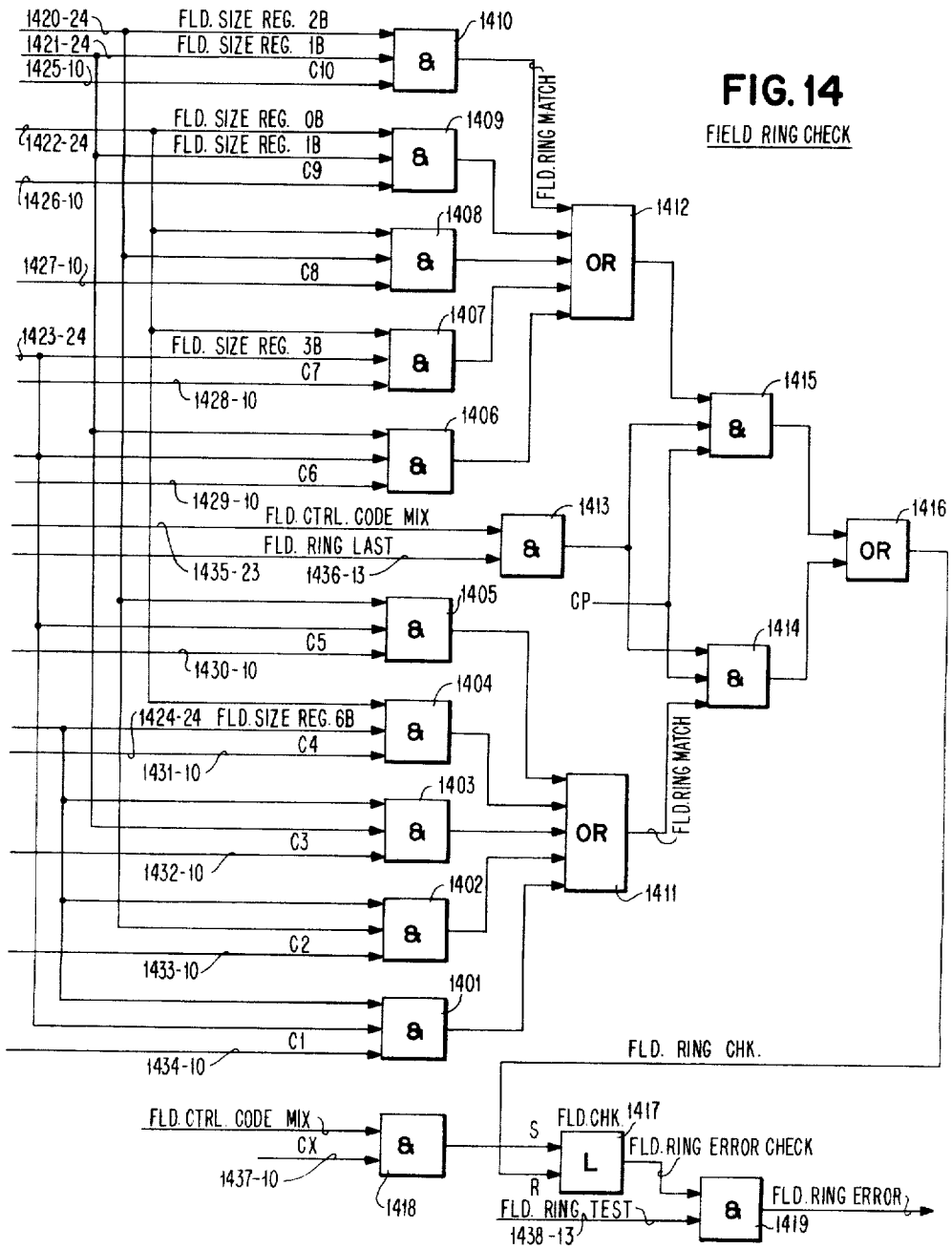
Figure 15:
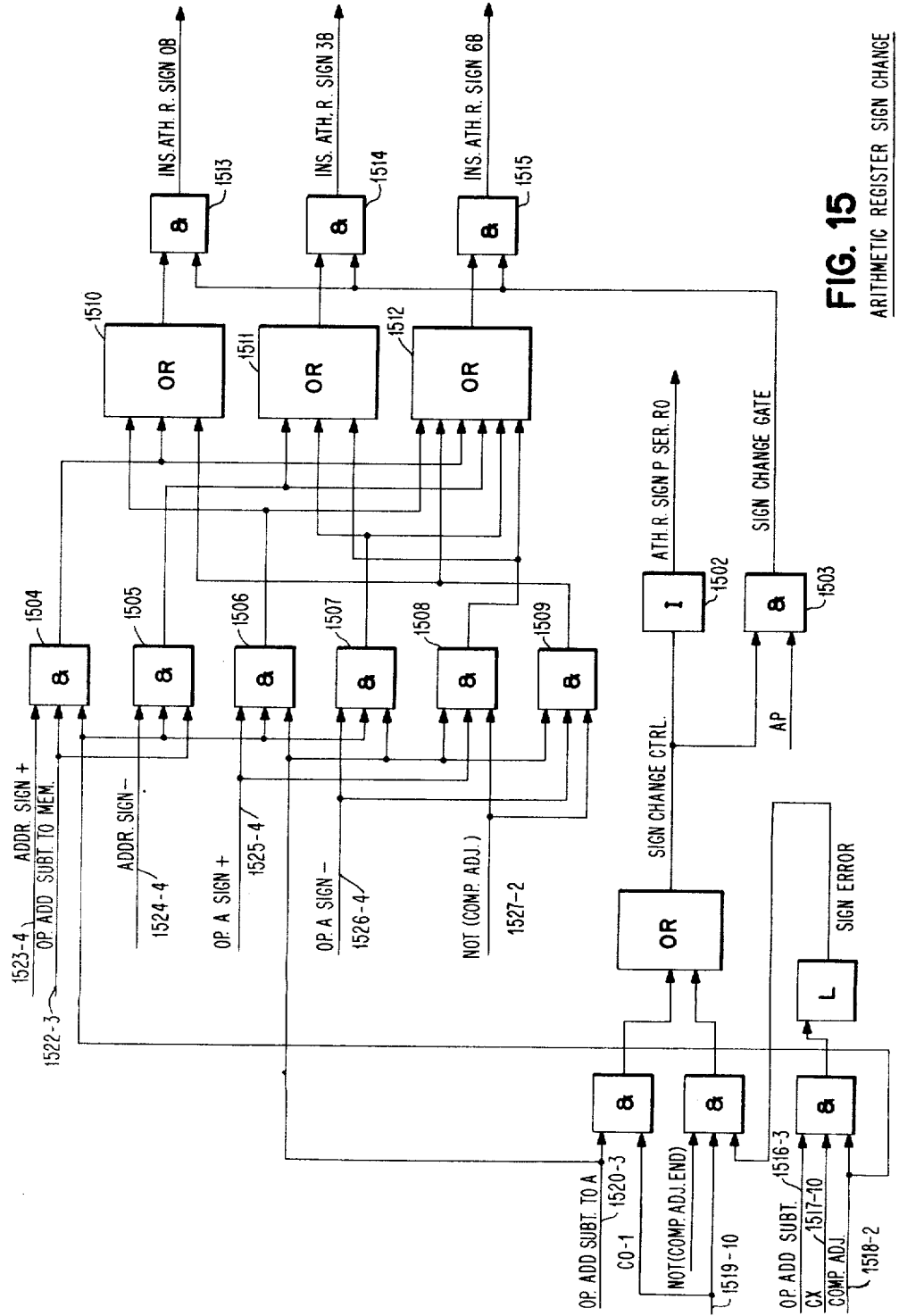
Figure 16A:
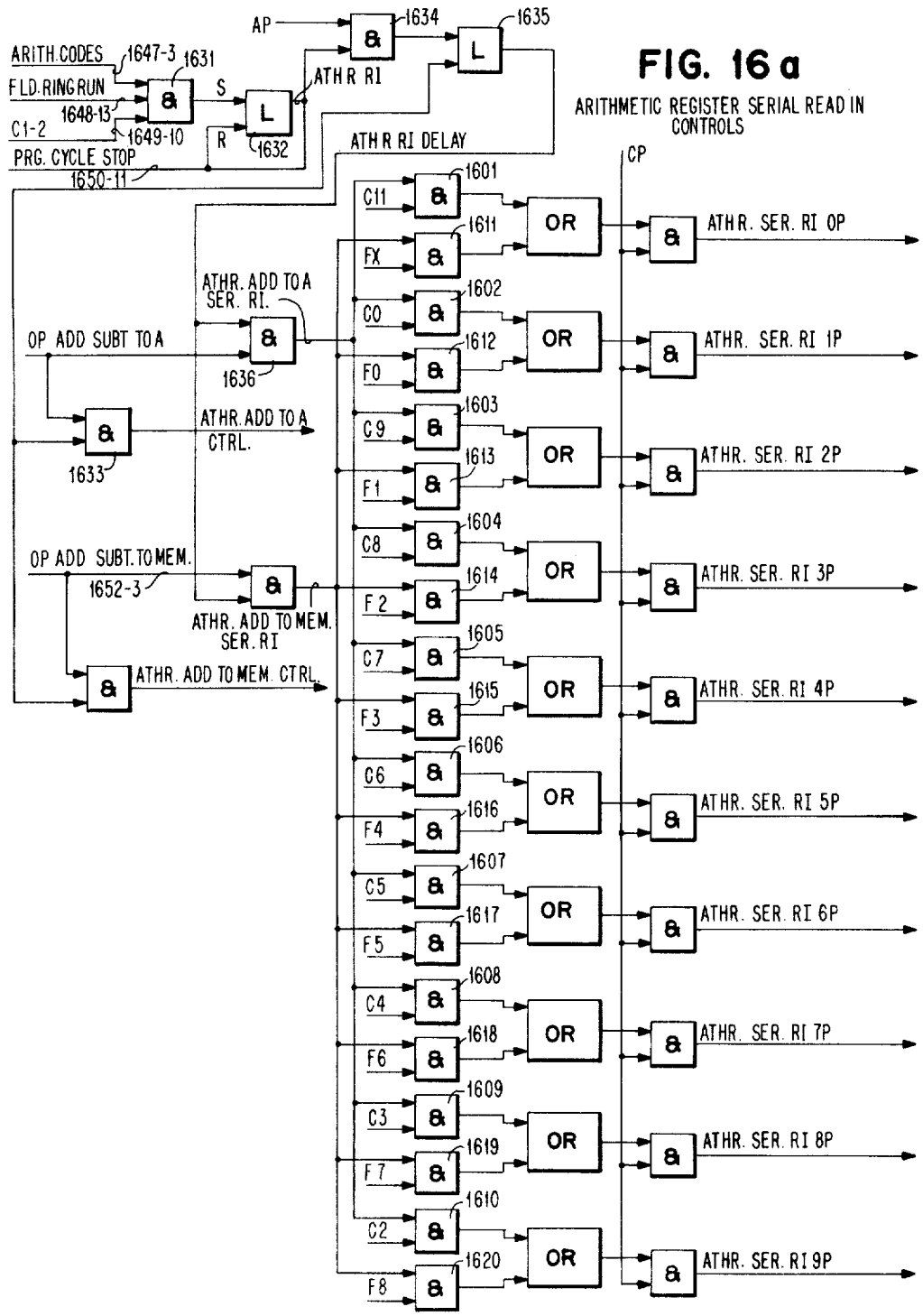
Figure 16B:
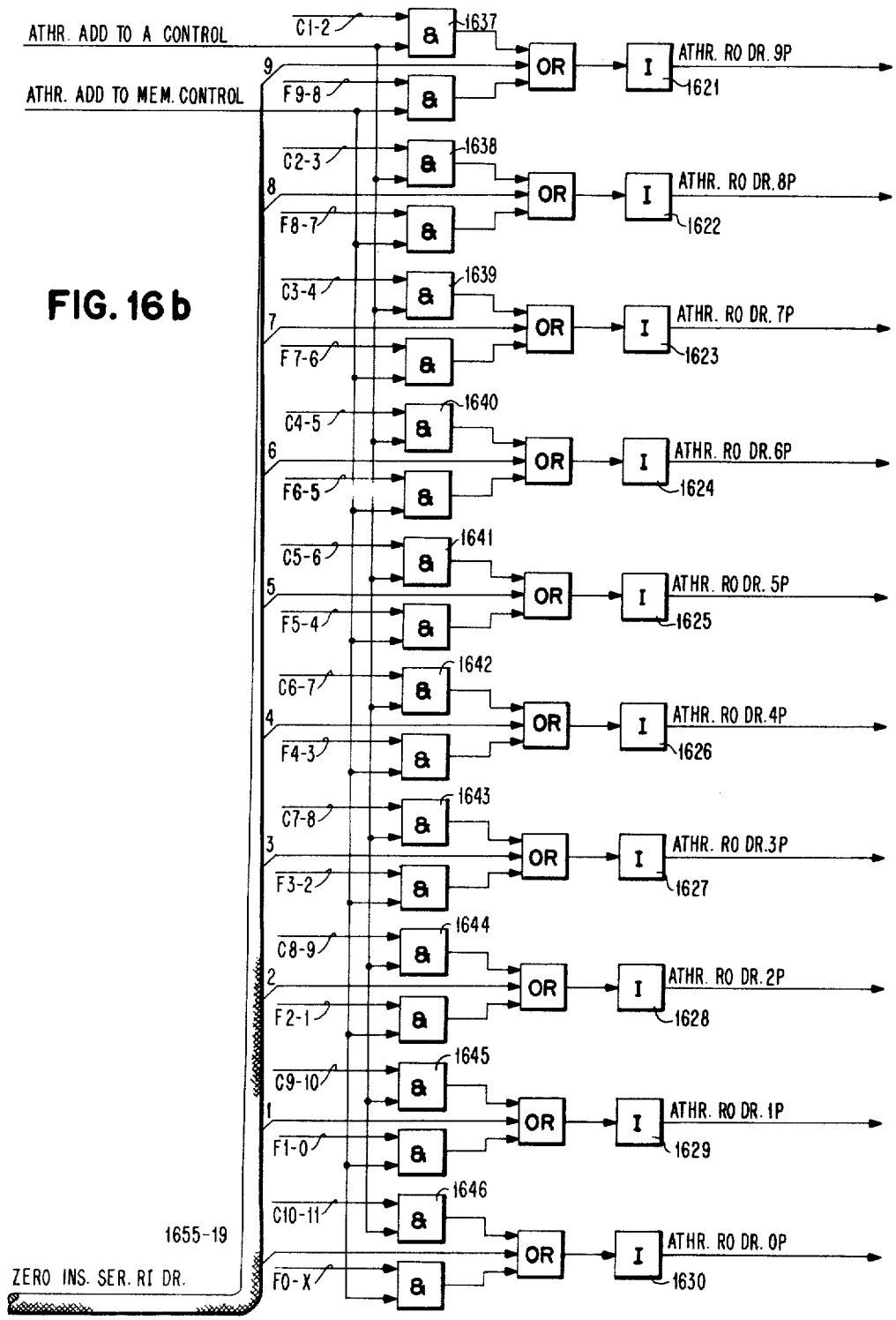
Figure 17A:
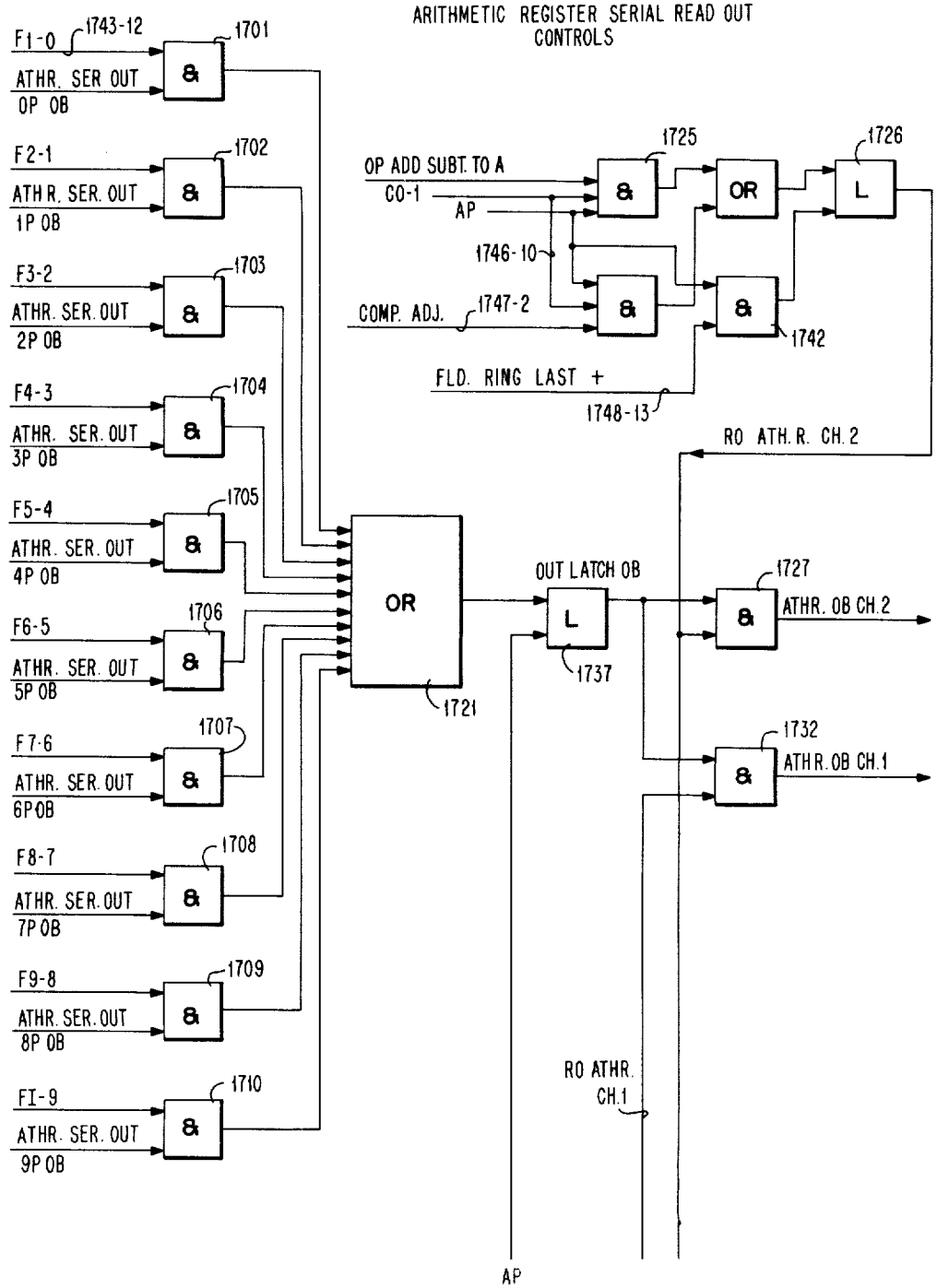
Figure 18C:
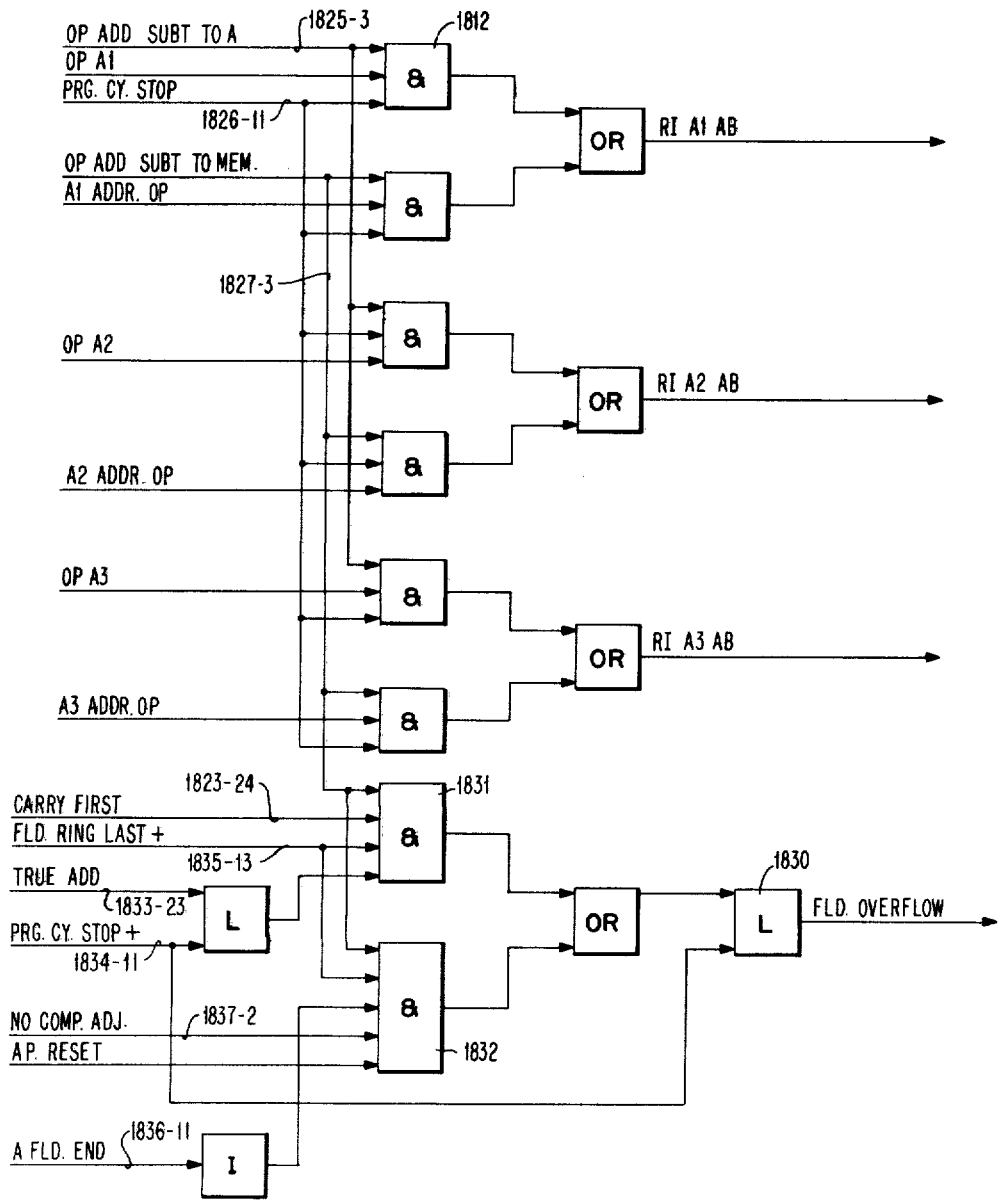
Figure 19:
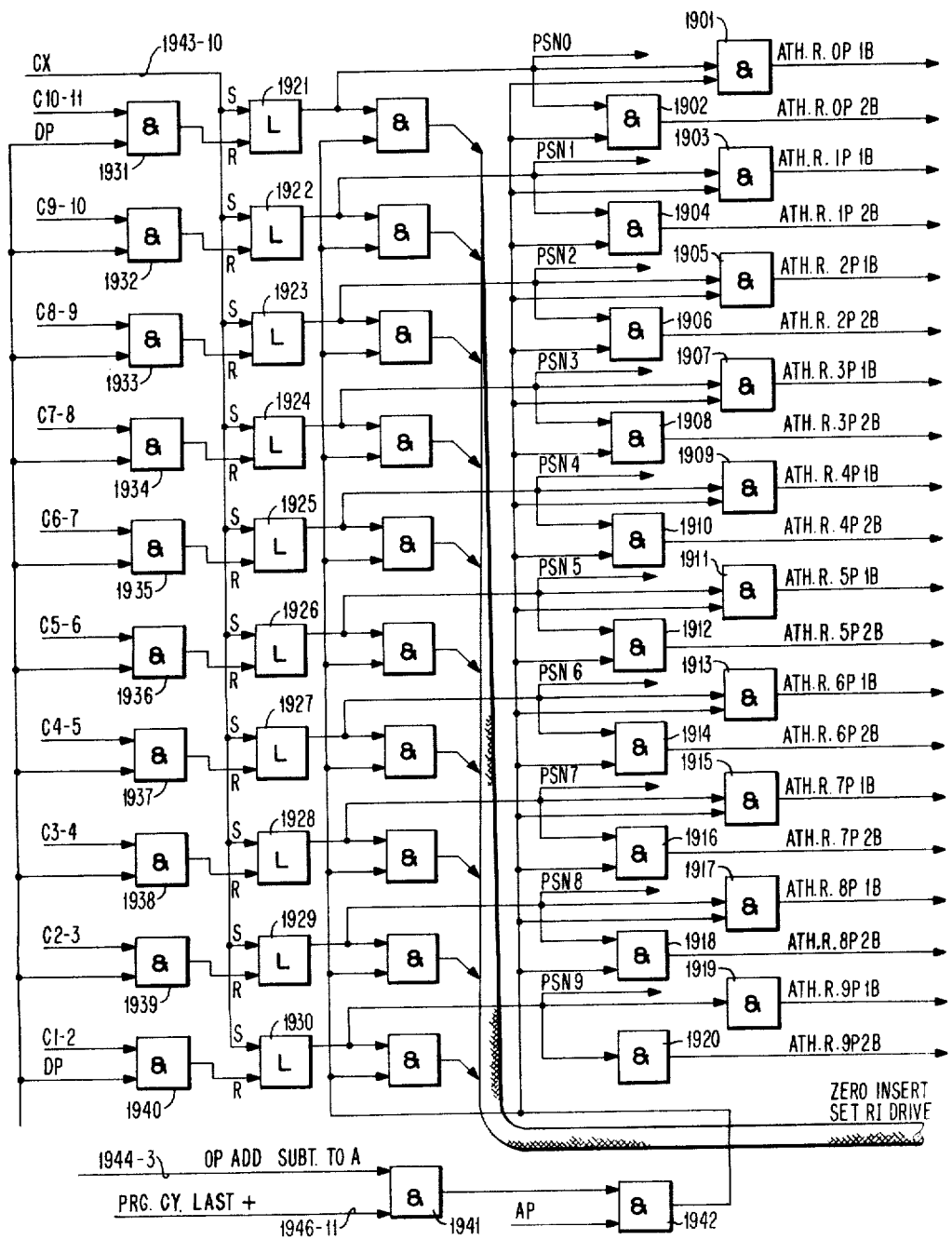
Figure 20A:
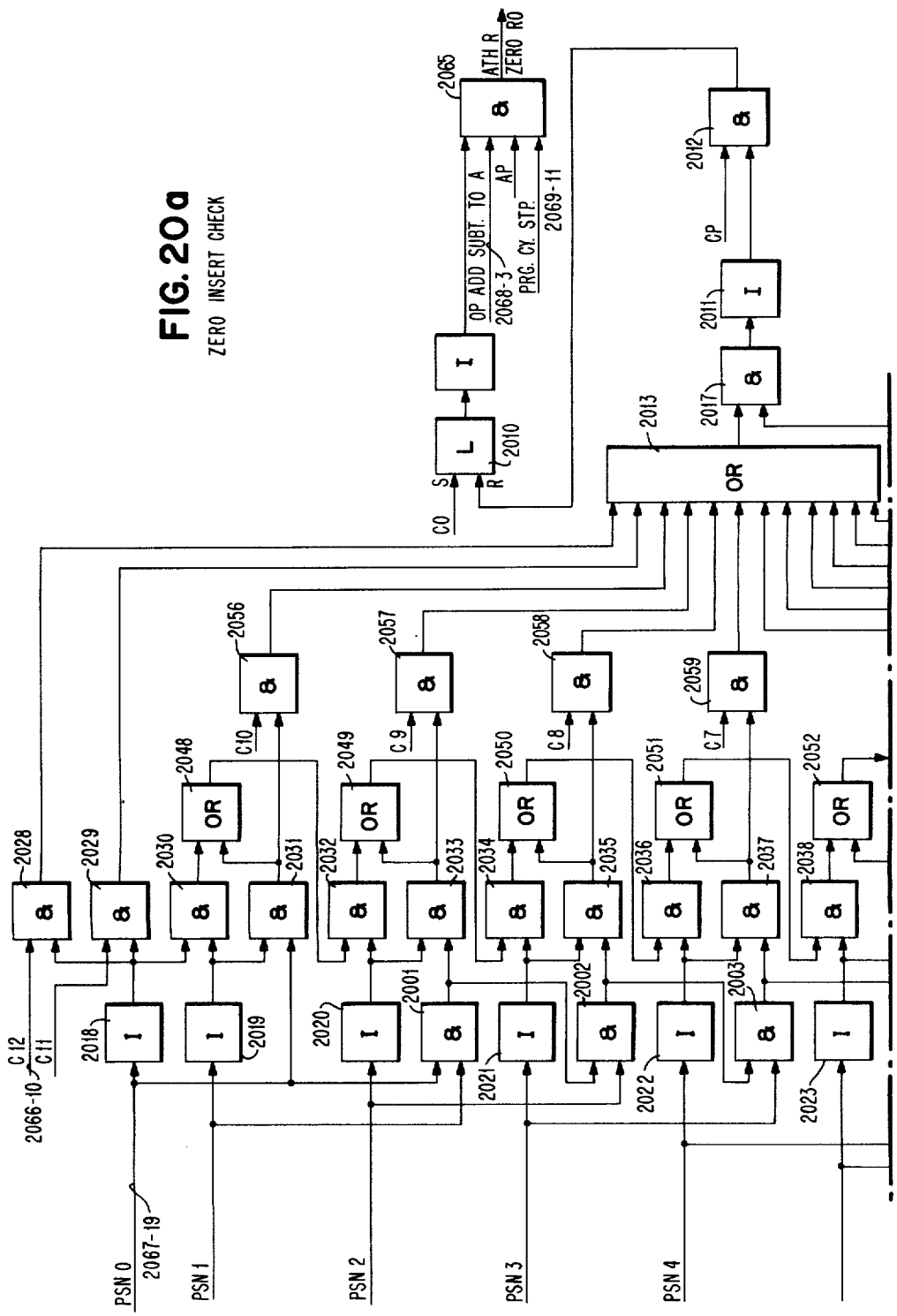
Figure 20B:
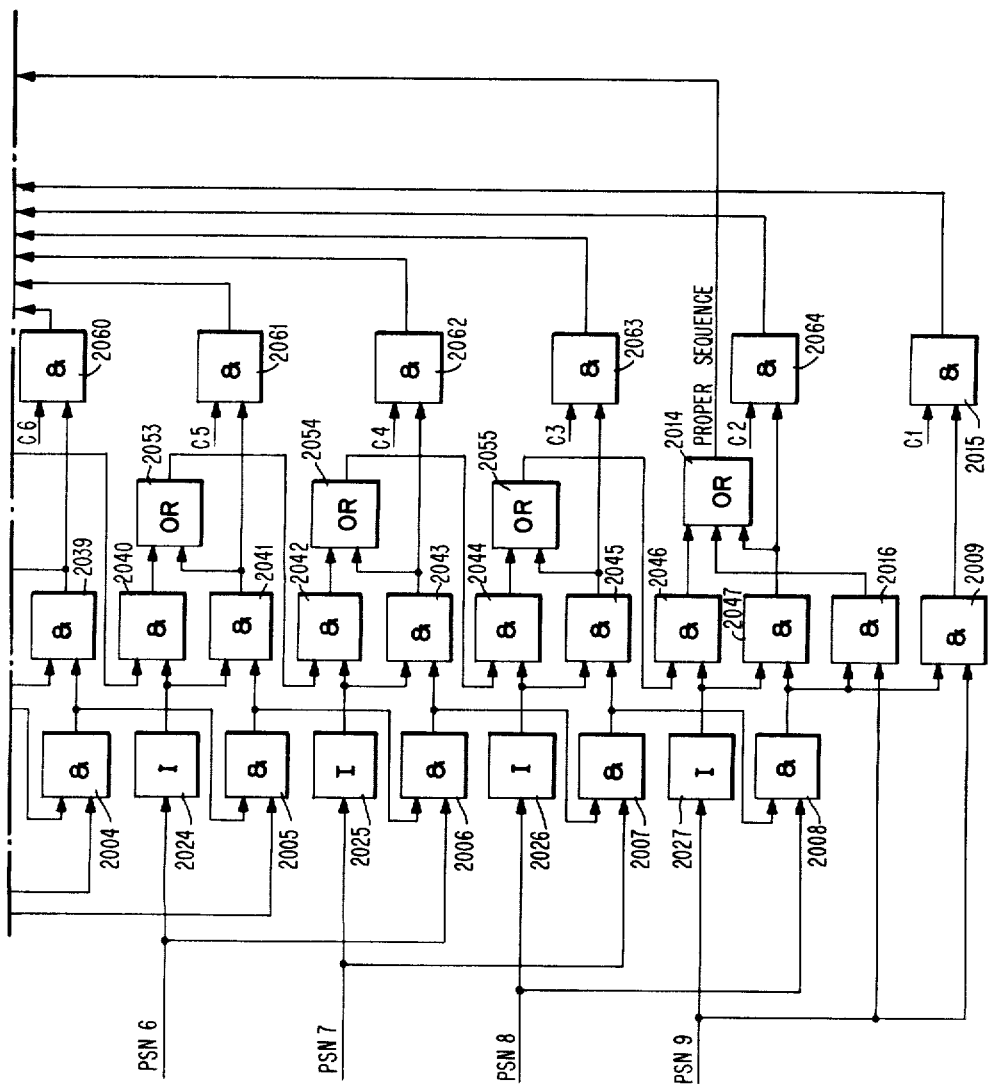
Figure 21:
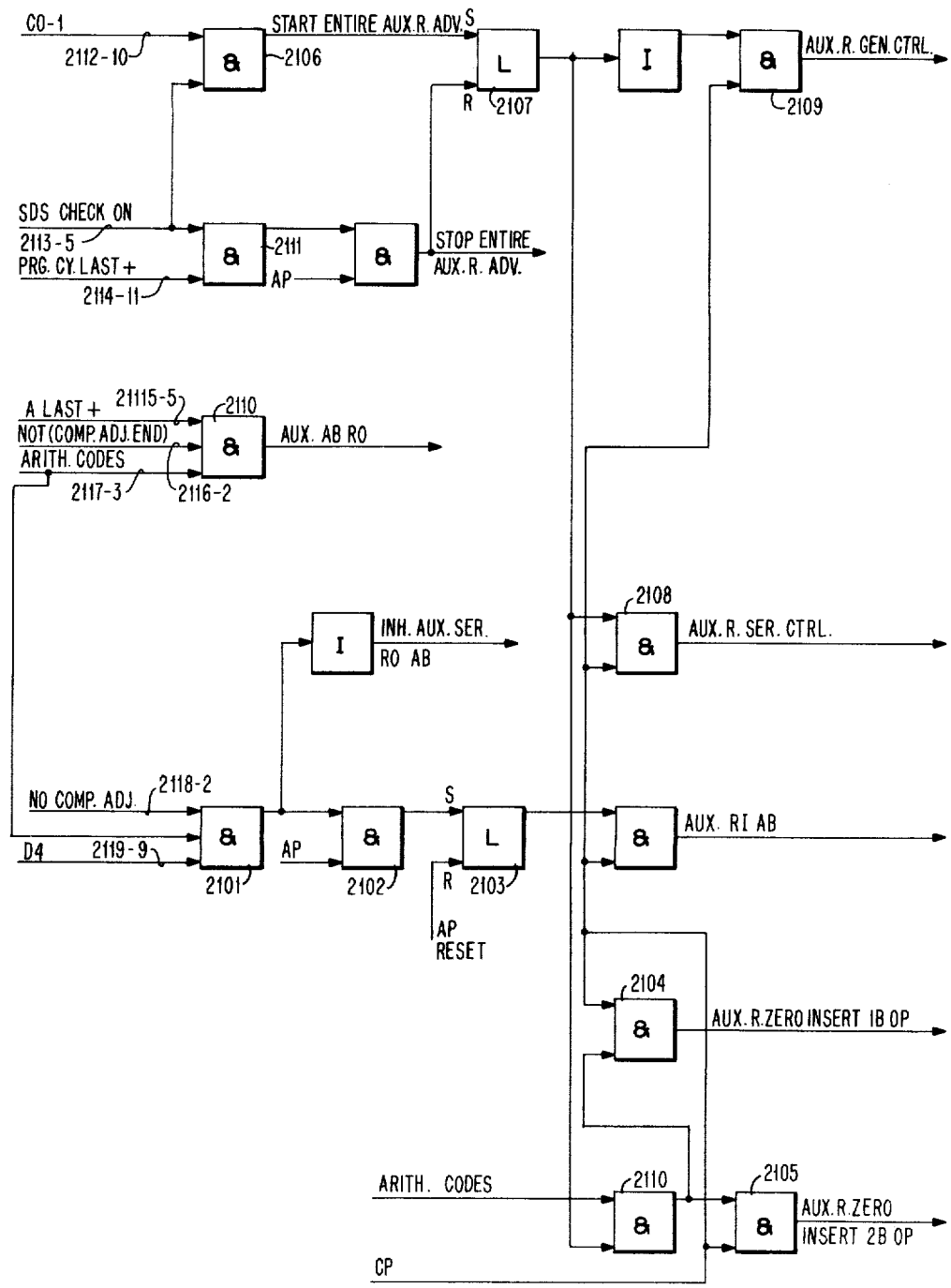
Figure 22:
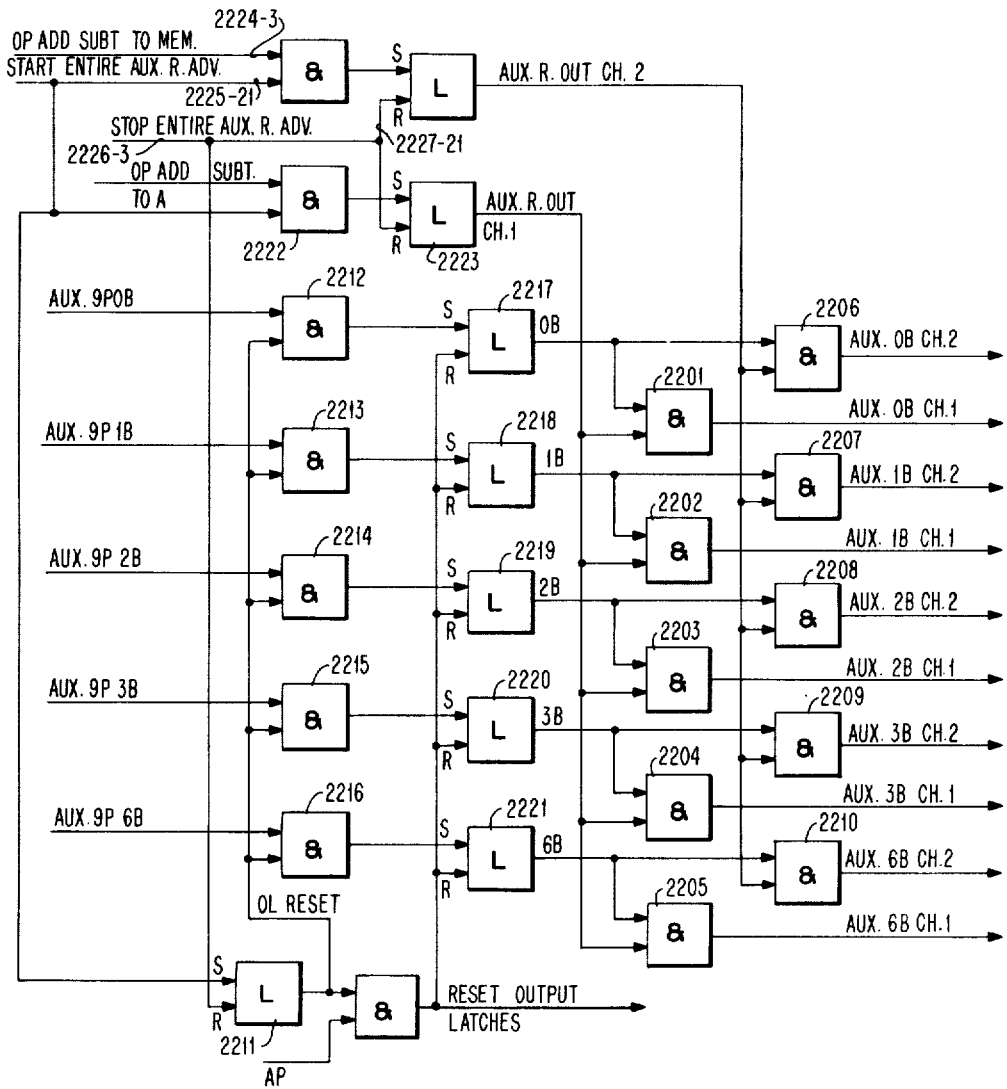
Figure 23A:
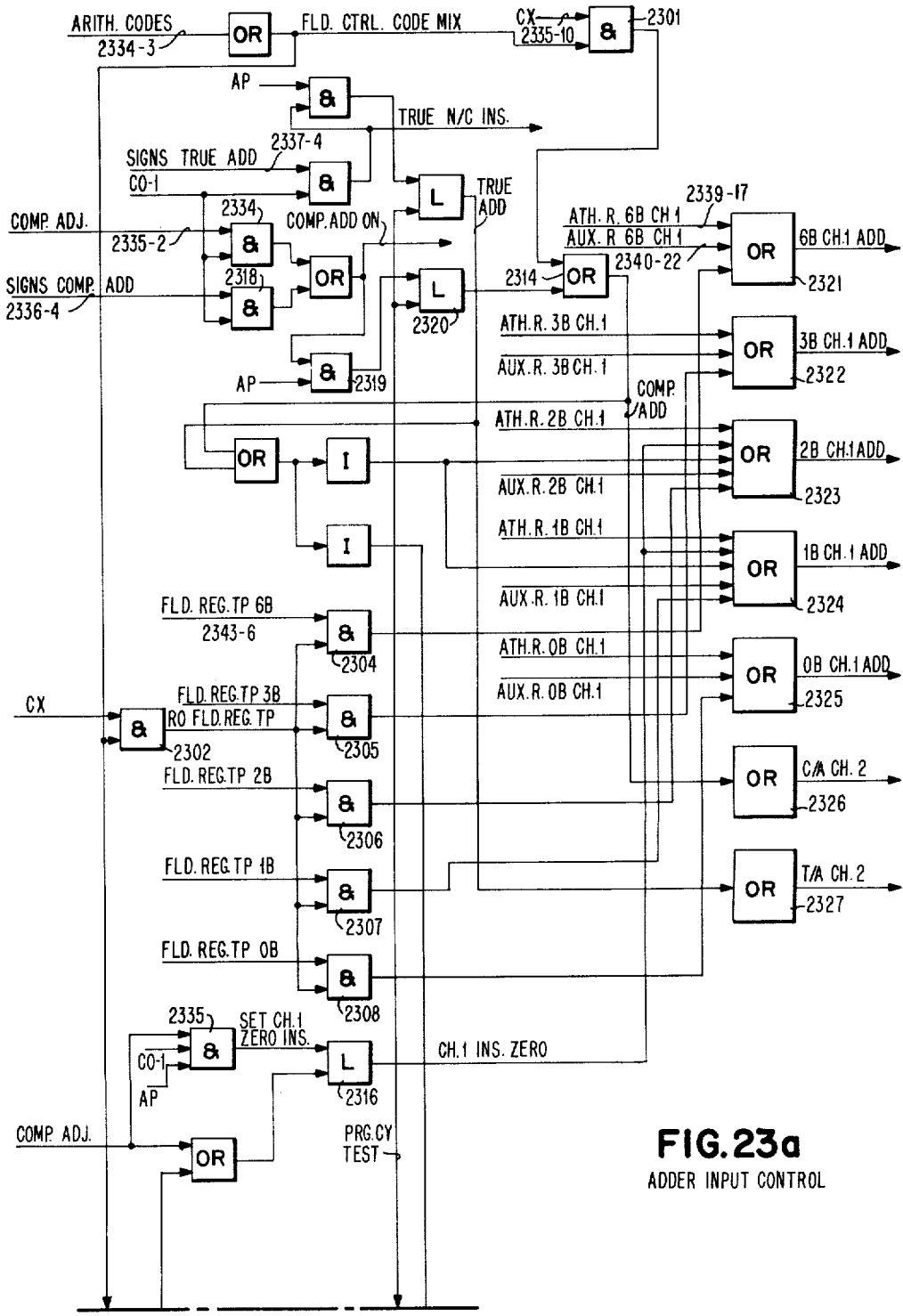
Figure 23B:
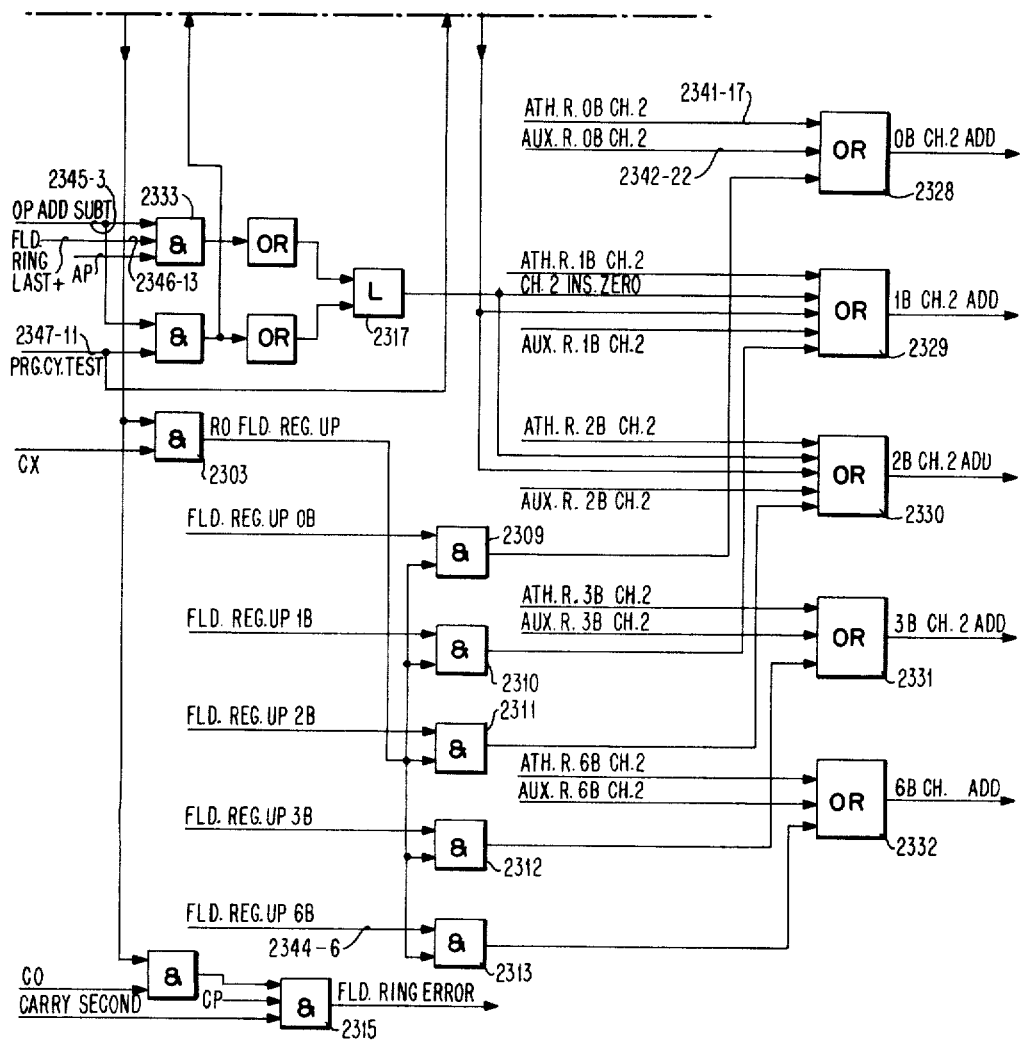
Figure 24A:
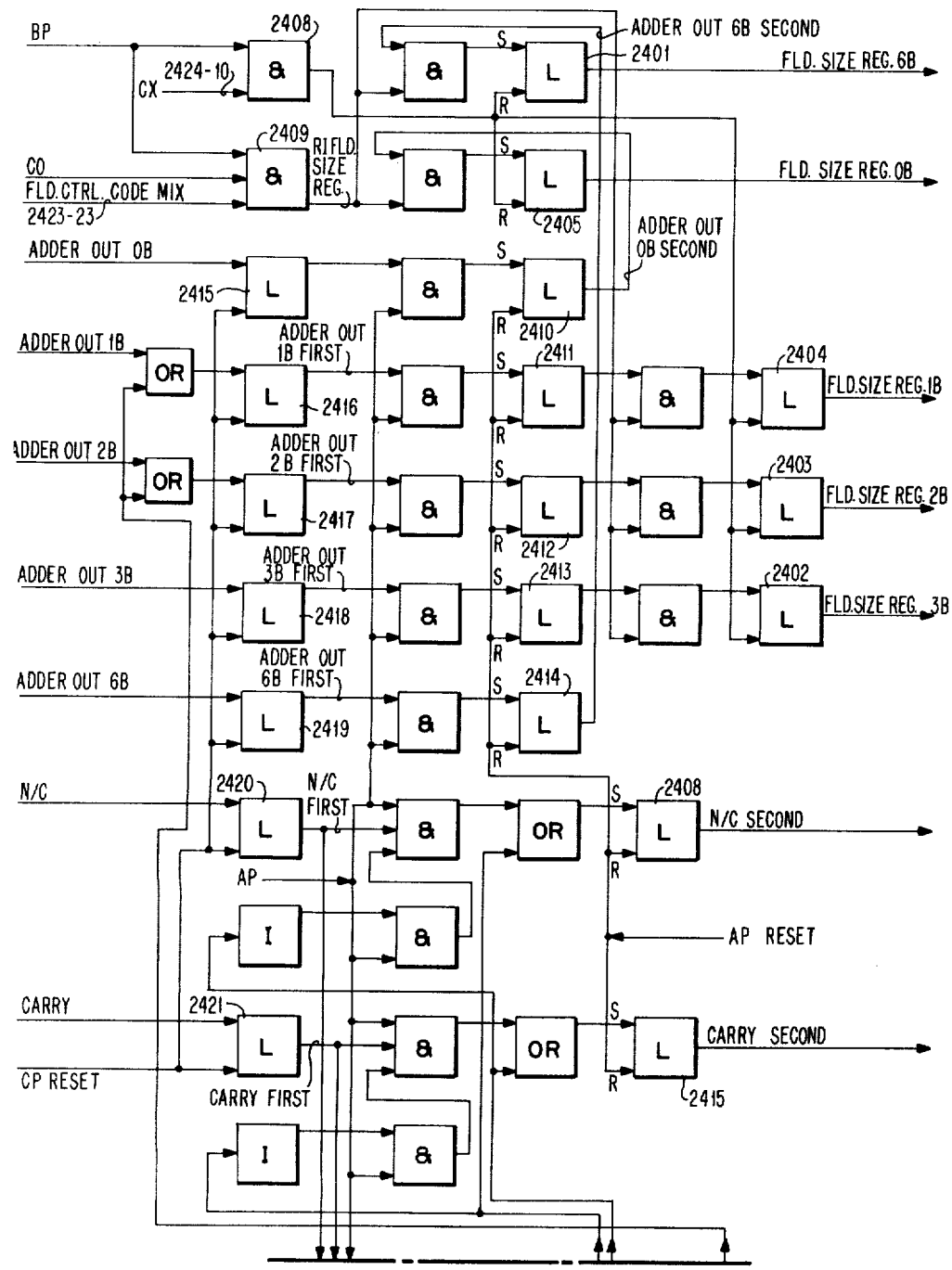
Figure 24B:
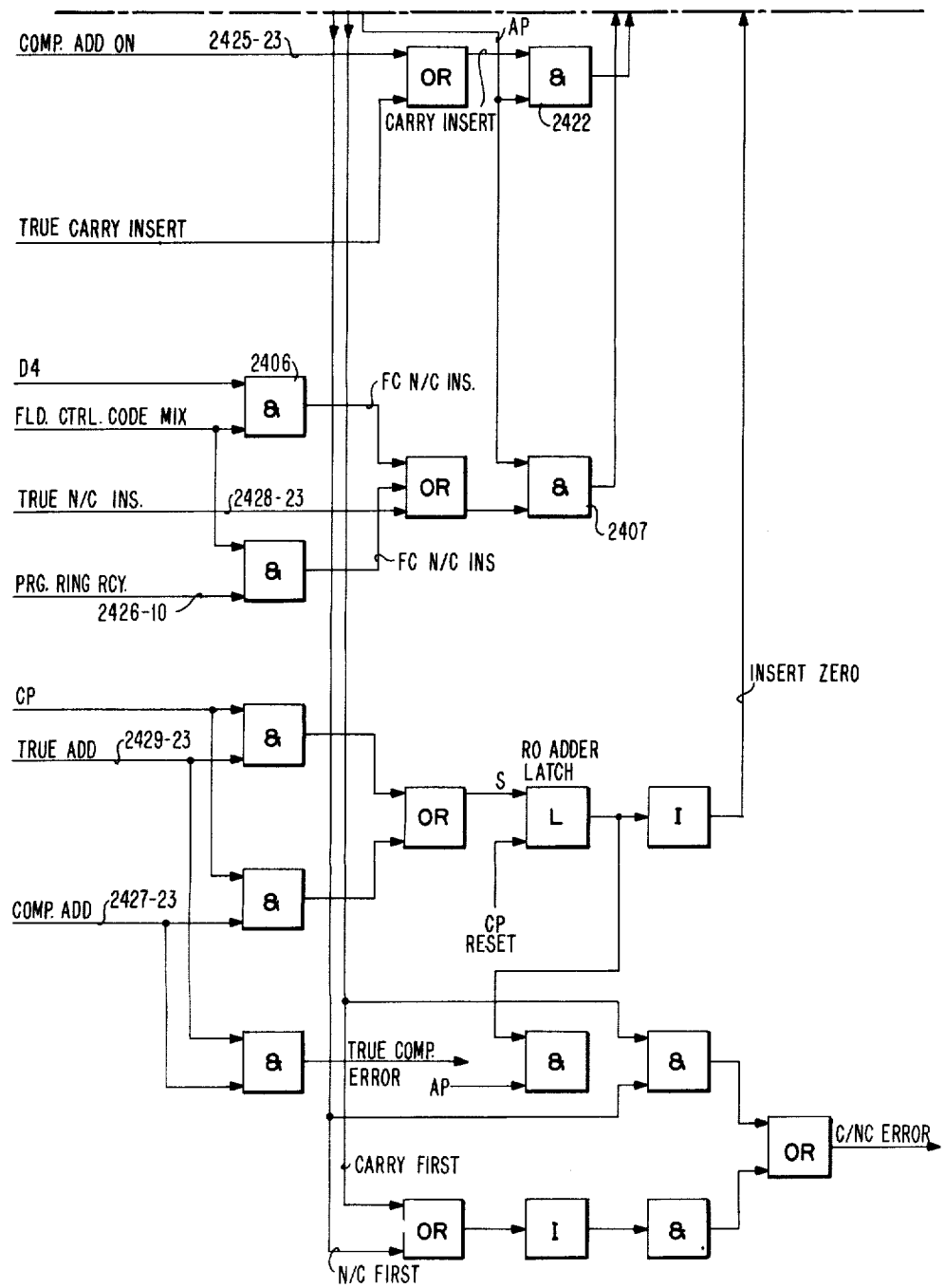

FIGURE 6 discloses a portion of the program register holding an instruction word of which that part containing the units and tens field designative digits is designated the FIELD REGISTER;

FIGURE 7 discloses means for re-setting the field portion of the program register of FIGURE 6;

FIGURE 8 discloses a latch register for holding the data address portion of an instruction word;

FIGURE 9 discloses instruction and data rings;

FIGURE 10 shows the program ring;

FIGURE 11 shows the program cycle ring;

FIGURE 12 discloses the field ring;

FIGURE 13 discloses the field match and field cycle ring circuits;

FIGURE 14 discloses the field ring check circuits;

FIGURE 15 shows the arithmetic register sign change circuits;

FIGURES 16a and 16b disclose the arithmetic register serial read-in controls;

FIGURES 17a and 17b disclose the arithmetic register read-out controls;

FIGURES 18a, 18b and 18c disclose other controls for the arithmetic and accumulator registers;

FIGURE 19 discloses the arithmetic register zero insert latches;

FIGURES 20a and 20b disclose the zero insert check circuits;

FIGURE 21 shows the auxiliary register controls;

FIGURE 22 discloses the read-out gates for the auxiliary register;

FIGURES 23a and 23b show the adder input control circuits;

FIGURES 24a and 24b disclose the adder output circuits and field size register; and FIGURE 25 shows certain basic timing diagrams.

Each circuit component in the figures of the drawings is numbered beginning with a digit or digits corresponding to the number of the figure in which it appears. Furthermore, the digit or digits to the right of a hyphen in a number indicate the figure in which a signal is generated.

Figure 1:
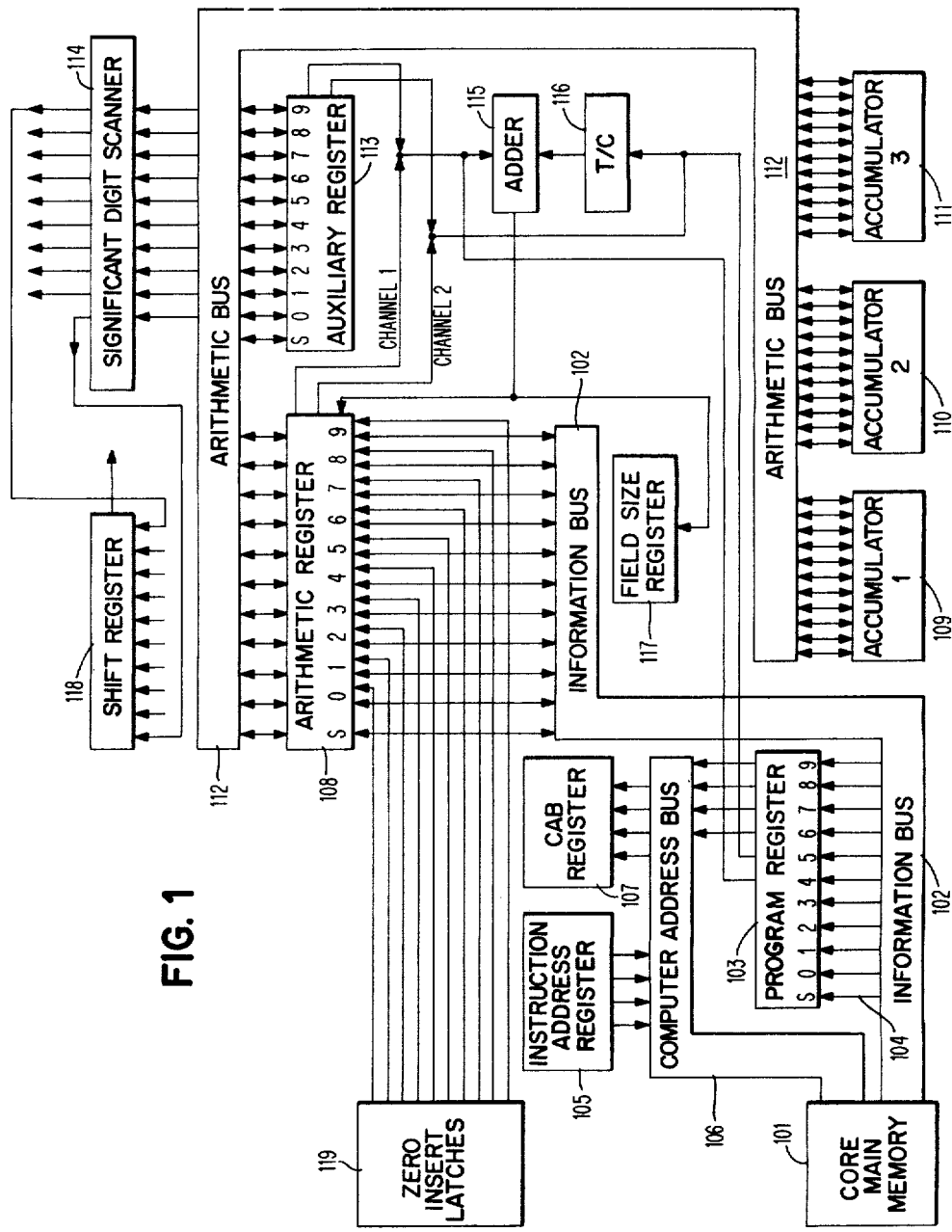
FIGURE 1 is a block diagram of the general information flow within the data processing system of the present invention.

Referring first to FIGURE 1, the data information flow throughout the system of the present invention will now be described. The present embodiment utilizes a "2 out of 5" code to represent decimal and sign characters of both data and instruction words. This means that only two bits out of five bits available are used to represent each of ten decimal digits and three sign characters. This code has the advantage that the presence of other than two bits per character indicates that an error has occurred. Table I below shows the 2 out of 5 code combinations which are used to signify each of these thirteen characters.

Table I

|   | 0 | 1 | 2 | 3 | 6 |
|---|---|---|---|---|---|
| 0 |   |   | X | X |   |
| 1 | X | X |   |   |   |
| 2 | X |   | X |   |   |
| 3 | X |   |   | X |   |
| 4 |   | X |   | X |   |
| 5 |   |   | X | X |   |
| 6 | X |   |   |   | X |
| 7 |   | X |   |   | X |
| 8 |   |   | X |   | X |
| 9 |   |   |   | X | X |
| + |   |   |   | X | X |
| − | X |   |   |   | X |
| a | X |   |   | X |   |

It will be noted in Table I above that "zero" is represented by two coded bits 1 and 2, and not by the absence of bits completely. Furthermore, the sign position character *a* causes the system to interpret the decimal digits in pairs, rather than singly, with said pairs of digits representing alphabetic and other special characters. However, the alphabetic operation of the system does not form a part of the present invention.

In the present embodiment, each data word transferred throughout the system is fixed in length and comprises ten decimal characters and a sign character, thus making a total of eleven characters in all. The main MEMORY 101 can store approximately 10,000 of these eleven-digit words therein, with each word at a unique storage address location which is specified by a four-digit address number. Each word is read out of memory or into memory parallel by character and parallel by bit. Thus, since each decimal character position in a word requires five bit conductors, and the sign character position requires three bit conductors, MEMORY 101 must have $10 \times 5 + 1 \times 3 = 53$ input and output bit conductors to perform this completely parallel operation. Thus a random access memory is required in the present embodiment which may be a magnetic core array or the like. Such memories, together with their addressing circuits, are well known in the art and their details do not form a part of this invention.

In the well known manner of digital computing systems, the present embodiment of the invention utilizes a stored program having instruction words which are retrieved from a storage location MEMORY 101 in order to control the computer in its operations. The instruction format of the present system is as given below:

*Instruction word format*

|   | Sign | OP Code | | Index Mod. | | Field length | | Data Address | | | |
|---|---|---|---|---|---|---|---|---|---|---|---|
| Character Position No. | S | 0 | 1 | 2 | 3 | 4 | 5 | 6 | 7 | 8 | 9 |

As noted above, the instruction word also contains ten decimal character positions plus a sign character. The sign character occupies position S, while positions 0 and 1 of the instruction word specify the operation code, hereinafter referred to as OP code. Positions 2 and 3 are occupied by index modification digits, and positions 4 and 5 (hereinafter called FIELD REGISTER) contain the field designating digits. Positions 6 through 9 are occupied by data address digits. The significance of each character in the instruction word will be subsequently described.

The instruction words are also stored in MEMORY 101 and are transferred therefrom via the INFORMATION BUS 102 to a PROGRAM REGISTER 103. This transfer is done parallel by character and parallel by bit. Thus, the INFORMATION BUS 102 contains 53 conductors so as to be able to transfer simultaneously all eleven digits of an instruction word. The eleven CONDUCTORS 104 shown leading from the INFORMATION BUS to the PROGRAM REGISTER each represents a channel for a decimal character or a sign character which is inserted into positions S, 0 through 9 of the PROGRAM REGISTER. The particular address in MEMORY 101 at which an instruction word is stored is held in the INSTRUCTION ADDRESS REGISTER 105 and comprises a total of four decimal digits. The instruction address at the beginning of each program cycle is transferred from REGISTER 105 via a COMPUTER ADDRESS BUS 106 to MEMORY 101 in order to select this specific word storage position. The instruction address in REGISTER 105 is then changed by means not shown and not part of this invention so as to select a different instruction storage location for the next program operation.

Once an instruction word has been placed within the PROGRAM REGISTER, the four data address digits found in positions 6 through 9 are read out via COMPUTER ADDRESS BUS 106 to MEMORY 101. These digits may select a storage location therein in which one of the eleven-digit data operand words may be found. This operand may be transferred via INFORMATION BUS 102 to an ARITHMETIC REGISTER 108 in completely parallel fashion as was the instruction word. Information may be also transferred from the ARITHMETIC REGISTER in parallel fashion via INFORMATION BUS 102 back into the main memory.

A series of ACCUMULATOR REGISTERS 109, 110, and 111 are provided which may hold one or both of the eleven-digit data operands to be processed during the course of an instruction. The contents of one of these three ACCUMULATORS (Nos. 1, 2, and 3) may be selected and transferred in completely parallel fashion via an ARITHMETIC BUS 112 to an AUXILIARY REGISTER 113. This particular operand word is also sent to a SIGNIFICANT DIGIT SCANNER 114 which determines the position in which the most significant digit of that operand is located. The ARITHMETIC REGISTER 108 may alternatively be filled with a data operand word from one of the ACCUMULATORS 109, 110, 111 via ARITHMETIC BUS 112 instead of being filled with a word from main memory via the information bus. Thus it should be appreciated that both data operands, which are transferred into the ARITHMETIC REGISTER 108 and AUXILIARY REGISTER 113, are always fixed length eleven-digit words. Within any of the data word registers shown in FIGURE 1, position 9 contains the least significant digit of the word, while position S contains the sign of the word.

ARITHMETIC REGISTER 108, ACCUMULATORS 109, 110, 111, and AUXILIARY REGISTER 113 in the present embodiment each comprises five magnetic core storage stages per character position, the details of which do not comprise part of the present invention. A typical core storage stage and several typical registers are completely disclosed in copending U.S. application Serial No. 862,919, filed December 30, 1959, which is hereby incorporated by reference into the present disclosure. The details of the SIGNIFICANT DIGIT SCANNER 114 are also disclosed in copending U.S. application Serial No. 862,907, filed December 30, 1959, now U.S. Patent No. 3,067,335, issued December 4, 1962, which is hereby incorporated by reference.

Upon insertion of one operand in the ARITHMETIC REGISTER and the other operand in the AUXILIARY REGISTER, the two may be operated upon by ADDER 115. Addition, for example, is performed serially digit-by-digit, parallel by bit, with the least significant digits of the operands being added first. The sum digits, as they emerge serially from ADDER 115, are transferred back into the ARITHMETIC REGISTER 108 and replace certain of the operand digits therein. It may be necessary to take the 9's complement of the information appearing on channel 2 to the adder by means of the TRUE-COMPLEMENT gates 116.

In the instruction word, the sign digit position indicates the nature of the arithmetic operation to be performed, which for the purpose of the present invention, may be either an add (+) or subtract (—) operation to be performed with two data operand words. The OP code digit found in position 0 of the instruction word (which can also be considered as the tens position of the OP code), indicates from which of the three ACCUMULATORS 109, 110, 111 an operand is to be withdrawn in order to be placed within AUXILIARY REGISTER 113. The value of this particular OP code tens position digit may be either 1, 2, or 3 for purposes of the present invention. The other OP code digit found in position 1 of the instruction word (which can also be considered as the units position of the OP code), indicates, for purposes of the present invention, (1) whether the operand held in ARITHMETIC REGISTER 108 is to be added to (or subtracted from) the operand held in AUXILIARY REGISTER 113, or (2) whether the operand held in AUXILIARY REGISTER 113 is to be added to (or subtracted from) the operand held in ARITHMETIC REGISTER 108. In the former operation (1), which is indicated by the digit 4 in the units position of the OP code and which is given the generic term of ADD TO ACC, the operand word held in AUXILIARY REGISTER 113 is sent to ADDER 115 via CHANNEL 1, while the operand held in ARITHMETIC REGISTER 108 is sent to ADDER 115 via CHANNEL 2 and therefore may be complemented. The result from ADDER 115 is placed back into the ARITHMETIC REGISTER, is then trans-ferred to the ACCUMULATOR No. 1, 2, or 3 which is designated by the digit in the tens position of the OP code. If the digit 8 is located in the units position of the OP code, then the latter operation (2) is performed. This operation is given the generic term of ADD TO MEM. In such a case, the operand word held in ARITHMETIC REGISTER 108 is transferred to ADDER 115 via CHANNEL 1, while the operand from AUXILIARY REGISTER 113 is transferred to the ADDER via CHANNEL 2. The sum, after being placed back in the ARITHMETIC REGISTER from the ADDER, is then transferred to the storage location from which the operand placed in the ARITHMETIC REGISTER was originally taken. As will be subsequently described, this storage location can either be in MEMORY 101 or it can be one of the ACCUMULATORS 109, 110, or 111.

The two index modification digits in positions 2 and 3 of the instruction word can require that the data address digits of the instruction word be modified. However, this operation is not within the scope of this invention and so will not be described in any further detail.

The two field designating digits located in positions 4 and 5 of the instruction word indicate the locations of certain digits of the operand held in ARITHMETIC REGISTER 108 which field is to be actually used in the arithmetic process. The digit in position 5 of the instruction word (which can also be considered as the units position of the field length), indicates the order of the ARITHMETIC REGISTER which contains the least significant digit of the field. The digit in position 4 of the instruction word (which can also be considered as the tens position of the field length), indicates the order of the ARITHMETIC REGISTER which contains the highest order digit of the field. Although a fixed length eleven-digit word is always transferred to the ARITHMETIC REGISTER, only those digits which occupy the positions between and inclusive of the two positions indicated by the field length digits of the instruction word will actually be withdrawn from the ARITHMETIC REGISTER and sent to ADDER 115. Thus, if the field length digits of the instruction word are 37, the digit 7 indicates that the first digit to be actually withdrawn from ARITHMETIC REGISTER 108 for use in ADDER 115 will come from position 7 in the ARITHMETIC REGISTER and will be the least significant digit of the field. The digits actually withdrawn from the ARITHMETIC REGISTER for use at ADDER 115 will be those occupying positions 7, 6, 5, 4, and 3, in that order, a total of five. Those digits occupying positions not within this defined field will not be withdrawn from, or moved within the ARITHMETIC REGISTER, for use in ADDER 115. In this way, a portion only of the operand residing in ARITHMETIC REGISTER 108 is moved and selectively taken from that register for use in combining with the operand located in AUXILIARY REGISTER 113. However, it is to be noted that in transferring an operand word to and from the ARITHMETIC REGISTER from one of the addressable storage locations or to one of the addressable storage locations, a complete fixed length ten-digit word plus the sign digit is involved. Thus, the present invention combines certain advantages of fixed word length operation in transmission, together with other advantages of variable length word operation. For example, two different instructions may specify two different non-overlapping fields within the same eleven-character fixed length word. Each field could then be interpreted as a different variable length word.

The four data address digits occupying positions 6 through 9 of the instruction word represent either a particular storage location in the main MEMORY 101 from which an operand is to be sent to ARITHMETIC REGISTER 108, or it may refer to one of the three ACCUMULATORS 109, 110, or 111 from which this ARITHMETIC REGISTER operand is to be taken. As before noted, the operand placed in the AUXILIARY REGIS- TER 113 is indicated by the tens position of the OP code portion of the instruction word.

The function of the other circuits shown in FIGURE 1 will become apparent during the following general description of the data flow during the two operations ADD TO ACC and ADD to MEM.

The operation, for example, of the + or − 14 (ADD TO ACC) code is to add the contents of a memory location (memory locations are any storage locations in the machine which is addressable, be it magnetic core storage 101 or another ACCUMULATOR 109, 110, or 111) to the contents of the specified ACCUMULATOR 109 (No. 1), and upon the completion of the operation return the result to the ACCUMULATOR No. 1 as specified by the tens position digit 1 in OP code. The general data flow for this operation is as follows:

The data operand word in the operated ACCUMULATOR 1 (the accumulator specified by the tens position digit of the OP portion of the instruction) is transferred via ARITHMETIC BUS 112 to the AUXILIARY REGISTER 113. During the time that the data is on the ARITHMETIC BUS, the SIGNIFICANT DIGIT SCANNER 114 is caused to read in from the AB and the position of the SIGNIFICANT DIGIT SCANNER corresponding to the highest order significant digit of the data on the AB at that time is set.

The data operand from memory, as specified by the four data address digits of the instruction word, may be taken from either a core address location, in which case it is transferred to the ARITHMETIC REGISTER 103 via the INFORMATION BUS 102, or it may be taken from another ACCUMULATOR No. 1, 2, or 3. If the data is from another accumulator, it is transferred to the ARITHMETIC REGISTER via the ARITHMETIC BUS during the digit time following the transfer of ACCUMULATOR 1 to the AUXILIARY REGISTER.

The units position of the FIELD REGISTER (positions 4 and 5 of the PROGRAM REGISTER hold corresponding tens and units digits of the field) is read to the CHANNEL 2 of ADDER 115 and the 9's complement thereof is taken by T/C gate 116. The tens position of the FIELD REGISTER is read to the CHANNEL 1 input of the ADDER. The sum of the 9's complement of the units position digit and the true value of the tens position digit is placed in the FIELD SIZE REGISTER 117 and represents the 10's complement of the number of digits in the field of the ARITHMETIC REGISTER which are to be added to the contents of the AUXILIARY REGISTER. This operation initially checks the validity of the field length digits, and the computed field size is used later on as a check of the operation of the FIELD RING.

Immediately following the read-in of the SIGNIFICANT DIGIT SCANNER 114 from the ARITHMETIC BUS during the transfer of data from the ACCUMULATOR 1 to the AUXILIARY REGISTER, the indication stored in the SIGNIFICANT DIGIT SCANNER is transferred to the SINGLE CORE SHIFT REGISTER 118 in the corresponding position to that of the SIGNIFICANT DIGIT SCANNER, and represents the location of the highest order significant digit of the data operand word now in the AUXILIARY REGISTER. The construction of the SHIFT REGISTER 118 is similar to that of the AUXILIARY REGISTER, except that it contains only one bit storage location per position.

At this point certain true or complement add latches are turned on under control of the sign of the instruction word together with the signs of the two operands to control the addition or subtraction of the operands, as the case may be. The units position of the FIELD REGISTER is read out to start a FIELD RING (not shown in FIGURE 1), which in turn will sequentially scan out the digits in the ARITHMETIC REGISTER, beginning with the least significant digit of the field, to CHANNEL 2 and subsequently to the ADDER 115. A PROGRAM RING (not shown in FIGURE 1), concurrently reads out the significant digits in sequence from the AUXILIARY REGISTER to CHANNEL 1, beginning with position 9 of that register. The serial output of the ADDER, representing the sum or difference of the numbers in the AUXILIARY REGISTER and in the ARITHMETIC REGISTER, is inserted in the ARITHMETIC REGISTER beginning at its position 9 (except with ADD TO MEM, described later) under control of the PROGRAM RING. As the data is scanned out of the AUXILIARY REGISTER, the single bit in the SINGLE CORE SHIFT REGISTER 118 is advanced position by position with this readout. As the bit representing the position of the highest order significant digit of the operand in AUXILIARY REGISTER 113 is read out of position 9 of the SINGLE CORE SHIFT REGISTER, it signals the end of the operand in the AUXILIARY REGISTER. Concurrently, the FIELD RING positions are being switched against the digit in the tens position of the FIELD REGISTER, and upon a match of the FIELD RING position with this FIELD REGISTER tens digit, the end of the ARITHMETIC REGISTER field is signaled. When both these two end signals exist, the ADDER operation is terminated.

At the beginning of the ARITHMETIC REGISTER readout to ADDER operation, LATCHES 119 are set on. These latches are associated with each position 0–9 of the ARITHMETIC REGISTER to control zero inserting at the end of the arithmetic operation. These latches are sequentially reset off as the various positions of the ARITHMETIC REGISTER were read in from the ADDER OUTPUT. At the end of the ADDER operation, the LATCHES 119 left in their set condition represent those high order positions of the ARITHMETIC REGISTER into which zeros are then inserted in order to completely erase any digits of the original data word which were not replaced by sum digits from the ADDER. It should therefore be appreciated that the ten decimal digits now held in the ARITHMETIC REGISTER comprise the sum (or difference) of the two original operands.

After the significant digits have been read from the AUXILIARY REGISTER, its contents are read out in completely parallel fashion to the ARITHMETIC BUS, and the SIGNIFICANT DIGIT SCANNER is again caused to read in. If, after this operation, the SIGNIFICANT DIGIT SCANNER indicates a significant digit in any position of the data in the AUXILIARY REGISTER, an error is signaled indicating a machine failure. Furthermore, if the result of the adding operation is the 10's complement of the desired result, then the significant digits in the ARITHMETIC REGISTER are recycled through CHANNEL 2 to the ADDER to convert the complement to the true representation, which is placed back into the ARITHMETIC REGISTER. At this point, the ARITHMETIC REGISTER is read out in parallel to ACCUMULATOR 1, whereupon a new instruction is requested.

The + or − 18 (ADD TO MEMORY) operation, as mentioned above, performs to add the contents of ACCUMULATOR 1, specified by the tens position digit of the OP portion of the instruction word, to the contents of a memory location specified by the data address portion of the instruction, and to then return the result to this memory location.

In this operation, the function of field control is to define that portion of the word in memory (and in the ARITHMETIC REGISTER) to which the contents of ACCUMULATOR 1 is to be added. Since at the end of the arithmetic operation the result is to be returned to only the defined portion of the addressed memory operand, defined by the FIELD REGISTER, obviously the number of digits in the sum should not exceed the number of digits specified for the field by the FIELD REGISTER. Should this sum exceed the field size, an error is signaled indicating a field overflow.

The data flow for the ADD TO MEM operation is generally similar to that in the previously described ADD TO ACC operation. The major difference is that the output of ADDER 115 is placed back into the ARITHMETIC REGISTER starting with the position specified by the units position digit of the FIELD REGISTER, which defines the least significant digit position of the field. This is to be contrasted with the ADD TO ACC operation where the adder output is always placed into the ARITHMETIC REGISTER starting with position 9. Thus, those digits of the original memory operand, which are not within the defined field, remain undisturbed.

Figure 2:
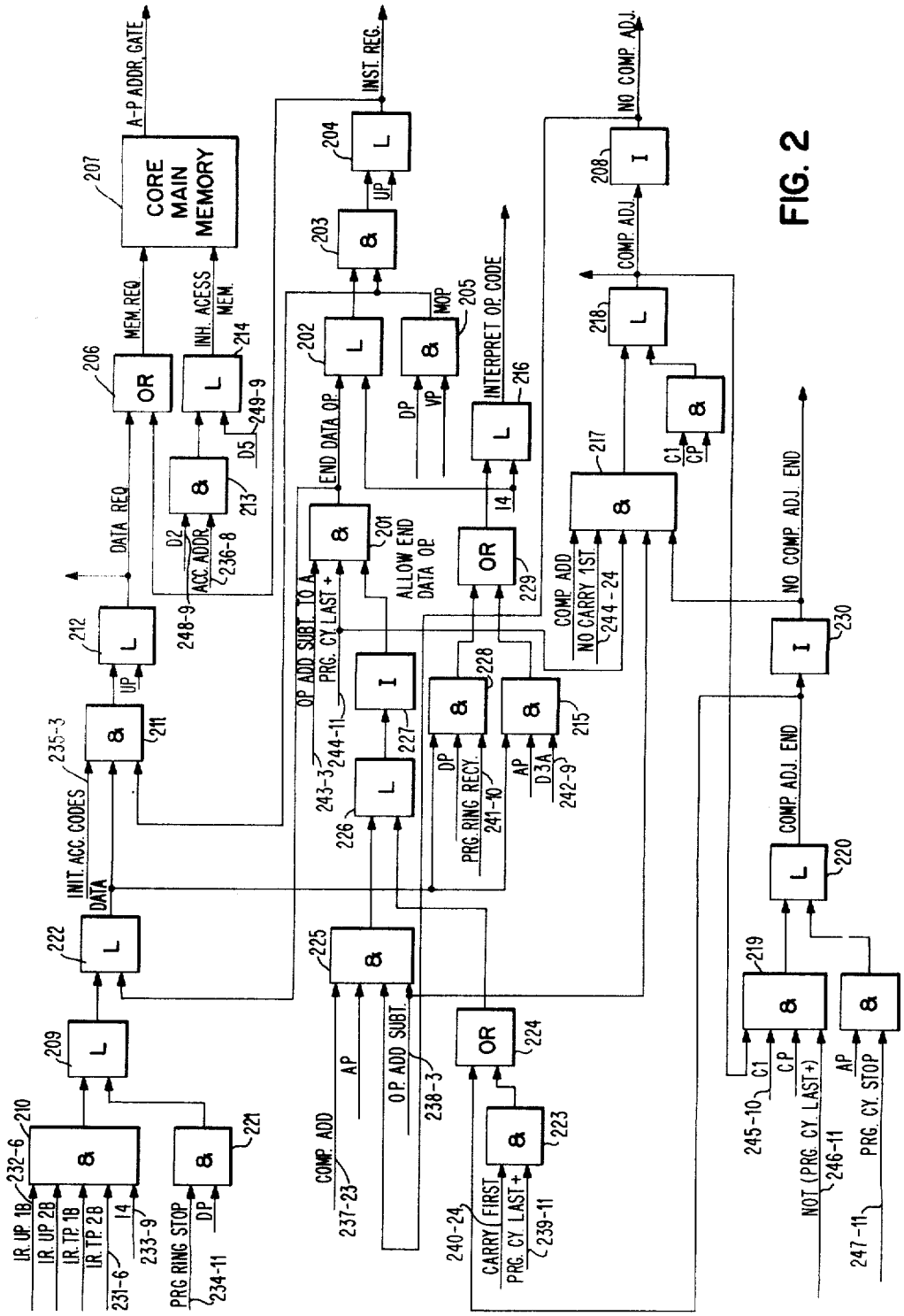
FIGURES 2 through 4 show controlling circuits for initiating certain operations within the system.

FIGURE 2 discloses logic circuitry for initiating instruction, data, and complement adjust cycles of the machine. Throughout the figures of the drawings, the symbol "&" denotes a logic unit commonly referred to as an AND gate. In such a logic circuit, all inputs must appear concurrently in order to obtain an output therefrom. OR gates are denoted by the symbol "OR" and have the property that an output will appear therefrom upon occurrence of a signal at any one of its inputs. INVERTING gates are denoted by the symbol "I" and have the property that a signal will appear therefrom only in the absence of a signal on its input lead. The symbol "L" denotes a latch circuit which is effectively a bistable device which may be switched from one to the other of two stable conditions. The "set" input lead is the upper of the two input conductors, while the "reset" input is the lower of the two input conductors. In the present disclosure, an output only appears from the latch circuit when it is in its set condition. The CORE MAIN MEMORY 207 is merely shown in block form since its details do not form a part of the present invention. As noted previously, many core array memories or the like well known in the prior art may be used in the system of the present disclosure.

The A, B, C, and D pulses (AP, BP, CP, and DP), demark a four-microsecond cycle of the computer processing unit as shown in FIGURE 25. Their generation may be performed by any well known structure. In like fashion, the memory pulses (UP, VP, XP, YP, ZP) demark a six-microsecond cycle of the core memory in the present embodiment. Other clock pulses, such as AP RESET and CP RESET, are also periodic and are generated by circuitry not shown but which comprises part of a general computer clock generator which is present in all digital computer systems. Therefore, the structure required for their generation is well known in the art. The specific operation of FIGURE 2 will be fully described in connection with the operation of the over-all system subsequently to be discussed.

Figure 3:
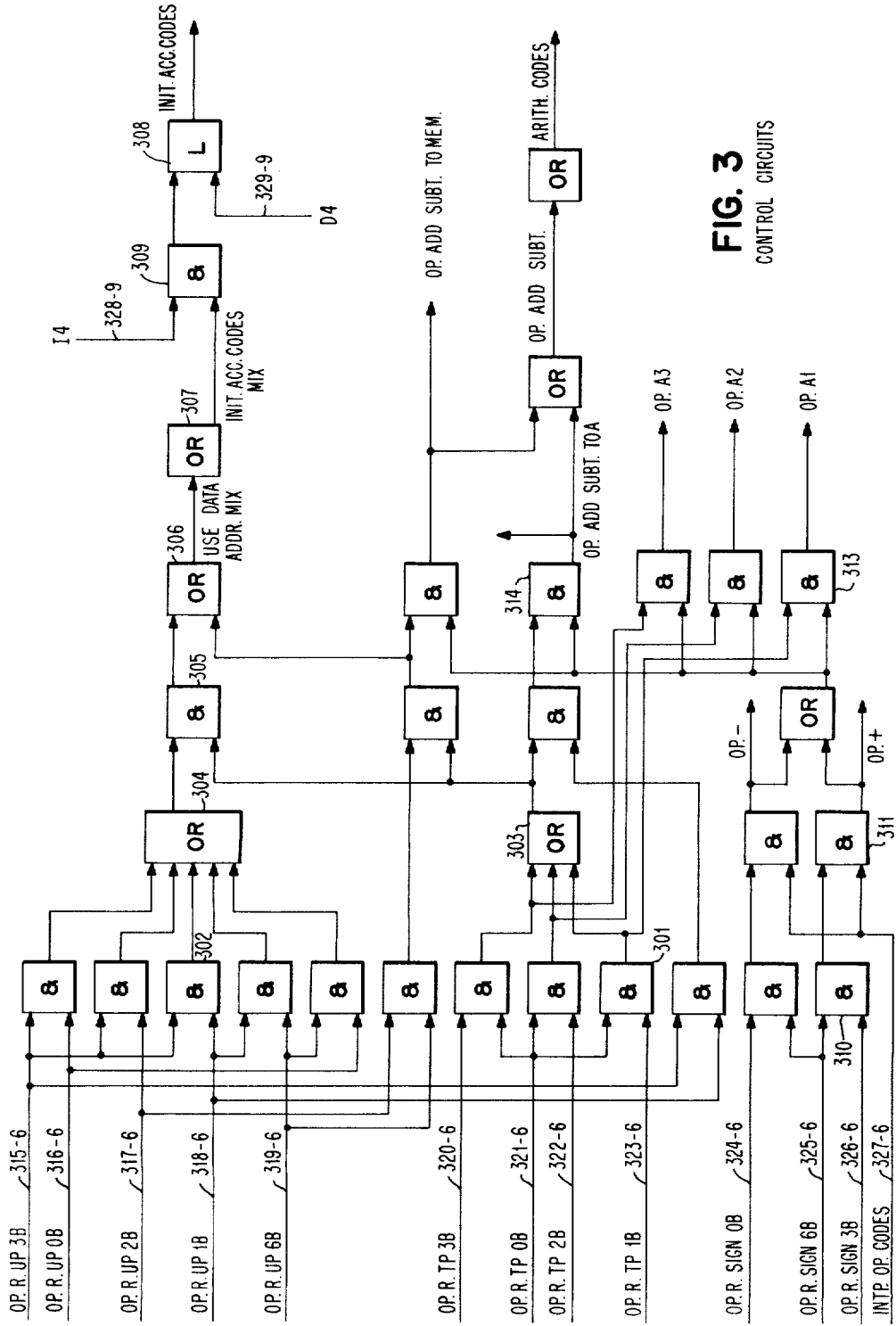

FIGURE 3 shows further control circuits for analyzing the OP code portion of the instruction word as well as its SIGN portion for use in controlling the system.

Figure 4:
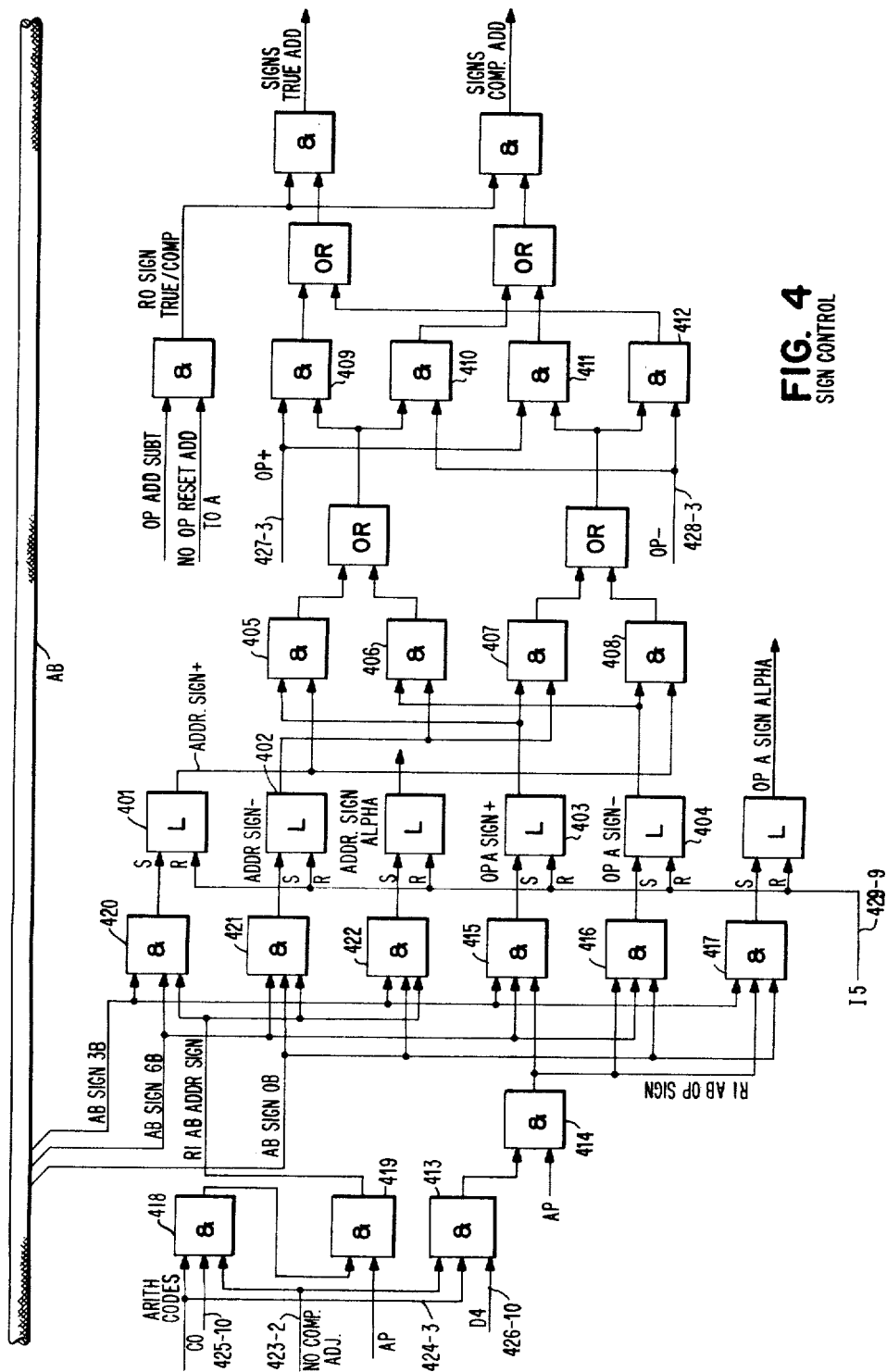

FIGURE 4 shows logical circuitry for determining whether one of the operands must be complemented before being added to the other operand. As shown in FIGURE 4, a portion of the ARITHMETIC BUS (AB) is shown from which certain information concerning the signs of the operands is obtained. In the system of the present invention, the following rules apply for determining whether the true form or the 10's complement form of the operand word appearing on CHANNEL 2 is to be applied to the ADDER: If the signs of the two operand words are alike, then a TRUE ADD operation takes place if the sign of the instruction word is +, while a COMPLEMENT add operation occurs if the instruction word sign is —; if the signs of the two operand words are unlike, then a + instruction word sign will cause a COMPLEMENT ADD operation, while a — instruction sign initiates a TRUE ADD operation. In FIGURE 4, LATCHES 401 and 402 are respectively set to indicate the + or — sign representation of the operand word held in the ARITHMETIC REGISTER, while LATCHES 403 and 404 are respectively set to indicate the + or — sign representation of the operand word held in the AUXILIARY REGISTER. The like or unlike nature of the operand signs is determined by AND gates 405–408, and their outputs compared with the instruction word sign at AND gates 409–412.

Figure 5:
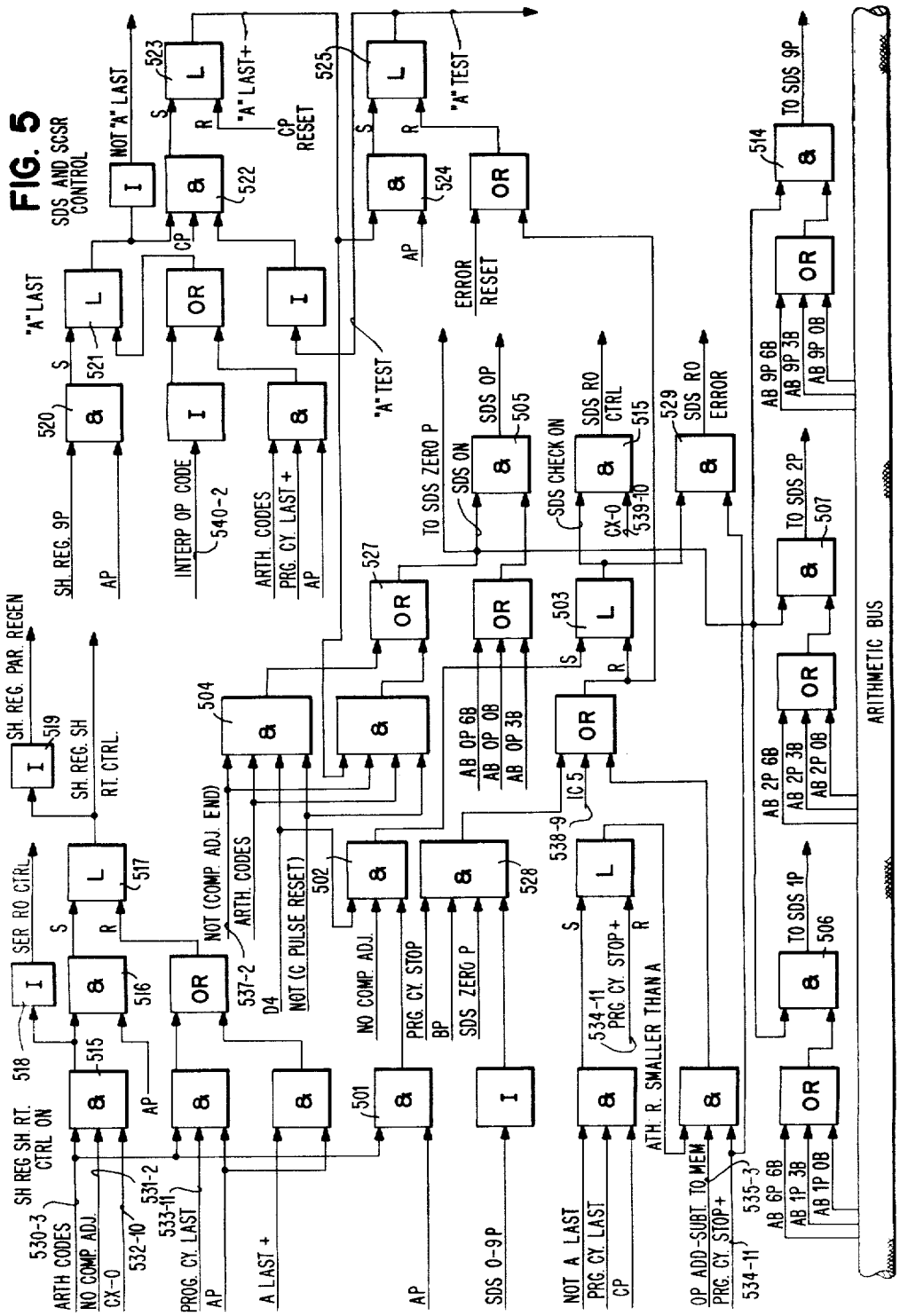
FIGURE 5 illustrates controls for determining the most significant digit in an operand.

FIGURE 5 discloses controls governing the operation of the SIGNIFICANT DIGIT SCANNER and its associated SINGLE CORE SHIFT REGISTER for determining the end of the significant digit field of the operand word which is held in the AUXILIARY REGISTER.

FIGURE 6 shows details of a portion of the PROGRAM REGISTER in which the instruction sign, the OP code, the index modification digits, and the field designating digits (this latter part being designated the FIELD REGISTER) are contained. As previously noted, the instruction word is read in from the INFORMATION BUS in parallel fashion, and the two bits out of five comprising each character are inserted within their respective latches. For example, the digit in the tens position of the OP code (position 0 of the instruction word) is inserted into LATCHES 601–605, which can be considered as the OP REGISTER. Of course, in the 2 out of 5 code used in the present system, only two of these latches are set for the digit. For purposes of space economy, the units position latches of the OP REGISTER and the units position latches of the INDEX REGISTER (LATCHES 611–615 hold the tens position digit of the index modification portion of the instruction word) are not shown. However, it is to be understood that the inputs to these undisclosed latches are obtained from the INFORMATION BUS in manner similar to the inputs to the latches actually shown in FIGURE 6. It should also be noted that only three latches 608, 609, and 610 are required to hold the sign of the instruction, since only the 0 bit, 3 bit, and 6 bit are ever used in denoting the +, —, or a sign. The data address portion of the instruction word is also held in other portions of the PROGRAM REGISTER which are not disclosed since they play no part in the field control operation of the present invention. The two field designating digits of the instruction are placed in the FIELD REGISTER LATCHES 616–625 which are also a part of the PROGRAM REGISTER.

FIGURE 7 discloses logic circuitry for resetting the FIELD REGISTER portion of the PROGRAM REGISTER when a COMPLEMENT ADJUST cycle is necessary during an ADD TO ACC operation. The units and tens positions of the FIELD REGISTER are shown in FIGURE 6, previously described, and comprise a portion only of the PROGRAM REGISTER (FIG. 1) which contains the entire instruction word. It is again emphasized that the FIELD REGISTER portion of the PROGRAM REGISTER contains two digits which indicate the positions of both ends of the field of the operand denoted by the data address portion of the instruction word.

FIGURE 8 shows the CAB LATCH REGISTER which receives the data address portion of the instruction word from the COMPUTER ADDRESS BUS and is used, among other things, to determine whether a main memory address is required or whether an accumulator address is required. Thus, when the data address portion of the PROGRAM REGISTER is transferred to the COMPUTER ADDRESS BUS for possible subsequent use in addressing the core main memory, this address is also transferred to the CAB LATCH REGISTER.

FIGURE 9 discloses details of the INSTRUCTION RING and DATA RING which are used to program certain steps in the system. The INSTRUCTION RING generates the I1 to I5 signals in succession from LATCHES 906–911. These signals are used to withdraw an instruction word from the core main memory and place it within the PROGRAM REGISTER. As noted in FIGURE 25, LATCH 906 is set at CP time and remains in that state for four microseconds until reset by the CP RESET signal. Upon LATCH 906 becoming set, AND gate 912 becomes conditioned so as to pass the following AP and thus set LATCH 907. Thus, the I1 and I2 signals overlap for a period of two microseconds. In like fashion, LATCH 908 is set at the following CP time so that I3A overlaps one half of I2, as indicated in FIGURE 25. LATCH 907 is subsequently turned off by AP RESET. The process continues with LATCHES 909 and 911 being set at AP time, while LATCH 910 is set at CP time. Each latch when set remains in that condition for four microseconds until reset by its appropriate reset signal. Thus, the adjacent I signals from the INSTRUCTION RING overlap as is partially indicated in FIGURE 25.

In like manner, the DATA RING shown in FIGURE 9 also is initiated at CP time and it generates D signals which are used in extracting an operand from the address indicated by the data address portion of the instruction word. As is shown in FIGURE 25, the DATA RING, when once started, continues to generate the D signals in succession in which adjacent signals overlap two microseconds, such as was the case in the INSTRUCTION RING. Thus, D1, D3A, and D4 signals are initiated at CP times, while D2, D3B, and D5 signals are initiated at AP times. Each of these signals lasts for four microseconds until the latch is reset by one of the AP RESET or CP RESET signals.

FIGURE 10 discloses the PROGRAM RING which generates C signals in succession for use during the actual arithmetic operation. Basically, these C signals are used to synchronize the reading out of the AUXILIARY REGISTER operand, and to insert the sum digits from the ADDER back into the ARITHMETIC REGISTER in an ADD TO ACC operation. As in the case with the INSTRUCTION and DATA RINGS, PROGRAM RING signals are generated in overlapping fashion with respect to their adjacent signals. This relationship may be better seen in FIGURE 25, where it is seen that the first PROGRAM RING signal CX is four microseconds long and overlaps the second PROGRAM RING signal CX–0 for a period of two microseconds. Alternate C signals are initiated by the AP and CP signals, respectively. However, the PROGRAM RING does not necessarily run to its end latch, since it is stopped as soon as the most significant sum digit has been inserted into the ARITHMETIC REGISTER. This should be contrasted with the operation of the INSTRUCTION RING and DATA RING which, when once initiated, generate all of their possible signals.

FIGURE 11 discloses the PROGRAM CYCLE RING whose operation is initiated upon detection that all the desired digits of both operands have been added together. Signals generated therefrom accomplish certain clean-up operations in order to end the operation denoted by instruction word, which may include the initiation of a COMPLEMENT ADJUST cycle in order to obtain the result of the addition in true form. Various error checking devices are also sampled during operation of the PROGRAM CYCLE RING, and it further causes the PROGRAM RING to stop. It should be noted that the PROGRAM CYCLE pulses also last for four microseconds and overlap adjacent signals in a manner similar to the rings heretofore described. The PROGRAM CYCLE RING may be started at any one of three different latches, depending upon the particular operation and cycle.

FIGURE 12 shows the FIELD RING which generates F signals for use in withdrawing the field portion of the operand from the ARITHMETIC REGISTER without moving the other portion of the operand in the ARITHMETIC REGISTER, and for inserting a sum result back into the ARITHMETIC REGISTER when an ADD TO MEMORY operation is being performed. The operation of the FIELD RING may be initiated at any one of its half time F signals in dependence upon the digit contained in the units position of the FIELD REGISTER shown in FIGURE 6. This is in contrast to the PROGRAM RING previously described, which always starts with its first LATCH 1002 being set. Furthermore, the FIELD RING, when once started, may be terminated before its end latch is set, in accordance with the digit contained in the tens position of the FIELD REGISTER. The setting of the latches in accordance with CP and AP is believed to be obvious, since this operation is similar to that in the other rings described. Each F signal remains on for four microseconds and overlaps its adjacent signal as shown in FIGURE 25.

FIGURE 13 discloses the FIELD MATCH and FIELD CYCLE RING circuits which operate to stop the FIELD RING at a particular position. Each half-time F signal from the FIELD RING is compared with the digit held in the tens position of the FIELD REGISTER. When a comparison is obtained, the FIELD CYCLE RING is started whose pulses are successively generated in order to test certain error checking circuits and to eventually stop the operation of the FIELD RING. These FIELD CYCLE RING signals last four microseconds and overlap adjacent signals. FIGURE 13 also shows the FIELD RING start circuit for initiating operation of the FIELD RING.

FIGURE 14 discloses the FIELD RING CHECK circuits which determine whether the FIELD RING has correctly operated. C signals from the PROGRAM RING are compared against the digit held in the FIELD SIZE REGISTER, which is the 10's complement of the field length. Since the number of PROGRAM RING pulses, which have been generated by the time that the FIELD RING is stopped, is indicative of the length of the field, then a comparison between the PROGRAM RING and the field size digit, at the time the field ring is stopped, indicates that no error has been made.

FIGURE 15 discloses the ARITHMETIC REGISTER sign change circuit which is utilized to change the sign of the operand word held in the arithmetic register if this be necessary. In the present embodiment, the sign of the result obtained from the ADDER (said result being placed back into the ARITHMETIC REGISTER) is always initially assumed to be the sign of the operand word which is introduced via CHANNEL 1 to the ADDER. Therefore, in an ADD TO ACC operation, the sign of the operand word held in the AUXILIARY REGISTER must be inserted into the sign position of the ARITHMETIC REGISTER. In an ADD TO MEM operation, however, the ARITHMETIC REGISTER sign is not disturbed. If the result from the ADDER happens to be the 10's complement of the true result, then it must be withdrawn from the ARITHMETIC REGISTER and recomplemented (10's complemented) during a COMPLEMENT ADJUST cycle, while the ARITHMETIC REGISTER sign at this same time is reversed.

FIGURE 16 discloses circuitry for serially reading sidewise into the ARITHMETIC REGISTER each sum digit obtained at the output of the ADDER. During the ADD TO ACC operation, the sidewise insertion of the sum digits back into the ARITHMETIC REGISTER is under control of the PROGRAM RING C signals which switch at AND gates 1601–1610 to provide control signals for inserting, starting with the least significant digit of the sum, into position 9 of the ARITHMETIC REGISTER. Thus, the digit positions of the operand in the ARITHMETIC REGISTER are all sequentially filled with significant digits of the sum, or replaced by zeros from the zero insert generator of FIGURE 19. However, during an ADD TO MEM operation, the sum insertion into the arithmetic register is under control of the FIELD RING so that only the digit positions of the field are filled by the sum digits. Each ATHR SER RI signal produced is attached to appropriate connections of all five-bit stages in its appropriate position of the ARITHMETIC REGISTER to allow only one position at a time to accept a digit from the ADDER output. Furthermore, when a signal is applied to one of the I gates 1621–1630, the associated signal ATHR RO DR is dropped and thus prevents its associated register position from regenerating the old operand digit, thus making room for the new sum digit.

FIGURE 17 shows the output gating circuitry for serially reading out digits in the defined field of the operand word contained in the ARITHMETIC REGISTER. This serial read-out is under control of the FIELD RING F signals so as only to draw out sidewise those digits which are in the field defined by the two field designating digits in the instruction word held in the FIELD REGISTER. Furthermore, means are provided in FIGURE 17 so as to direct the digits from the ARITHMETIC REGISTER to either CHANNEL 1 or to CHANNEL 2 which lead to the ADDER. Thus, in an ADD TO ACC operation, the operand digits from the ARITHMETIC REGISTER are always fed to CHANNEL 2, while in an ADD TO MEM operation, the operand digits from the ARITHMETIC REGISTER are fed to CHANNEL 1. In either operation, a COMPLEMENT ADJUST cycle will cause the digits to be read to CHANNEL 2. It should be particularly noted in FIGURE 17 that only the read out AND gates 1701–1710 and 1711–1720 are shown in detail. These two sets of gates respectively are associated with the 0 bit storing stages in each position 0 through 9 of the ARITHMETIC REGISTER, and the 6 bit storing stages of positions 0–9. It is to be understood that similar sets of AND gates are associated with each of the 1, 2, and 3 bit storage stages in each position 0–9, together with the appropriate FIELD RING signals. OR gates 1722–1724 have been shown into which each of these undisclosed AND gate sets would respectively feed.

FIGURE 18 discloses control circuitry for generating signals to cause the ARITHMETIC REGISTER to read-in or read-out in parallel fashion from the ARITHMETIC BUS. Also, this figure shows control circuits for generating signals to readout each of the ACCUMULATORS 1, 2, or 3 to the ARITHMETIC BUS.

FIGURE 19 discloses the zero insert latches for the ARITHMETIC REGISTER which are used to fill up all high order non-significant digit positions in the ARITHMETIC REGISTER with zeros (1 bit and 2 bit) after the significant sum digits have been inserted in other positions during an ADD TO ACC operation. In this way, those digits in the original operand word, which were originally contained in the ARITHMETIC REGISTER and which are not replaced by sum digits from the ADDER, are changed to zeros. The signals generated from AND gates 1901–1920 are applied to appropriate terminals of the 1 bit and 2 bit storage locations in each of the digit positions 0–9 of the ARITHMETIC REGISTER.

FIGURE 20 discloses a checking circuit to insure that the zero insert generator of FIGURE 19 operates correctly. In the event that the zero insert generator does not insert the proper number of zeros into the arithmetic register at the proper positions, an error will be indicated.

FIGURE 21 discloses the control circuits for the AUXILIARY REGISTER. AND 2101 is provided for generating a signal which allows an operand to be read in parallel fashion from the ARITHMETIC BUS to the AUXILIARY REGISTER. During the actual adding operation, the AUXILITRY REGISTER acts as a shift register for moving its contents, excluding the sign digit, to the right so as to read out of its position 9 each decimal digit in sequence. This is in contrast to the operation of the ARITHMETIC REGISTER where no shifting as such is performed during the adding operation. The first digit appearing at the output of the AUXILIARY REGISTER while shifting is the least significant digit of the operand therein. Gates 2104 and 2105 insert zero digits into position 0 so as to gradually fill up the AUXILIARY REGISTER with zeros as the significant digits are shifted out.

FIGURE 22 discloses the AUXILIARY REGISTER serial read-out gates for directing each decimal digit when shifting to either CHANNEL 2 or CHANNEL 1 of the ADDER. When an ADD TO ACC operation is being performed, the digits from the AUXILIARY REGISTER are directed to CHANNEL 1 of the ADDER via AND gates 2201–2205. However, when an ADD TO MEM operation is being performed, the AUXILIARY REGISTER digits are directed to ADDER CHANNEL 2 via AND gates 2206–2210.

FIGURE 23 discloses logic circuitry showing the input gates receiving outputs from the ARITHMETIC REGISTER and AUXILIARY REGISTER for CHANNEL 1 and CHANNEL 2 of the ADDER. Furthermore, CHANNEL 1 and CHANNEL 2 zero insert LATCHES 2316 and 2317, respectively, are shown for inserting zero digits into either of the channels whenever necessary. FIGURE 23 further shows gating circuitry for introducing the units position digit of the FIELD REGISTER into CHANNEL 2 at the beginning of an operation where it is complemented and added to the tens position digit of the FIELD REGISTER being simultaneously introduced into CHANNEL 1 of the ADDER. The details of the adder are not disclosed herein, since they do not form a part of this invention. However, the ADDER may operate in the 2 out of 5 code, or it may operate in some other code with a translator for changing the code.

FIGURE 24 discloses the ADDER output circuits and the FIELD SIZE REGISTER which holds the tens complement value of the field size. As indicated, the sum digit from the ADDER in the 2 out of 5 code appears to set LATCHES 2415–2419. If a carry resulted from the addition (or subtraction), this appears from the adder to set LATCH 2421, while a "no carry" addition sets LATCH 2420. The carry or no carry signals are transferred to LATCHES 2408 and 2415, and from there back to CHANNEL 1 of the ADDER. The output of each LATCH 2415–2419 is connected to a read-in terminal on its associated bit stage in each of the positions 0–9 of the ARITHMETIC REGISTER. In other words, each sum digit as it appears from the adder is simultaneously applied to all positions 0–9 of the ARITHMETIC REGISTER. However, only the position receiving the signals ATHR SER RI and ATHR RO DR from FIGURE 16 will actually store the sum digit then appearing from the ADDER. Each sum digit is also transferred to LATCHES 2410–2414. When the tens complement digit of the field size is placed therein, at the beginning of the operation, it is then inserted into the FIELD SIZE REGISTER LATCHES 2401–2405.

FIGURE 25 discloses a sequence chart showing the relationship between the memory cycle pulses UP–ZP and the CPU pulses AP–DP. Furthermore, FIGURE 25 discloses several pulses obtained from each of the INSTRUCTION, DATA, PROGRAM, and FIELD RINGS which have previously been considered. In the present embodiment, the core main memory requires six microseconds to read-out or read-in an eleven-character word. In the CPU, the construction of the different registers requires a four-microsecond cycle in order to read-out, and then read-in. Read-out from a register is done approximately at AP time, while read-in is at CP time.

A detailed description of an ADD TO ACC operation will now be given. In this particular example, a field beginning in position 6 and ending in position 3 of ACCUMULATOR 2 is assumed as the location of the information to be added to ACCUMULATOR 1, and the data in ACCUMULATOR 1 is assumed to be six digits in length having its least significant digit in position 9. No indexing is to be performed, and the data address portion of the instruction word is further assumed to be 9992, which is the address of ACCUMULATOR 2. Taking the above into consideration, the instruction word format which performs the operation is + 14 00 36 9992, which means that the positions 3 to 6 of ACCUMULATOR 2 will be added to all significant digit positions of ACCUMULATOR 1, and the result placed into ACCUMULATOR 1.

The operation starts with the END DATA OP signal generated by AND gate 201 during the previous operation which sets LATCH 202. LATCH 202 output switches MOP (memory out pulse) at AND 203 to set LATCH 204 which generates an INSTRUCTION REQUEST signal. MOP is generated by AND 205 whenever a VP or DP coincide, which thus indicates that the six-microsecond memory cycle is properly synchronized with the four-microsecond computer processing unit for the purpose of reading out information.

INSTRUCTION REQUEST generates a MEMORY REQUEST signal through an OR 206; thus the CORE MAIN MEMORY 207 is informed that the CPU (computer) is in need of data. At this point, it is assumed that memory is not being used by other units of the system (not shown). Thus, the request is honored by memory and that memory signal A-P ADDRESS GATE is generated by memory to inform CPU that the memory can supply information thereto.

The A-P ADDRESS GATE switches the CP and INSTRUCTION REQUEST at AND 903 and AND 904 to set LATCH 905 and thus start the INSTRUCTION RING. The INSTRUCTION RING generates I pulses which control the system operation during the instruction cycle when an instruction word is drawn from the core main memory. I1 appears at the output of AND 906 and is used to read out an instruction address from the INSTRUCTION REGISTER to the main memory so that memory knows what instruction to send back. This is a well known technique in the prior art. 13B switches with BP at AND 606 to reset PROGRAM REGISTER positions S and 0 through 5 (only positions shown). 14 switches with AP at AND 607 to read-in the information from the INFORMATION BUS to the PROGRAM REGISTER LATCHES 601, etc.

As soon as the index digit LATCHES, some of which are 611, etc., of the PROGRAM REGISTERS are set, another latch is set by switching at AND 210 the following five signals IR UP1B, IR UP2B, IR TP1B, IR TP2B, and I4. The setting of this latch means that there is no indexing involved because both index digits are zero (a case assumed in this operation) so we can proceed with the DATA CYCLE.

First, it must be decided if data is needed for this operation. In this particular example, an ACCUMULATOR 2 address has been used, but the DATA signal comes up regardless. Simultaneously, when analyzing the OP portion of the PROGRAM REGISTER, a portion of which is held in LATCHES 601, etc., the signals OP.R. TP0B and OP.R. TP1B switch together at AND 301, while signals OP.R. UP3B and OP.R. UP1B switch at AND 302. This indicates that the OP code is 14. The outputs from OR 303 and OR 304 switch at AND 305 to generate signal USE DATA ADDR. MIX, which becomes the INIT. ACC. CODES MIX signal via OR 307. LATCH 308 is set on at I4 time by the switching occurring at AND 309. Taking into consideration the sign position of the instruction word, the signals OP.R. SIGN 6B and OP.R. SIGN 3B switch at AND 310 to generate OP + at a later time.

The following three signals DATA, INIT. ACC CODE and MOP switch together at AND 211 to set LATCH 212 which generates a DATA REQUEST and thus a MEMORY REQUEST signal. If MEMORY 2-7 is free at this time, a A-P ADDR. GATE is generated which, when switched with CP and the DATA REQUEST signal at AND 917 and AND 918, gets the DATA RING started. The DATA RING pulses are necessary even though the data processed is coming from ACCUMULATOR 2 rather than the MEMORY 207.

D1 and DP switch at AND 801 to reset the CAB L REGISTER which in turn is set with D1 and AP to read in the four data address signals from the instruction word stored in positions 6 through 9 of the program registers (not shown). As soon as the CAB L REGISTER of FIGURE 8 is set, the signals from LATCHES 806, 807, 811, 812, 816, 817 switch together at AND 823 to bring up the ACC. ADDR. signal which means that the core memory will not be used to obtain the operand digit for the ARITHMETIC REGISTER. It should be noted that the CORE ADDR. signal from OR 824 does not now come on. ACC. ADDR switches with D2 at AND 213 to set LATCH 214. The INH ACCESS MEM signal is sent to memory to ask to ignore the previously sent MEMORY REQUEST.

D3A switches with DATA and AP at AND 215 to set the LATCH 216 to generate INTERPRET OP CODE signal. This switches at AND 311 with AND 310 to generate OP+, which in turn switches at AND 313, AND 314, to obtain OP. A1, OP ADD-SUBT. TO A, OP ADD-SUBT, and ARITH. CODES. D4 switches along with AP at AND 1001 to start the PROGRAM RING, thus initiating C pulses. During DATA CTRL 4 the information contained in ACC 1 is also transferred in parallel to the AUX R by energizing the proper drivers. The following signals: ARITH CODES, D4, and OP A1 switch together at AND 1801 to generate RO A1 AB, so as to read out ACCUMULATOR 1 to the ARITHMETIC BUS. The following signals: ARITH CODES, NO COMP ADJ, and D4 switch together at AND 2101 to inhibit the SERIAL READOUT of the AUXILIARY REGISTER to AB, and switched with an AP at AND 2102 they set LATCH 2103 so as to read in the ACC 1 operand from the ARITHMETIC BUS to the AUXILIARY REGISTER at CP time.

Since the contents stored in positions 3–6 of ACC 2 will be added to the contents of ACC 1, we should also be able to select ACC 2 and for this reason we bring up ACC 2 ADDRESS OP by switching the following signals together at AND 825: ACC ADDR, LATCH 818, LATCH 820, which indicates that the data address digits of the instruction word are 9992, which signify ACCUMULATOR 2.

The contents of ACCUMULATOR 2 are now transferred to the ARITHMETIC REGISTER by switching together ARITH CODES, NO COMP ADJ, CX–0, and A2 ADDR OP switch at AND 1802 to produce RO A2 AB for reading out the contents of ACCUMULATOR 2 to the AB. The signals ARITH CODES, CX–10, ACC, ADDR also switch at AND 1810 to subsequently produce ATHR PAR RI AB signal which transfers the ACCUMULATOR 2 operand word from the ARITHMETIC BUS to the ARITHMETIC REGISTER.

The next step is to set the FIELD SIZE REGISTER LATCHES 2401–2405. In order to do this we have to perform a complement add operation of the digits of the FIELD REGISTER (positions 4 and 5 of the PROGRAM REGISTERS in FIGURE 6). The ARITH CODES signal effectively generates FLD CTRL CODE MIX which switched with CX at AND 2301, AND 2302, AND 2303 generates the following three signals, respectively: COMP ADD, RO FLD REG TP, RO FLD REG UP. Signal RO FLD REG TP samples each of the tens position FIELD REGISTER latches 616–620 at AND gates 2304–2308 to transfer the field tens digit to ADDER CHANNEL 1 where it is applied to one input of the ADDER in true form. The field units digit is applied via AND gates 2309–2313 to ADDER CHANNEL 2, and since the COMP ADD signal is present at OR 2314, the 9's complement of this digit is applied to the other input of the ADDER. The FLD. CTRL. CODE MIX is also switched with D4 at AND 2406 to set at AP time LATCH 2408. The setting of LATCH 2408 results in a carry of zero being applied to CHANNEL 1 of the ADDER so that the 9's complement of the units field digit is not effectively changed to the 10's complement. Since a 3–6 field was chosen for this example, we have that the field length is four digits long.

FIELD REGISTER tens position to CHANNEL 1 = 3
FIELD REGISTER units position to CHANNEL 2 = 3
CARRY INSERT = 1
                                                    ———
ADDER OUTPUT                                          6 which is the tens complement of the field length 4.

CX and BP switch at AND 2408 to reset the LATCHES 2401–2415. Then, FLD CTRL CODE MIX, CO, BP switch together at AND 2409 to generate RI FLD SIZE REG which switches against the LATCHES 2410–2414 to set the LATCHES 2401–2405 with the tens complement of the field size.

It should also be noted that a check of the validity of the field size is made at this point. The above addition of 3 and 3 (9's complement of 6) results in no carry over from the ADDER output which would set LATCH 2415. Since LATCH 2415 is not set, it is impossible for a FLD PROF ERROR to be generated from AND 2315 at CO time. However, if the field length digits were 63, then 6+6 (9's complement of 3) generates a carry output from the ADDER which indicates an error, since obviously the digit in position 3 is of higher order significance than the digit in positon 6, and the wthdrawal of the field from the ARITHMETIC REGISTER would be incorrect.

Next, the FIELD RING is started which will control the readout of positions 6, 5, 4, 3 of the ARITHMETIC REGISTER. The signals ARITH CODES, NOT (FLD STT INH), CP, CO switch together at AND 1301 and AND 1302 to generate FLD RING STT PULSE.

FLD RING STT PULSE (at CP reset time) sets LATCH 1304 which in turn sets LATCH 1305, generating a FLD RING RUN signal.

At the same time, FLD RING STT PULSE switches with FLD REG UP6B and FLD REG UP0B at AND 1201 to set LATCH 1202 and start the ring at the F 7–6 position.

While the contents of ACCUMULATOR 1 are transferred to the AUXILIARY REGISTER, the SIGNIFICANT DIGIT SCANNER, which is attached to the ARITHMETIC BUS, scans the AB and determines the position of the highest order signficant digit, which, in the example, is located in position 4 of the word. In turn it sets the SINGLE CORE SHIFT REGISTER which determines the exact number of digits that the AUXILIARY REGISTER has to be shifted in order to place all of its significant digits on CHANNEL 1, beginning with the least significant digit. The following combinations of signals ARITH CODES, NO COMP ADJ END, D4, NOT (FLD STT INH) switch together with AP at AND gates 501 and 502 to set LATCH 503. The signals ARITH CODES, DP, NOT (COMP ADJ), NOT (C PULSE RESET) switch together at AND 504 to generate the signal SDS ON. As explained in the above-identified copending application U.S. application Serial No. 862,907, filed December 30, 1959, the SIGNIFICANT DIGIT SCANNER samples only the 0, 3, and 6 bits of each digit position 0–9 of the operand word. If a digit in a position is other than zero, then one of these three bits will be present. The SIGNIFICANT DIGIT SCANNER, by means of its interconnected stages, only allows one of these stages to be set, which is that corresponding to the position holding the highest significant digit. The SDS ON signal thus switches, when the word is in AB, with the three bits from each position at AND gates 505–514 in order to direct them, if present, to their respective input terminals at the SIGNIFICANT DIGIT SCANNER positions 0–9. AND gates 507–513 are not actually shown in FIGURE 5, but it is to be understood that they would direct any of the 0, 3, or 6 bits in the digits to positions 2–8 of the scanner. In addition to the scanner positions shown in U.S. application Serial No. 862,907 filed December 30, 1959, the SIGNIFICANT DIGIT SCANNER in the present embodiment also has a ZERO position stage attached to position 9 (units) which is always pulsed by the SDS ON signal. If no significant digits were actually present in positions 0–9 of the operand word, then this ZERO position stage is allowed to set to give a positive indication that only zeros occupy positions 0–9 of the operand word which is placed into the AUXILIARY REGISTER.

The signals SDS CHECK ON, CX–0 switch together at AND 505 to generate SDS RO CTRL in order to read the SIGNIFICANT DIGIT SCANNER to the SINGLE CORE SHIFT REGISTER and thus to set the one core of the SHIFT REGISTER to indicate the position that the most significant digit occupies. The single bit signal from the SIGNIFICANT DIGIT SCANNER is actually initially transferred to the capacitor of the stage associated with the position to the left of the one corresponding to the set position of the SCANNER. This indicator bit is then shifted right one position at the beginning of the shift cycle, and thus enters the correct position of the SHIFT REGISTER. Thus, in the example, position 4 of the SHIFT REGISTER is the first stage actually set. The signals ARITH CODES, NO COMP ADJ, CX–0 switch together at AND 515 to generate SH REG SH RT CTRL ON which switches with AP at AND 516 to set LATCH 517. This causes the bit in the SINGLE CORE SHIFT REGISTER to begin shifting to the right in synchronism with the shifting of digits in the AUXILIARY REGISTER. I gates 518 and 519 also develop signals necessary for the correct operation of the SHIFT REGISTER.

The next step is to observe the signs of the two quantities in the ARITHMETIC REGISTER and the AUXILIARY REGISTER and the sign of the instruction word to determine if this is a TRUE ADD or a COMPLEMENT ADD operation. The signals ARITH CODES, NO COMP ADJ, D4 switch together at AND 413 and then with AP at AND 414 to generate RI AB OP SIGN which in turn is witched at AND gates 415, 416, and 417 with the sensing of the ARITHMETIC BUS SIGN position to set one of LATCHES 415–417 with the sign of the word from ACCUMULATOR 1 which is now being transferred via AB to the AUXILIARY REGISTER. Assume this sign to be +. ARITH CODES, NO COMP ADJ, CO then switch together at AND 418 and then with AP at AND 419 to generate RI AB ADDR SIGN which in turn switches with the sensing of the ARITHMETIC BUS SIGN position to set one of LATCHES 420–422 with the sign of the word from ACCUMULATOR 2 which is now being transferred to the ARITHMETIC REGISTER via AB. Assume this sign to be —. OP SIGN + is switched with ADDR SIGN — at AND 407 and the result is switched with OP + at AND 411 to generate SIGNS COMP ADD. SIGNS COMP ADD and CO–1 switch at AND 2318 to generate COMP ADD ON which switches with AP at AND 2319 and sets LATCH 2320 to generate COMP ADD.

COMP ADD ON generates CARRY INSERT which with AP at AND 2422 sets LATCH 2415. Also, COMP ADD signal goes through OR 2314 and OR 2326 to cause the 9's complement of the number on CHANNEL 2. Thus, the true value of the digits on CHANNEL 1 will be added to the 9's complement value of the digits on CHANNEL 2. Furthermore, a carry of 1 is automatically inserted into the ADDER CHANNEL 1 when adding together the least significant digit of each operand so as to effectively change the 9's complement of this CHANNEL 2 digit to the 10's complement. This effectively creates the 10's complement of the entire operand word appearing on CHANNEL 2. This procedure is well known in the art.

At the start of the adding cycle, the sign of the operand held in the AUXILIARY REGISTER must be inserted into the ARITHMETIC REGISTER. OP ADD SUBT TO A, CO–1 switch together at AND 1501 to generate SIGN CHANGE CTRL. SIGN CHANGE CTRL blanks the ATHR SIGN SER RO via I 1502 and switches with an AP at AND 1503 to generate SIGN CHANGE GATE. The signals OP A SIGN +, OP ADD SUBT TO A, NOT (COMP ADJ END) switch together at AND 1508 to generate signals from OR 1511 and OR 1512. Signals from these two gates switch with SIGN CHANGE GATE at AND 1514 and AND 1515 to energize the 3B and 6B stages in the sign position of the ARITHMETIC REGISTER.

At CX time LATCHES 1921–1930 are all set so they are on in case zero inserting into the ARITHMETIC REGISTER is necessary. These LATCHES are subsequently reset one at a time with a half-time signal of the PROGRAM RING and DP at AND gates 1931–1940. This results in one of the LATCHES 1921–1930 being reset each time that a sum digit is inserted into the ARITHMETIC REGISTER under control of the PROGRAM RING.

At CO, LATCH 2010 is set, and is only reset by CP and a signal from I 2011 switching at AND 2012. However, if signals from both OR 2013 and OR 2014 appear at CP time, then no signal appears from I 2011, and LATCH remains set. It should be noted that any subsequent resetting of LATCH 2010 while the arithmetic process is going on is indicative of error in the operation of LATCHES 1921–1930. In FIGURE 20, a check is made at C1 time to determine if all of the LATCHES 1921–1930 have been set on. C1 appears before C1–2, which will reset LATCH 1949. AND gates 2001–2009 compare LATCHES 1921–1930 against themselves. For example, AND 2001 switch LATCHES 1921 and 1922. AND 2002 effectively switch LATCHES 1921 and 1922 with LATCH 1923. If all latches have been set, then C1 switches with the output of AND 2009 at AND 2015 to pass a signal to OR 2013. Also, AND 2016 generates a signal to pass to AND 2017 via OR 2014. Therefore, no output appears from I 2011 and LATCH 2010 cannot be reset, which indicates that all LATCHES 1921–1930 are set.

At this point, the actual adding operation starts because the FIELD RING is ready to start scanning the ARITHMETIC REGISTER and produce a sidewise transfer of the contents of positions 3–6 to CHANNEL 2 of the ADDER. Simultaneously, the AUXILIARY REGISTER begins shifting to its right to force its digits, beginning with the least significant, onto CHANNEL 1.

The signals SDS ON and CO-1 switch at AND 2106 to generate START ENTIRE AUXR ADVANCE which sets LATCH 2107 to generate AUXR SER CTRL signal at CP time from AND 2108 to shift right the digits of the operand word in AUX REG toward and out of position 9. The sign digit, however, is not shifted, but remains in position S. The signal AUXR GEN CTRL from AND 2109 is also required because of the construction of the AUXILIARY REGISTER. A signal from LATCH 2107 and ARITH CODES switch at AND 2110 to cause AND gates 2104 and 2105 to insert zeros into position 0 of the AUXILIARY REGISTER which are also shifted right, thus causing the AUXILIARY REGISTER to become filled with zeros (excluding the sign position) as the significant digits are shifted out.

The signal START ENTIRE AUXR ADV also sets LATCH 2211 which allows the active two bits of each digit, as they leave position 9 of the AUXILIARY REGISTER, to be read via AND gates 2212–2216 to set LATCHES 2217–2221. START ENTIRE AUXR ADV also switches with OP ADD SUBT TO A at AND 2222 to set LATCH 2223. The signal AUXR OUT CH. 1 therefore gates the outputs of LATCHES 2217–2221 to ADDER CHANNEL 1 via AND gates 2201–2205.

The signals OP ADD SUBT TO A, CO-1, NOT (FLD STT INH) switch together at AND 1725 to set LATCH 1726 and generate the RO ATHR CH 2 signal. This conditions AND gates 1727–1731 to pass the digit bits from the ARITHMETIC REGISTER to CHANNEL 2. The FIELD RING controls reading out each field position 6 to 3 in that sequence to LATCHES 1737–1741, by means of AND gate 1707, etc. Every AP time LATCHES 1737–1741 are reset in order to be set again with a digit from the next higher significant field position.

As each sum digit is generated by the ADDER, its two active bits set appropriate ones of LATCHES 2415–2419. The next step is to read these LATCHES to the ARITHMETIC REGISTER. ARITH CODES, FLD RING RUN, C1–2 switch together at AND 1631 to set LATCH 1632 which switches with OP ADD SUBT TO A at AND 1633 to generate ATHR ADD TO A CTRL. At the same time, ATHR RI from LATCH 1632 switches with AP at AND 1634 to set another LATCH 1635 whose output is also switched with OP ADD SUBT TO A at AND 1636 to generate ATHR ADD TO A SER RI. ATHR ADD TO A CTRL switches with each of the following C1–2, C2–3, C3–4, C4–5, C5–6, C6–7 at AND gates 1637–1942 to blank the ATHR RO DR of positions 9, 8, 7, 6, 5, and 4 of the ARITHMETIC REGISTER so that the new digits from the adder can be read in. Simultaneously, ATHR ADD TO A SER RI signal switches with each of the following C2, C3, C4, C5, C6, C7 at AND gates 1610–1605 to read in the output of the ADDER into positions 9, 8, 7, 6, 5, and 4 of the ARITHMETIC REGISTER. Thus, although the field digits of the ARITHMETIC REGISTER are withdrawn from positions 6, 5, 4, and 3, the sum digits are replaced in positions 9, 8, 7, 6, etc.

As noted previously each of the LATCHES 1940 to 1931 are reset by the half-time C signals as the sum digits are inserted into the ARITHMETIC REGISTER. The checking circuit of FIGURE 20 will detect the failure of any such latch to be reset at its proper time, and it will also detect the accidental setting of such a latch after it has been reset by a C signal. For example, if LATCHES 1940, 1939, and 1938 have all been reset by the time that C4 appears, then outputs from both AND 2006 and I 2025 will switch at AND 2043 so as to allow AND 2062 to pass C4 to OR 2013. Furthermore, OR 2054 passes the output from AND 2043 through the following gates: AND 2044 (because LATCH 1929 is reset and I 2–26 is therefore up), OR 2055, AND 2046, and OR 2014. AND 2017 is therefore up to prevent LATCH 2010 from being reset. On the other hand, if LATCH 1930 had been accidentally set again since the time that it was reset by C1–2, then AND 2046 could not pass a signal to OR 2014 and AND 2017. In this case, LATCH 2010 would be reset at C4–CP time, thus indicating an error when AND 2065 is sampled by AP and PRG CYCLE STP. The FIELD RING now stops the read-out from the ARITHMETIC REGISTER after four positions have been scanned. During the time that the FIELD RING is reading out the various positions of the ARITHMETIC REGISTER, it is also switching at AND gates 1306–1315 against the digit in the tens position of the FIELD REGISTER, which contains the digit 3, composed of a 3 bit and a 0 bit. At F4-3 time, a FLD STP MATCH signal is developed by switching F4-3 against the FIELD REGISTER tens position "3 bit" and "0 bit" at AND 1309. The FLD STP MATCH signal is switched at AND 1317 in (15C) with FLD RING RUN, AP, and NOT FLD RING LAST + or FLD RING TEST from I 1319 to set the LATCH 1318, thus generating FLD RING LAST. The output of LATCH 1318 is switched with CP at AND 1320 to set LATCH 1321, the output of which is in turn switched with AP at AND 1322 to set LATCH 1323. The output of LATCH 1323 is in turn switched from CP at AND 1324 to set LATCH 1325, which will stop the FIELD RING at position F2. However, it should be noted that FLD RING LAST + switches with AP at AND 1742 to reset LATCH 1726 in order to prevent a digit in position 2 from being read out to CHANNEL 2 during the operation of F3-2. The output of LATCH 1318 also sets LATCH 1101 which generates ATHR FLD END.

A test is also made to determine that the FIELD RING had advanced the required number of steps, as specified by the two digits in the FIELD SIZE REGISTER. During the time that the PROGRAM RING is advancing, the "on" time PROGRAM RING C signals are being switched at AND gates 1401–1410 against the contents of the FIELD SIZE REGISTER, which in this example contains the digit 6 (composed of a 6 bit and a 0 bit). This is the tens complement of the field length of four digits, which was earlier computed. As the PROGRAM RING advances through step C4, it is switched at AND 1404 with the 6 bit and 0 bit from the FIELD SIZE REGISTER to develop FLD RING MATCH signal from OR 1411. FLD RING LAST is also switched with FLD CTRL CODE MIX at AND 1413 whose output is further switched at AND 1414 against FLD RING MATCH and CP to develop FLD RING CHECK which resets LATCH 1417. LATCH 1417 is set at the beginning of the cycle under control of FLD CTRL CODE MIX and CX switching at AND 1418. Should LATCH 1417 fail to reset, indicating that the FIELD RING for some reason is out of step with the PROGRAM RING, its output is switched against FLD RING TEST at AND 1419 to develop FLD RING ERROR signal.

In a similar way, controls are provided to detect the shifting out of the most significant digit from the AUXILIARY REGISTER, which thus signals the end of the field therein. SH REG 9P output and AP are switched together at AND 520 to set LATCH 521 which in turn is switched with CP and NOT (A TEST) at AND 522 to LATCH 523. The output of LATCH 523 is switched with AP at AND 524 and sets LATCH 525. The signals A LAST, ARITH CODES, NOT (A PULSE RESET) switch together at AND 1102 to set LATCH 1103 which generates the signal A FLD END.

In the present example, the end of the field in the ARITHMETIC REGISTER, having four digits, is detected two digit times prior to the end of the field in the AUXILIARY REGISTER, which has six digits. FLD RING LAST +, OP ADD SUBT, and AP switch at AND 2333 to set LATCH 2317 which inserts zero digits (1 bit and 2 bit) into CHANNEL 2. On the other hand, if the ARITHMETIC REGISTER field were longer than the AUXILIARY REGISTER field, the AUXILIARY REGISTER would continue to shift out zeros onto CHANNEL 1 which would be added to any digits still coming from the ARITHMETIC REGISTER.

Upon detection of the indicator bit from the SINGLE CORE SHIFT REGISTER, which supposedly indicates that the most significant digit of the operand word in the AUXILIARY REGISTER has been directed to the ADDER, a check is performed at this time to insure that positions 0–9 of the AUX REG are filled with zeros, which would thus indicate that no errors have occurred during the shifting operation of the AUXILIARY REGISTER and/or the SINGLE CORE SHIFT REGISTER. It should be remembered that AND gates 2104 and 2105 have been inserting zeros into the AUXILIARY REGISTER behind the most significant digit. A LAST +, NOT (COMP ADJ END), and ARITH CODES are switched at AND 2110 to read-out in parallel the AUXILIARY REGISTER as to the ARITHMETIC BUS. At the same approximate time, A LAST +, ARITH CODES, NOT (CP RESET), and NOT (COMP ADJ END) switch at AND 526 to generate via OR 527 the SDS ON signal. SDS ON allows AND gates 505–514 to sample each position 0–9 for significant digits. If none are found therein, then the ZERO position of the SIGNIFICANT DIGIT SCANNER is set. A signal thus appears at AND 528 from the SDS ZERO P, while no signal appears from any of positions 0–9 of the SDS. Thus, AND 528 provides an output at BP and PRG CY STP time which resets LATCH 503. This prevents AND 529 from generating an error output when SDS CHECK ON is switched with PRG CY STOP +.

The signals ATHR FLD END, A FLD END, COMP ADD, CP are switched together at AND gates 1103 and 1105 to set LATCH 1106, which generates PRG CY LAST +. PRG CY LAST + switched with AP at AND 1107 sets LATCH 1108. LATCHES 1109 and 1110 are set in like fashion at succeeding CP and AP times, respectively.

PRG CY LAST +, OP ADD SUBT TO A, and NOT FLD STT INH switch at AND 1941, whose output further switches with AP at AND 1942 to insert zeros via AND gates 1901–1920 into those positions of the ARITHMETIC REGISTER which correspond to those LATCHES 1921–1930 which still remain set. In our example, these are LATCHES 1931–1934. PRG CY LAST + also switches with SDS CHECK ON at AND 2211, and then with AP to reset LATCH 2107 which stops the shifting operation of the AUXILIARY REGISTER.

PRG CY TEST switches with CP at AND 1003 to set LATCH 1004, whose output drops the output from I 1105 which is designated as PRG RING STOP. The disappearance of PRG RING STP from any of the AND gates 1006–1012 prevents the next following half-time C signal from coming on, which, in our example, is C7–8.

In this example, the two operand numbers are also chosen in such a way as to result in a COMPLEMENT ADJUST CYCLE. This is performed when, in a COMP ADD operation, the result from the ADDER is the tens complement of the true result, having a sign which is opposite to that of the true result. In such a case, the result must be withdrawn from the ARITHMETIC REGISTER, and the tens complement taken thereof, while its sign is reversed. The true result is placed back into the ARITHMETIC REGISTER.

COMP ADD, PRG CY LAST +, NO CARRY 1ST, OP ADD SUBT, NO COMP ADJ END switch together at AND 217 to set LATCH 218. The absence of a carry at the conclusion of the adding process, indicated by LATCH 2420 being set, shows that the tens complement of the true result has been generated. PRG CY TEST, COMP ADJ switch together at AND 1013 to generate a signal which, when switched with CP, sets LATCH 1014. The PRG RING RECYCLE signal now switches with AP to initiate starting of the PROGRAM RING again. The following signals COMP ADJ, NOT (PRG CY LAST +), C1, CP switch together at AND 219 to set LATCH 220, which generates COMP ADJ END.

Because in this example the ARITHMETIC REGISTER field is four digits long and the AUXILIARY REGISTER field is six digits long, the field to be withdrawn from the ARITHMETIC REGISTER and recomplemented is six digits long. The FIELD REGISTER latches 616–625 were previously set to handle a four digit field so they must now be set to define a six digit field beginning at position 9 and ending at position 4. This is so, since only the FIELD RING controls the read-out from the ARITHMETIC REGISTER, and it in turn is started and stopped in accordance with the digits held in the FIELD REGISTER.

OP ADD SUBT TO A, COMP ADJ, PRG CY LAST +, FLD 1 TO 9, DP switch together at AND 701 to reset the FIELD REGISTER latches 616–625. OP ADD SUBT TO A, COMP ADJ, PRG CY TEST, FLD 1 TO 9, BP then switch together at AND 702 to generate a signal which switches with C7 at AND 706 to set the two FIELD REGISTER latches 617 and 619 in the tens position. These two latches hold a 1 bit and a 3 bit so that the decimal digit 4 is contained therein. The signal from AND 702 also automatically inserts a 3 bit and a 6 bit into the units position of the FIELD REGISTER. This way the starting of the FIELD RING is controlled so as to withdraw the least significant sum digit held in position 9. The FIELD RING stops at position 4, which holds the most significant digit of the sum. Positions 3, 2, 1, and 0 are not recomplemented since they already contain zeros.

The recomplementing takes place by performing another COMP ADD in which the contents of the ARITHMETIC REGISTER are shipped to the ADDER by way of CHANNEL 2 while zeros are inserted in CHANNEL 1 by means of LATCH 2316. COMP ADJ and C0–1 switch at AND 2334 to set LATCH 2320. These same two signals also switch at AND 2335 to set LATCH 2316. The now true result from the ADDER is read back into positions 9 through 4 of the ARITHMETIC REGISTER as was previously explained in the addition process. The sign of the ARITHMETIC REGISTER is also reversed by FIGURE 15.

After the true value has been reinserted into the ARITHMETIC REGISTER, it is transferred back to ACCUMULATOR 1. The signals OP ADD SUBT, PRG CY STOP, NO COMP ADJ are switched together at AND 1811 and generate ATHR PAR RO TO AB. The following signals OP ADD SUBT TO A, OP A1, PRG CY STOP switch together at AND 1812 to generate RI A1 AB to read in the information from the ARITHMETIC BUS to ACCUMULATOR 1.

The following signals OP ADD SUBT TO A, PRG CY LAST +, ALLOW END DATA OP switch together at AND 201 to generate END DATA OP, which initiates another instruction cycle.

Several aspects of the generic ADD TO ACCUMULATOR operation should be appreciated which were not brought out in the above-detailed description of a specific example. If the data address of the instruction word calls for a storage location in the core main memory, then this operand is transferred via the INSTRUCTION BUS to the ARITHMETIC REGISTER at the same time that the other operand is being shifted into the AUXILIARY REGISTER via the ARITHMETIC BUS, since CORE ADDER and ARITH CODES switch at D4 time at AND 1813. In this case, only the sign position of the ARITHMETIC REGISTER is read out to the ARITHMETIC BUS at CX–0 time, at AND 1814, so that the sign control circuit of FIGURE 4 can sample it. Furthermore, when a TRUE ADD operation occurs during ADD TO ACCUMULATOR, the PROGRAM CYCLE RING is initiated by AND 1111 so as to first set LATCH 1112, instead of LATCH 1106 as was the case in COMP ADD. This is to allow the PROGRAM RING to run one position longer so that any carry digit resulting from the addition of the last digits in the fields can be inserted into the ARITHMETIC REGISTER. In a COMP ADD operation, however, such a carry is not part of the true result, and so is never inserted.

The generic ADD TO MEMORY operation will not be discussed in detail since it is believed that the general philosophy of the circuit operation has been covered in the detailed ADD TO ACCUMULATOR operation discussed above. Most of the steps in the two operations are the same or are analogous. As noted in FIGURE 16, the control of the sum insertion back into the ARITHMETIC REGISTER is by the FIELD RING. Furthermore, as noted in FIGURE 19, there can be no inserting of zeros in the high order positions of the ARITHMETIC REGISTER since no signal is developed from AND 1941. Also, the AUXILIARY REGISTER now feeds out to CHANNEL 2 of the ADDER via AND GATES 2206–2210. The ARITHMETIC REGISTER likewise is directed to CHANNEL 1 via AND gates 1732–1736, except during a COMPLEMENT ADJUST cycle when the output is to CHANNEL 2. Another difference is that the sign of the ARITHMETIC REGISTER is not changed to that of the AUXILIARY REGISTER at the beginning of the operation. A yet further difference lies in the starting of the PROGRAM CYCLE RING, which turns on by setting LATCH 1113 when FLD STP MATCH and ADD SUBT TO MEM switch at AND 1114. The reason for this lies in the fact that sum digit insertion back into the ARITHMETIC REGISTER should only occur in the positions of the original field as defined by the two field designating digits of the instruction word. Thus, upon detection of the end of this field, the PROGRAM RING should be stopped without considering the length of the field in the AUXILIARY REGISTER. For this reason, too, the original field digits must govern the operation of the FIELD RING during a complement adjust cycle, and so the FIELD REGISTER at that time is not reset. In FIGURE 18, a LATCH 1830 is provided which is set by AND 1831 and indicates an error if a carry results from the true addition of the last ARITHMETIC REGISTER field digit to an AUXILIARY REGISTER digit. Such a carry is part of the result, and yet cannot be inserted into the ARITHMETIC REGISTER since it would not be placed within the field positions. Also, LATCH 1830 is set by AND 1832 if the AUXILIARY REGISTER field is longer than the ARITHMETIC REGISTER field, which again would require a sum digit to be inserted into a position not within the field size.

While only one representative embodiment of the invention disclosed herein has been outlined in detail, there will be obvious to those skilled in the art, many modifications and variations accomplishing the foregoing objects and realizing many or all of the advantages, but which do not depart essentially from the spirit of the invention as expressed in the appended claims.

What is claimed is:

1. An electronic digital computer wherein a predetermined number of digits of a first operand are selectively connected to utilization means in said computer and wherein said predetermined number of digits is specified by a field control section of an instruction word, said computer comprising a plurality of addressable storage locations, said first operand being stored in one of said addressable storage locations, an arithmetic register having a number of positions at least equal to the maximum number of digits in said first operand, means for transferring said first operand to said arithmetic register under control of said instruction word, a field register, said field control section of said instruction word being stored in said field register, a field ring, said field ring sequentially producing a plurality of control signals each of which reads a particular digit of said first operand directly out of that position in the arithmetic register in which the digit is stored, a switch matrix associated with said field register, the output of said switch matrix being connected to said field ring, said switch matrix producing a start signal for initiating sequential operation of said field ring to produce a control signal which causes direct read-out from the least significant digit position of said first operand specified by the field control section of said instruction word, means for transferring said serial digits from said arithmetic register to the means for utilizing said digits directly read out of said arithmetic register and means under control of said field register for stopping the direct read-out of said first operand at the most significant digit position specified by said field control section of said instruction word.

2. The electronic digital computer recited in claim 1 wherein the means for stopping the direct read-out of said first operand comprise a comparator, said field register being connected to said comparator, said field ring being connected to said comparator, said comparator producing an output when said field ring produces a control signal which reads out the most significant digit position specified by the field control section of said instruction word, and means for stopping said field ring a predetermined time after said comparator produces an output.

3. The electronic digital computer recited in claim 1 wherein the means for stopping the direct read-out of said first operand comprise a comparator, said field register being connected to said comparator, said field ring being connected to said comparator, said comparator producing an output when said field ring produces a control signal which reads out the most significant digit position specified by the field control section of said instruction word, a field cycle ring for producing a predetermined delay, the output of said comparator being connected to said field ring, said field cycle ring being connected to stop said field ring a predetermined time after said comparator produces an output.

4. An electronic digital computer in which an arithmetic operation is performed on a predetermined number of digits of a first operand, said predetermined number of digits being specified by a field control section of an instruction word, said computer comprising a plurality of addressable storage locations, said first operand being stored in one of said addressable storage locations, a second operand stored in a second one of said addressable storage locations, an arithmetic register having a number of positions at least equal to the maximum number of digits in said first operand, means for transferring said first operand to said arithmetic register under control of said instruction word, an auxiliary register, means for transferring said second operand to said auxiliary register under control of said instruction word, a field register, said field control section of said instruction word being stored in said field register, a field ring, said field ring sequentially producing a plurality of control signals each of which reads a particular digit of said first operand out of that position in said arithmetic register in which the digit is stored, a switch matrix associated with said field register, the output of said switch matrix being connected to said field ring, said switch matrix producing a start signal for initiating sequential operation of said field ring with the control signal causing read-out of the least significant digit of said first operand specified by the field control section of said instruction word, means for reading said second operand out of said auxiliary register serially, an arithmetic computing section, means for serially transferring said second operand to said arithmetic computing section, means for serially transferring the selected portion of said first operand to said arithmetic computing section, said arithmetic computing section performing the desired arithmetic operation on said first operand, and means under control of said field register for stopping the serial read-out of said first operand at the most significant digit specified by said field control section of said instruction word.

5. The electronic digital computer recited in claim 4 and a significant digit scanner, said means for transferring said second operand to said auxiliary register being connected to said significant digit scanner, said significant digit scanner having means for determining the most significant digit in said second operand, and means under control of said significant digit scanner for stopping the serial read-out of said second operand from said auxiliary register when the most significant digit of said second operand is read out.

6. The electronic digital computer recited in claim 5 wherein the means for stopping the serial read-out of said second operand from said auxiliary register comprise a shift register, said shift register having a plurality of digit positions at least equal in number to the maximum number of digits in said second operand, said significant digit scanner being operable to insert a "1" digit into the position of the shift register corresponding to the most significant digit of said second operand, means for shifting the digits out of said shift register and means responsive to the read-out of said "1" digit from said shift register for stopping the serial read-out of said second operand from said auxiliary register.

7. The electronic digital computer recited in claim 6 and a recycle control circuit including means responsive to the read-out of said "1" digit from said shift register for reclycling said significant digit scanner and said shift register, said significant digit scanner determining the presence of a significant digit in said auxiliary register under control of said last-named means, and means responsive to the presence of a significant digit in said auxiliary register for signaling an error in the operation of the serial read-out of said auxiliary register.

8. An electronic digital computer in which an arithmetic operation is performed on a predetermined number of digits of a first operand, said predetermined number of digits being specified by a field control section of an instruction word, said computer comprising a plurality of addressable storage locations including a main memory and a plurality of accumulators, said first operand being stored in one of said addressable storage locations, a second operand stored in a second one of said addressable storage locations, an arithmetic register having a number of positions at least equal to the maximum number of digits in said first operand, means for transferring said first operand to said arithmetic register under control of said instruction word, an auxiliary register, means for transferring said second operand to said auxiliary register, a field register, said field control section of said instruction word being stored in said field register, a field ring, said ring sequentially producing a plurality of control signals each of which reads a particular digit of said first operand directly out of that position in the arithmetic register in which the digit is stored, an arithmetic computing section having two input channels, means for transferring said first operand from said arithmetic register to one of said input channels, means for serially transferring said second operand from said auxiliary register to one of said input channels, said arithmetic computing section having means for performing a serial true addition of the operands incident at said input channels, said arithmetic computing section having means for performing a serial complement addition of said operands incident at said input channels, means for selectively energizing said true addition means or said complement addition means, and a connection between the output of said arithmetic computing section and said arithmetic register whereby the result of said arithmetic operation is inserted in a serial manner into the positions of said arithmetic register.

9. The electronic digital computer recited in claim 8 and a field overflow check circuit comprising a first AND circuit, means activated by the occurrence of a carry digit in said arithmetic computing section, said last-named means being connected to said first AND circuit, means activated by the read-out of the last digit of said first operand specified by the field control section of said instruction word, said last means being connected to said first AND circuit, said first AND circuit producing an output only upon the occurrence of a carry digit after the read-out of the last digit of said first operand, a second AND circuit, said last-named means being connected to said second AND circuit, means activated by the read-out of the most significant digit of said second operand, said last-named means being connected to said second AND circuit, said second AND circuit producing an output only when the read-out of the most significant digit of said second operand occurs after the read-out of the last digit of said first operand, a field overflow latch, means for setting said field overflow latch from the output of said first AND circuit and means for setting said field overflow latch from the output of said second AND circuit.

10. The electronic digital computer recited in claim 8 and means for performing a complement adjust operation, said last-named means including means for reinitiating sequential operation of said field ring, said field ring producing a plurality of control signals for serially reading the result of said arithmetic operation out of said arithmetic register, means to transfer the result of said arithmetic operation to said arithmetic computing section, means for energizing the complement addition means in said arithmetic computing section, and means for transferring the result of said complement adjust operation to said arithmetic register.

11. The electronic digital computer recited in claim 10 and means for performing a complement adjust operation, including means for reinitiating sequential operation of said field rings, said last-named means including means responsive to energization of said add to accumulator control circuit for resetting said field register, said field register being reset so as to reinitiate sequential operation of said field ring with the control signal reading out the least significant digit position of said arithmetic register, means to serially transfer the result of said arithmetic operation from said arithmetic register to said arithmetic computing section, means for energizing the complement addition means in said arithmetic computing section, and means for transferring the result of said complement adjust operation to said arithmetic register.

12. The electronic digital computer recited in claim 8 wherein said instruction word includes an operation control section specifying the addressable storage location to which the result of said arithmetic operation is to be transfered, an add to memory control circuit, said last-named circuit being energized when said operation control section specifies an addressable storage location in said main memory, an add to accumulator control circuit, said last-named circuit being energized when said operation control section specifies an addressable storage location in one of said accumulators, and means responsive to said add to memory control circuit and to said add to accumulator control circuit for transferring the result of said arithmetic operation in parallel to the specified addressable storage location.

13. The electronic digital computer recited in claim 12 and zero insert latches responsive to the energization of said add to accumulator control circuit, said zero insert latches inserting zero digits into all digit positions of said arithmetic register higher than the position containing the most significant digit of said first operand.

14. The electronic digital computer recited in claim 12 and a plurality of zero insert latches each having a set and a reset condition, each of said zero insert latches being connected to a corresponding position of said arithmetic register, means for initially setting all of said zero insert latches, means for sequentially resetting each of said zero insert latches when the corresponding position of said arithmetic register is read out, means responsive to the completion of the serial read-out of said arithmetic register for sensing a set condition of any of said zero insert latches, and means responsive to said last-named means for inserting a zero digit into all positions of said arithmetic register corresponding to zero insert latches having set conditions.

15. The electronic digital computer recited in claim 14 and a zero insert check circuit including a plurality of first AND circuits each associated with a particular position of said arithmetic register, each of said first AND circuits being responsive to both the serial read-out of the position of said arithmetic register associated therewith and to the set condition of all zero insert latches associated with positions of said arithmetic register higher than the position associated with that particular AND circuit, an OR circuit, the outputs of all of said first AND circuits being connected to said OR circuit, means responsive to the resetting of said zero insert latches in the proper sequence, and a second AND circuit, said last-named means being connected to said second AND circuit, the output of said OR circuit being connected to said second AND circuit, said second AND circuit producing an output signal indicative of the proper operation of said zero insert latches.

16. A zero insert circuit for inserting a particular digit into selected positions of a register, said selected positions being all positions of a higher order than the position containing the most significant digit of an operand stored therein, said circuit comprising means for reading out the positions of said register having stored therein the digits of said operand, a plurality of insert latches, each of said latches being associated with a particular position of said register, each of said latches having a set and a reset condition, means for initially setting all insert latches, means for resetting each of said latches, said last named means being responsive to the means for reading out said arithmetic register whereby only those latches associated with positions having a digit of said operand stored therein are reset, and means responsive to the set condition of said insert latches for inserting said particular digit into each of the positions of said arithmetic register associated with latches in the set condition.

17. A zero insert circuit for inserting a particular digit into selected positions of a register, said selected positions being all positions of a higher order than the position containing the most significant digit of an operand stored therein, said circuit comprising means for reading out the positions of said arithmetic register having stored therein the digit of said operand, a plurality of insert latches, each of said insert latches being associated with a particular position of said arithmetic register, each of said insert latches having a set and a re-set condition, means for initially setting all insert latches, a plurality of first gating circuits, each of said gating circuits being associated with a particular position of said register, each of said gating circuits being connected to re-set a particular insert latch, means for sequentially energizing those gating circuits associated with positions of said register which are read out, a plurality of second gating circuits, each of said second gating circuits being energized by the set condition of a particular insert latch, each of said second gating circuits being connected to insert said particular digit into a position of said register when said second gating circuit is energized.

18. The zero insert circuit recited in claim 17 and a zero insert check circuit including means responsive to both the serial read out of a position of said register and to the set condition of all insert latches associated with positions of said arithmetic register higher than the position being read out, means responsive to the re-setting of said insert latches in the proper sequence, and means responsive to both of said last named means for producing an output signal indicative of the proper operation of said zero insert latches.

19. The zero insert circuit recited in claim 17 and a zero insert check circuit including a plurality of first AND circuits each associated with a particular position of said arithmetic register, each of said first AND circuits being responsive to both the serial read out of the position of said arithmetic register associated therewith and to the set condition of all zero insert latches associated with positions of said arithmetic register higher than the position associated with that particular AND circuit, an OR circuit, the outputs of all of said first AND circuits being connected to said OR circuit, means responsive to the re-setting of said zero insert latches in the proper sequence, and a second AND circuit, the output of said OR circuit being connected to said second AND circuit, said second AND circuit producing an output signal indicative of the proper operation of said zero insert latches.

20. An electronic digital computer in which an arithmetic operation is performed on a predetermined number of digits of a first operand, said predetermined number of digits being specified by a field control section of an instruction word, said computer comprising a plurality of addressable storage locations, said first operand being stored in one of said addressable storage locations, a second operand stored in a second one of said addressable storage locations, an arithmetic register having a number of positions at least equal ot the maximum number of digits in said first operand, means for transferring said first operand to said arithmetic register under control of said instruction word, an auxiliary register, means for transferring said second operand to said auxiliary register under control of said instruction word, a field register, said field control section of said instruction word being stored in said field register, a field ring, said field ring sequentially producing a plurality of control signals each of which reads a particular digit of said first operand directly out of that position in said arithmetic register in which the digit is stored, a switch matrix associated with said field register, the output of said switch matrix being connected to said field ring, said switch matrix producing a start signal for initiating sequential operation of said field ring with the control signal causing direct read-out of the least significant digit of said first operand specified by the field control section of said instruction word, means for reading said second operand out of said auxiliary register serially, an arithmetic computing section, means for serially transferring said second operand to said arithmetic computing section, means for serially transferring the selected portion of said first operand to said arithmetic computing section, said arithmetic computing section performing the desired arithmetic operation on said first operand, and means under control of said field register for stopping the read-out of said first operand at the most significant digit specified by said field control section of said instruction word.

21. The electronic digital computer recited in claim 20 wherein the means for reading said second operand out of said auxiliary register serially comprise a program ring, said program ring sequentially producing a plurality of control signals each of which reads a particular digit of said second operand out of that position in the auxiliary register in which the digit is stored.

22. The electronic digital computer recited in claim 20 wherein the means for stopping the direct read-out of said first operand comprise a comparator, said field register being connected to said comparator, said field ring being connected to said comparator, said comparator producing an output when said field ring produces a control signal which reads out the most significant digit specified by the field control section of said instruction word, and means for stopping said field ring a predetermined time after said comparator produces an output.

23. The electronic digital computer recited in claim 22 wherein the means for stopping said field ring comprise a field cycle ring for producing a predetermined delay, the output of said comparator being connected to said field ring, said field cycle ring being connected to stop said field ring a predetermined time after said comparator produces an output.

24. The electronic digital computer recited in claim 23 wherein said arithmetic computing section is an adder.

25. The electronic digital computer recited in claim 24 wherein the plurality of addressable storage locations includes a main memory and a plurality of accumulators.

26. The electronic digital computer recited in claim 25 wherein means are provided for gating the result of an arithmetic operation to a storage location in said main memory or to a selected one of said accumulators.

27. The electronic digital computer recited in claim 26 wherein said gating means comprise a connection between the output of said adder and said arithmetic register, the result of said arithmetic operation being inserted in a serial manner into the positions of said arithmetic register, and means for transferring the contents of said arithmetic registers in parallel to said main memory or to one of said accumulators.

28. An electronic digital computer in which an arithmetical operation is performed on a predetermined number of digits of a first operand, said predetermined number of digits being specified by a field control section of an instruction word, said computer comprising a plurality of addressable storage locations, said first operand being stored at one of said addressable storage locations, a second operand stored in a second one of said addressable storage locations, an arithmetic register having a number of positions at least equal to the maximum number of digits in said first operand, means for transferring said first operand to said arithmetic register under control of said instruction word, an auxiliary register, means for transferring said second operand to said auxiliary register under control of said instruction word, a field register, said field control section of said instruction word being stored in said field register, a field ring, said field ring sequentially producing a plurality of control signals each of which reads a particular digit of said first operand out of that position in said arithmetic register in which the digit is stored, a switch matrix associated with said field register, the output of said switch matrix being connected to said field ring, said switch matrix producing a start signal for initiating sequential operation of said field ring with the control signal causing read-out of the least significant digit of said first operand specified by the field control section of said instruction word, means for reading said second operand out of said auxiliary register serially, said second operand reading means including a program ring, said program ring sequentially producing a plurality of control signals each of which reads a particular digit of said second operand out of that position in the auxiliary register in which the digit is stored, an arithmetic computing section, means to serially transfer said second operand to said arithmetic computing section, means for serially transferring the selected portion of said operand to said arithmetic computing section, said arithmetic computing section performing the desired arithmetic operation on said first operand, a field ring check circuit including a field match comparator, said field register being connected to said field match comparator, said field ring being connected to said field match comparator, said field match comparator producing an output when said field ring produces a control signal which reads out the most significant digits specified by the field control section of said instruction word, a field ring check comparator, the output of said field match comparator being connected to said field ring check comparator, said program ring being connected to said field ring check comparator, means responsive to said field control section of said instruction word, said last-named means being connected to said field ring check comparator, said field ring check comparator producing a field ring check signal only when said field ring has functioned properly during the serial read-out of said first operand, and means under control of said field register for stopping the serial read-out of said first operand at the most significant digit specified by said field control section of said instruction word.

29. An electronic digital computer in which an arithmetic operation is performed on a predetermined number of digits of a first operand, said predetermined number of digits being specified by a field control section of an instruction word, said computer comprising a plurality of addressable storage locations including a main memory and a plurality of accumulators, said first operand being stored in one of said addressable storage locations, a second operand stored in a second one of said addressable storage locations, an arithmetic register having a number of positions at least equal to the maximum number of digits in said first operand, means for transferring said first operand to said arithmetic register under control of said instruction word, an auxiliary register, means for transferring said second operand to said auxiliary register, a field register, said field control section of said instruction word being stored in said field register, a field ring, said field ring sequentially producing a plurality of control signals each of which reads a particular digit of said first operand directly out of that position in the arithmetic register in which the digit is stored, an arithmetic computing section having two input channels, means for transferring said first operand from said arithmetic register to one of said input channels, means for serially transferring said second operand from said auxiliary register to one of said input channels, and a connection between the output of said arithmetic computing section and said arithmetic register whereby the result of said arithmetic operation is inserted in a serial manner into the positions of said arithmetic register.

30. The electronic digital computer recited in claim 29 and means for performing a complement adjust opera-

31 tion, said last-named means including means for reinitiating sequential operation of said field ring, said field ring producing a plurality of control signals for serially reading the result of said arithmetic operation out of said arithmetic register, means to transfer the result of said arithmetic operation to said arithmetic computing section, means for energizing the complement addition means in said arithmetic computing section, and means for transferring the result of said complement adjust operation to said arithmetic register.

31. The electronic digital computer recited in claim 29 wherein said instruction word includes an operation control section specifying the addressable storage location to which the result of said arithmetic operation is to be transferred, an add to memory control circuit, said last-named circuit being energized when said operation control section specifies an addressable storage location in said main memory, an add to accumulator control circuit, said last-named circuit being energized when said operation control section specifies an addressable storage location in one of said accumulators, and means responsive to said add to memory control circuit and to said add to accumulator control circuit for transferring the result of said arithmetic operation in parallel to the specified addressable storage location.

32. In combination, means operative under control of an instruction manifestation to serially combine manifestations of two words containing a series of coded digits each word including a fixed maximum number of digits and including means starting and stopping said combining means, means defining a number of digits in one of said words less than said fixed maximum, means producing an identification of the last digit of the series comprising said defined number and means controlled by said identification of said last digit and effective to control said stopping means of said combining means upon identification of the last one of said defined number of diigts.

33. A device as in claim 32 and including means effective upon identification of the first digit of said defined number, to control said starting means of said combining means.

34. A device as in claim 32 and including carry detecting means, and means controlled by said carry detecting means to produce an error indication when the addition of said last digit to a digit of the other word produces a carry detected by said detecting means and said instruction manifestation includes a manifestation of the instruction add to memory.

35. A device as in claim 32 and including means identifying the last of a series of digits in said other word, means producing a manifestation that said last digit of said identified series in said other word has been reached, and means controlled by said identification of the last digit of said one word and the manifestation that the last digit in said series of said other word has been reached for controlling said stopping means.

36. A device as in claim 35, said instruction manifestation representing the instruction add to memory, means checking the order of occurrence of said last digits respectively in said one word and in said other word, and means rendered operative upon identification of the last digit of said series, in said other word, subsequent to identification of said last digit of said series in said one word, to produce an error indication.

37. A device as in claim 35, said means defining the number of digits in said one word, less than said maximum, comprising a field selection portion of said instruction and said means identifying the last of said series of digits in said other word comprising means scanning said other word to ascertain the position of the highest order significant digit therein.

38. A device as in claim 32, said means defining the number of digits in said one of said words, less than said maximum, comprising a field selection portion of said instruction.

32

39. A device as in claim 38, said field selection portion defining the first digit of said series in said one word.

40. A device as in claim 38 and means controlled by said first digit defining means for controlling said starting means.

41. A device as in claim 38, said field selection portion defining the last digit of said series in said one word.

42. A device as in claim 41 and means controlled by said last digit defining means for controlling said stopping means.

43. A device as in claim 38, said one word being stored in a first register, and means controlled by said field selection portion of said instruction for withdrawing the respective digits of said series of said word designated by said field selection portion, one at a time, directly from said register, whereby the digits not being withdrawn remain in their respective orders.

44. A device as in claim 43 and including an adder, means controlling the serial transmission of the respective digits of said selected field to said adder, for addition therein to digits of said other word, and means controlled by said field selection portion of said instruction for replacing only the digits of the selected field in said register by said sum digits.

45. A device as in claim 38 and including an adder, means controlling the feeding of corresponding digits from said one word and of the other of said two words to said adder and means controlled by said field selection portion for placing the sum digits in the orders of a register, corresponding only to said selected field.

46. A device as in claim 45, said instruction manifestation comprising an instruction add to memory and means controlled by the sequence of identifications of said last digit in said one word and said other word for permitting transfer of said sum digits when said identification of said last digit in said one word is subsequent to that in said other word.

47. A device as in claim 46 and including carry operated means, and means operative upon carry produced by the addition of said last digit of said one word to a digit of said other word to indicate an error.

48. A device as in claim 46 and means for indicating an error when the identification of the last digit of said one word is prior to identification of said last digit of said other word.

49. In an information handling system for performing one or more operations on two operands, each comprising a fixed maximum number of characters the combination comprising a first recognition circuit and a second recognition circuit, said first recognition circuit being controlled by a manifestation of a number of characters in one operand less than said prescribed fixed maximum, said second recognition circuit being controlled by a manifestation of the position in the other operand of its highest significant digit and means controlled by both said recognition means to control said one operation.

50. In an electronic digital computer in which an operand having a fixed maximum number of digits is to be manipulated in response to instruction words, means under control of a first instruction word for selecting a first group of digits within said operand for a first manipulation and means under control of another instruction word for selecting a different group of digits within said same operand for a second manipulation.

51. A computer as claimed in claim 50 wherein said selected groups of said single operand are non-overlapping.

References Cited in the file of this patent

FOREIGN PATENTS

| 749,836 | Great Britain | June 6, 1956 |
| 764,522 | Great Britain | Dec. 28, 1956 |

UNITED STATES PATENT OFFICE
CERTIFICATE OF CORRECTION

Patent No. 3,166,668                      January 19, 1965

Elliott R. Marsh

It is hereby certified that error appears in the above numbered patent requiring correction and that the said Letters Patent should read as corrected below.

Column 13, line 63, for "AUXILITRY" read -- AUXILIARY --; column 17, line 6, the character at the end of the line should appear as --0 --; line 8, the character at the end of the line should appear as -- + --; line 9, for "DDER" read -- ADDER --; same column 17, line 28, for "positon 6, and the wthdrawal" read -- position 6, and the withdrawal --; column 18, line 39, for "witched" read -- switched --; column 25, line 71, for "reclycling" read -- recycling --; column 27, line 18, for "transfered" read -- transferred --; column 28, line 65, for "ot" read -- to --; column 31, line 37, for "diigts" read -- digits --.

Signed and sealed this 29th day of June 1965.

(SEAL)
Attest:

ERNEST W. SWIDER                      EDWARD J. BRENNER
Attesting Officer                   Commissioner of Patents